United States Patent
Yamada et al.

(10) Patent No.: US 10,630,122 B2
(45) Date of Patent: Apr. 21, 2020

(54) MOTOR

(71) Applicant: Denso Corporation, Kariya (JP)

(72) Inventors: Yoji Yamada, Hamamatsu (JP); Chie Morita, Kosai (JP)

(73) Assignee: Denso Corporation, Kariya (JP)

( * ) Notice: Subject to any disclaimer, the term of this patent is extended or adjusted under 35 U.S.C. 154(b) by 125 days.

(21) Appl. No.: 15/713,253

(22) Filed: Sep. 22, 2017

(65) Prior Publication Data

US 2018/0013327 A1 Jan. 11, 2018

Related U.S. Application Data

(62) Division of application No. 14/975,394, filed on Dec. 18, 2015, now Pat. No. 9,787,148.

(30) Foreign Application Priority Data

Jan. 7, 2015 (JP) .................................. 2015-001484
Feb. 9, 2015 (JP) .................................. 2015-023061
(Continued)

(51) Int. Cl.
*H02K 1/27* (2006.01)
*H02K 21/16* (2006.01)

(52) U.S. Cl.
CPC ........... *H02K 1/2706* (2013.01); *H02K 21/16* (2013.01); *H02K 1/2713* (2013.01); *H02K 1/2766* (2013.01)

(58) Field of Classification Search
CPC ............ H02K 1/24; H02K 1/243; H02K 1/27; H02K 1/27; H02K 1/2706; H02K 1/2713;
(Continued)

(56) References Cited

U.S. PATENT DOCUMENTS 4,954,736 A 9/1990 Kawamoto et al.
6,353,275 B1 3/2002 Nishiyama et al.
(Continued)

FOREIGN PATENT DOCUMENTS

JP 2000-083334 A1 3/2000
JP 2000-139045 A 5/2000
(Continued)

OTHER PUBLICATIONS

Japanese Office Action for Application No. 2014-175276, dated Mar. 27, 2018 (2 pgs.) and English Machine Translation (3 pgs.) (5 pgs. total).
(Continued)

*Primary Examiner* — Tran N Nguyen
(74) *Attorney, Agent, or Firm* — Patterson Thuente Pedersen, P.A.

(57) ABSTRACT

A rotor of a motor includes first and second rotor cores, a field magnet, and a commutator magnet. The first and second rotor cores each include a core base and a plurality of claw poles. The claw poles of the first rotor core and the claw poles of the second rotor core are alternately arranged in a circumferential direction. The field magnet is located between the core bases. The field magnet is magnetized in an axial direction so that the claw poles of the first rotor core and the claw poles of the second rotor core function as different magnetic poles in the circumferential direction. The commutator magnet is located on an outer circumference of the field magnet around the claw poles. The commutator magnet is magnetized so that surfaces having the same polarity face each other between the claw poles and the commutator magnet.

3 Claims, 36 Drawing Sheets

(30) Foreign Application Priority Data

| Feb. 19, 2015 | (JP) | 2015-030688 |
|---|---|---|
| Feb. 23, 2015 | (JP) | 2015-033158 |
| Apr. 7, 2015 | (JP) | 2015-078554 |
| Jul. 21, 2015 | (JP) | 2015-144312 |

(58) Field of Classification Search
CPC ...... H02K 1/273; H02K 1/2733; H02K 1/274; H02K 1/276; H02K 1/2766; H02K 1/277; H02K 1/2773; H02K 21/14; H02K 21/16
See application file for complete search history.

(56) References Cited

U.S. PATENT DOCUMENTS

| 7,642,691 | B2 | 1/2010 | Morita et al. | |
| 9,018,816 | B2* | 4/2015 | Yamada | H02K 1/27 310/263 |
| 9,273,691 | B2* | 3/2016 | Yamada | H02K 1/2706 310/263 |
| 9,490,669 | B2* | 11/2016 | Yamada | H02K 1/2706 310/263 |
| 9,490,670 | B2 | 11/2016 | Tsuchiya et al. | |
| 9,502,929 | B2* | 11/2016 | Yamada | H02K 21/044 310/263 |
| 9,859,761 | B2* | 1/2018 | Yamada | H02K 1/2713 310/263 |
| 2002/0067101 | A1 | 6/2002 | Armiroli et al. | |
| 2007/0278895 | A1 | 12/2007 | Kusase | |
| 2013/0002082 | A1 | 1/2013 | Utsumi et al. | |
| 2013/0057102 | A1 | 3/2013 | Yamada et al. | |
| 2013/0106230 | A1 | 5/2013 | Morita et al. | |
| 2013/0121856 | A1 | 5/2013 | Yamada et al. | |
| 2013/0207503 | A1 | 8/2013 | Morita et al. | |
| 2013/0300242 | A1 | 11/2013 | Yamada et al. | |
| 2014/0049132 | A1 | 2/2014 | Yamada | |
| 2014/0225462 | A1 | 8/2014 | Yamada et al. | |
| 2014/0306569 | A1 | 10/2014 | Kojima et al. | |
| 2015/0084466 | A1 | 3/2015 | Tsuchiya et al. | |
| 2018/0076677 | A1 | 3/2018 | Yamada et al. | |

FOREIGN PATENT DOCUMENTS

| JP | 2002/252947 A | 9/2002 |
| JP | 2003-324873 A | 11/2003 |
| JP | 2007-329989 A | 12/2007 |
| JP | 2010-252560 A | 11/2010 |
| JP | 2012-115085 A | 6/2012 |
| JP | 2013-034363 A | 2/2013 |
| JP | 2013-118801 A | 6/2013 |
| JP | 2013-123361 A | 6/2013 |
| JP | 2013-183618 A | 9/2013 |
| JP | 2013-192291 A | 9/2013 |
| JP | 2014-033530 A | 2/2014 |
| JP | 2014-187858 A | 10/2014 |
| JP | 2014-195356 A | 10/2014 |

OTHER PUBLICATIONS

Japanese Office Action for Application No. 2015/001484, dated May 17, 2018 (2 pgs) and English Machine Translation (3 pgs) (5 pgs. total).

Japanese Office Action for Application No. 2015/033158, dated Jun. 11, 2018 (3 pgs) and English Machine Translation (3 pgs) (6 pgs. total).

Japanese Office Action for Application No. PY20150555, dated Aug. 14, 2018 (2 pgs), and English language machine translation (3 pgs) (5 pgs. total).

* cited by examiner

MOTOR

RELATED APPLICATION

This application is a division of application Ser. No. 14/975,394 filed Dec. 18, 2015, which claims the benefit of Japanese Application No. 2015001484 filed Jan. 7, 2015, Japanese Application No. 2015023061 filed Feb. 9, 2015, Japanese Application No. 2015030688 filed Feb. 19, 2015, Japanese Application No. 2015033158 filed Feb. 23, 2015, Japanese Application No. 2015078554 filed Apr. 7, 2015, Japanese Application No. 2015144312 filed Jul. 21, 2015, each of which is hereby fully incorporated herein by reference.

BACKGROUND OF THE INVENTION

The present invention relates to a motor.

Japanese Laid-Open Patent Application No. 2012-115085 describes an example of a rotor having a permanent magnet field Lundell configuration. In the prior art, the rotor is used in a motor. The rotor includes two rotor cores, which are stacked upon each other, and a field magnet, which is disk-shape and located between the rotor cores. Each of the rotor cores includes a plurality of claw poles arranged in a circumferential direction. The field magnet causes the claw poles of the rotor cores to function as poles that alternately change in the circumferential direction.

In addition to the field magnet, the rotor described in Japanese Laid-Open Patent Publication No. 2012-115085 includes back surface magnets and interpolar magnets that serve as commutator magnets. Each of the back surface magnets is located on a back surface of a claw pole, that is, between the claw pole and the field magnet. Each of the interpolar magnets is located between claw poles that are adjacent to each other in the circumferential direction. The commutator magnets reduce leakage flux of the rotor.

In a rotor that includes commutator magnets, there is no description of how the commutator magnets are fixed in the rotor, and there is a need for fixing the commutator magnets in a desirable manner.

Furthermore, an interior permanent magnet (IPM) rotor that has magnets embedded in a rotor core is known in the art (refer to, for example, Japanese Laid-Open Patent Publication No. 2002-252947). The rotor disclosed in Japanese Laid-Open Patent Publication No. 2002-252947 includes a rotor core including a plurality of insertion holes arranged in the circumferential direction. Magnets are inserted in the insertion holes so that magnets with magnetic poles functioning as the N poles on the outer side in the radial direction and magnets with magnetic poles functioning as S poles on the outer side in the radial direction are alternately arranged in the circumferential direction.

The rotor disclosed in Japanese Laid-Open Patent Publication No. 2002-252947 includes a plurality of magnets. This increases the number of components. Thus, there is room for improvement in terms of assembling efficiency.

In the motor disclosed in Japanese Laid-Open Patent Publication No. 2012-115085, magnetic saturation may occur in the claw poles of the rotor core. In the magnetic flux generated by the field magnet, the magnetic saturation lowers the ratio of the magnetic flux that is effective for the rotation of the rotor. Thus, the desired output cannot be obtained.

SUMMARY OF THE INVENTION

A first object of the present invention is to provide a motor in which commutator magnets are fixed in a desirable manner. A second object of the present invention is to provide a motor that improves the assembling efficiency and limits increases in the number of components. A third object of the present invention is to provide a motor that improves the output.

To achieve the above object, a motor according to a first aspect of the present invention includes a rotor. The rotor includes first and second rotor cores, a field magnet, and a commutator magnet. The first and second rotor cores each include a disk-shaped core base and a plurality of claw poles arranged in a circumferential direction on an outer circumferential portion of the core base. The first and second rotor cores are stacked upon each other in an axial direction so that the claw poles of the first rotor core and the claw poles of the second rotor core are alternately arranged in the circumferential direction. The field magnet is located between the core base of the first rotor core and the core base of the second rotor core. The field magnet is magnetized in the axial direction so that the claw poles of the first rotor core and the claw poles of the second rotor core function as different magnetic poles in the circumferential direction. The commutator magnet is located on an outer circumference of the field magnet and near the claw poles. The commutator magnet is magnetized so that surfaces having the same polarity face each other in the claw poles and the commutator magnet.

To achieve the above object, a motor according to a second aspect of the present invention includes a rotor. The rotor includes a rotor core and a field magnet. The rotor core includes a substantially disk-shaped core base and a plurality of claw poles that extend at least in an axial direction from an outer circumferential portion of the core base. The claw poles are arranged in a circumferential direction. The field magnet contacts the claw poles in a radial direction and is anisotropically oriented so that the plurality of claw poles function as different magnetic poles in the circumferential direction.

To achieve the above object, a motor according to a third aspect of the present invention includes a rotor and a stator. The rotor including a first rotor core, a second rotor core, and a field magnet magnetized in an axial direction. The first rotor core and the second rotor core each include a plurality of claw poles arranged in a circumferential direction. The first rotor core and the second rotor core are joined with each other so that the claw poles of the first rotor core and the claw poles of the second rotor core are alternately arranged in the circumferential direction. The field magnet is located between the first rotor core and the second rotor core so that the claw poles of the first rotor core and the claw poles of the second rotor core function as alternately differing magnetic poles. The stator includes a stator core and a coil wound around the stator core. The coil generates a rotating magnetic field that acts on the rotor. The claw poles each include a radially opposing portion, which opposes the stator core in the radial direction, and an axially opposing portion, which opposes the stator core in the axial direction.

DETAILED DESCRIPTION OF THE PREFERRED EMBODIMENTS

First Embodiment

A motor according to a first embodiment will now be described.

Figure 1:
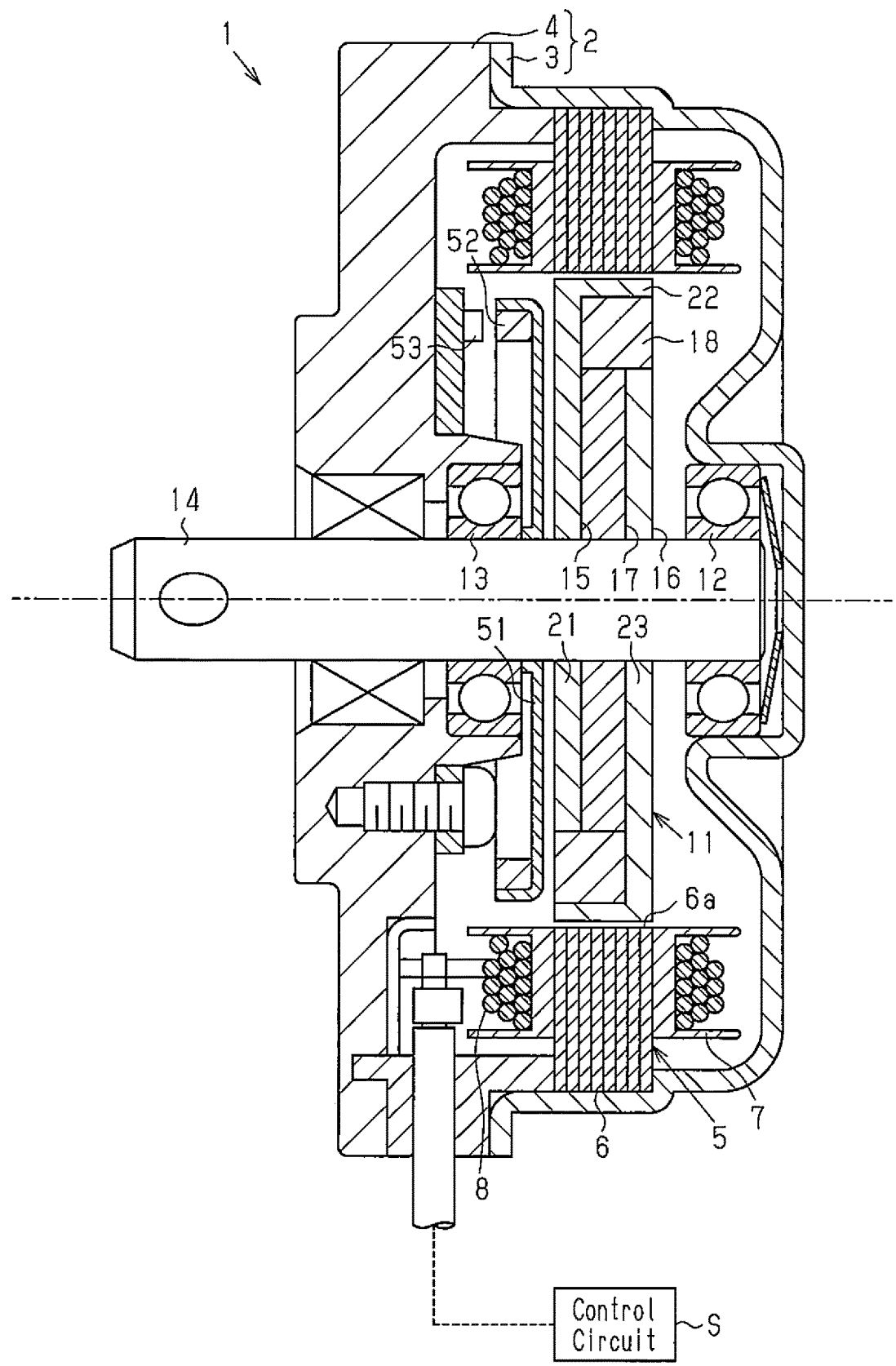
FIG. 1 is a cross-sectional view of a motor according to a first embodiment of the present invention.

A motor 1 of the present embodiment illustrated in FIG. 1 is a brushless motor. A motor casing 2, serving as a shell of the motor 1, includes a yoke housing 3, which is cylindrical and has a closed end, and an end plate 4, which closes an opening of the yoke housing 3.

A stator 5, having an annular shape, is fixed to an inner circumferential surface of the yoke housing 3. The stator 5 includes a stator core 6 a plurality of teeth 6a, which extends inward in a radial direction, and coils 8, which are wound around the teeth 6a with an insulator 7 arranged in between. The stator 5 generates a rotating magnetic field when an external control circuit S supplies driving current to the coil 8.

A rotor 11 is located at an inner side of the stator 5. Two bearings 12 and 13 are respectively arranged on a central portion of the closed end of the yoke housing 3 and a central portion of the end plate 4. The two bearings 12 and 13 rotationally support a rotation shaft 14 of the rotor 11. The end of the rotation shaft 14 closer to the end plate 4 in the axial direction extends through the end plate and protrudes outward from the motor casing 2.

The rotor 11 includes two rotor cores (i.e., first rotor core 15 and second rotor core 16) fixed to the rotation shaft 14, a field magnet 17 located between the first rotor core 15 and the second rotor core 16, and a single commutator magnet 18 arranged on the outer circumference of the field magnet 17.

Figure 2:
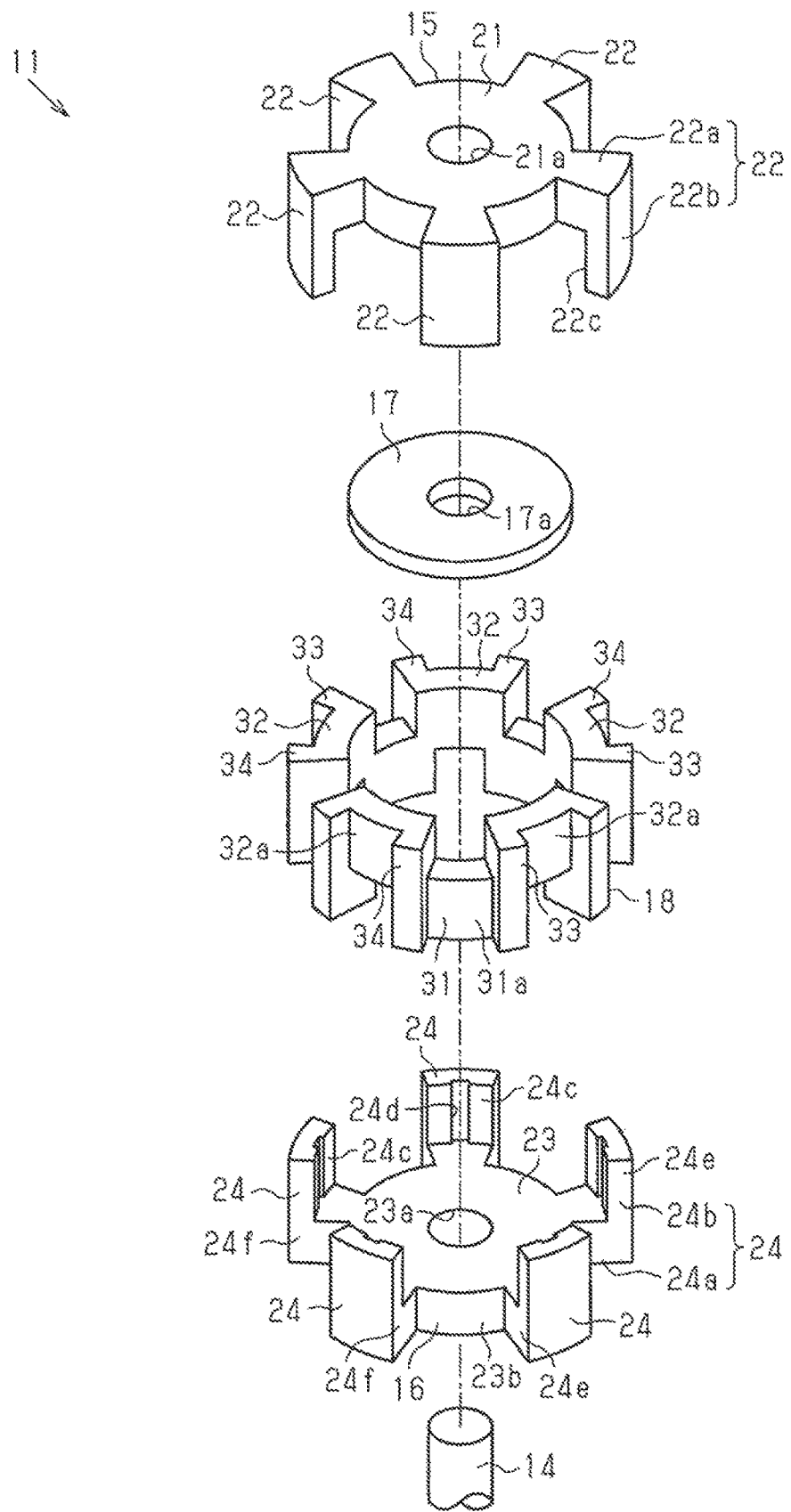
FIG. 2 is an exploded perspective view of a rotor illustrated in FIG. 1.
Figure 3:
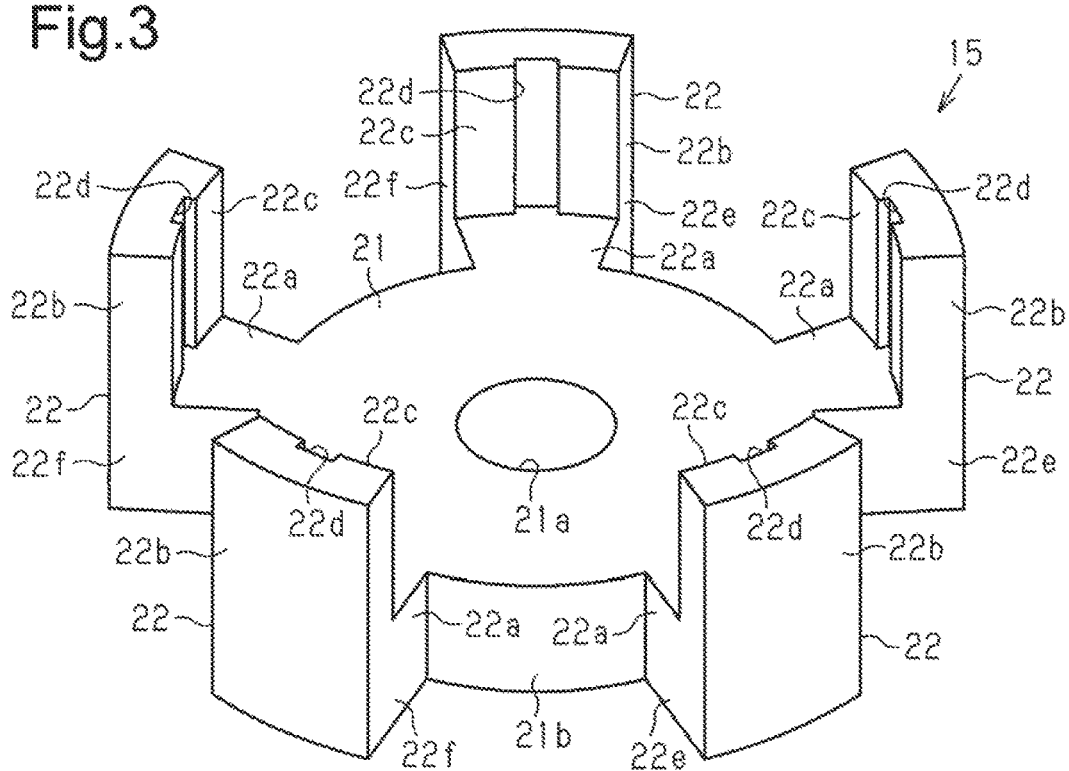
FIG. 3 is a perspective view of a rotor core illustrated in FIG. 2.

As illustrated in FIGS. 2 and 3, the first rotor core 15 includes a disk-shaped first core base 21 and a plurality of (five in the present embodiment) first claw poles 22 arranged in a circumferential direction on an outer circumferential portion of the first core base 21. A through hole 21a, in which the rotation shaft 14 is inserted and fixed, extends through a radially central portion of the first core base 21. The five first claw poles 22 are arranged at equal intervals (interval of 72°) on the outer circumferential portion of the first core base 21 in the circumferential direction.

The first claw poles 22 each include a first radially extending portion 22a, which extends outward from the outer circumferential portion of the first core base 21 in the radial direction, and a first axially extending portion 22b, which projects toward one side in the axial direction from a distal end (radially outer end) of the first radially extending portion 22a.

The first radially extending portion 22a has a sectoral shape as viewed in the axial direction that widens in the circumferential direction toward the outer side in the radial direction. The first axially extending portion 22b has a sectoral cross-sectional shape in a direction orthogonal to the axial direction that widens in the circumferential direction toward the outer side in the radial direction. The first claw poles 22 each have two circumferential side surfaces that are flat and parallel to an axis of the rotation shaft 14. The radially outer side surfaces of the first axially extending portions 22b are arcuate and lie along the same circle extending about the rotation axis of the rotor 11, as viewed in the axial direction. Each first claw pole 22 is symmetrical in shape with respect to a plane of symmetry that extends through a circumferential centroid of the first claw pole 22 and is orthogonal to the circumferential direction.

Figure 5:
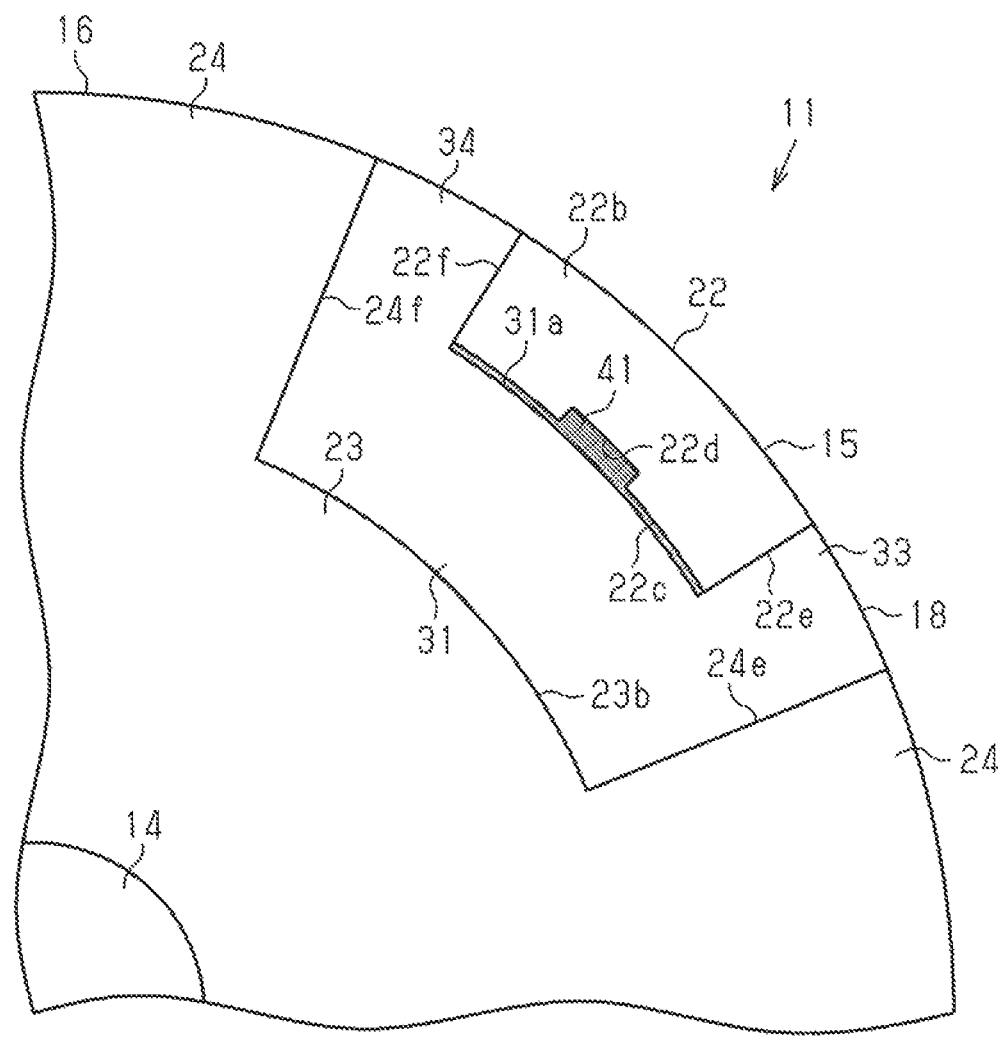
FIG. 5 is a partially enlarged view of the rotor illustrated in FIG. 1.

Referring to FIGS. 3 and 5, the radially inner surface of the first axially extending portion 22b of each first claw pole 22 defines a first core fixed surface 22c that is fixed to the commutator magnet 18 by an adhesive 41. The first core fixed surface 22c are arcuate and lie along the same circle extending about the rotation axis of the rotor 11, as viewed in the axial direction. The first core fixed surfaces 22c each include a first collection recess 22d. The first collection recesses 22d are each formed in the circumferentially central portion of the corresponding one of the first core fixed surfaces 22c and each have a shape of a groove extending in the axial direction. The first collection recess 22d extends over the first core fixed surface 22c from one end to the other end of in the axial direction. The first collection recesses 22d each have a cross-section in a direction orthogonal to the axial direction that is uniformly shaped from one end to the other end of the first collection recess 22d in the axial direction and rectangular in shape so as to have a constant width in the circumferential direction. Each first collection recess 22d opens at the radially inner side in the radial direction and at the two axial sides.

As illustrated in FIG. 2, the second rotor core 16, which is identical in shape to the first rotor core 15, includes a second core base 23 and a plurality of (five in the present embodiment) second claw poles 24 that are arranged in the circumferential direction on an outer circumferential portion of the second core base 23. The second core base 23 includes a through hole 23a, in which the rotation shaft 14 is inserted and fixed, and is identical in shape to the first core base 21, which includes the through hole 21a. Each of the second claw poles 24 includes a second radially extending portion 24a and a second axially extending portion 24b. Further, the second claw poles 24 are identical in shape to the first claw poles 22, each including the first radially extending portion 22a and the first axially extending portion 22b.

The second claw poles 24 each have a second core fixed surface 24c, which is fixed to the commutator magnet 18 by the adhesive 41 (not shown in FIG. 2) and serves as a radially inner side surface of the second axially extending portion 24b. The second core fixed surface 24c is identical in shape to the first core fixed surface 22c (see FIG. 3). The second core fixed surface 24c includes a second collection recess 24d, which is identical in shape to the first collection recess 22d (see FIG. 3).

Figure 6:
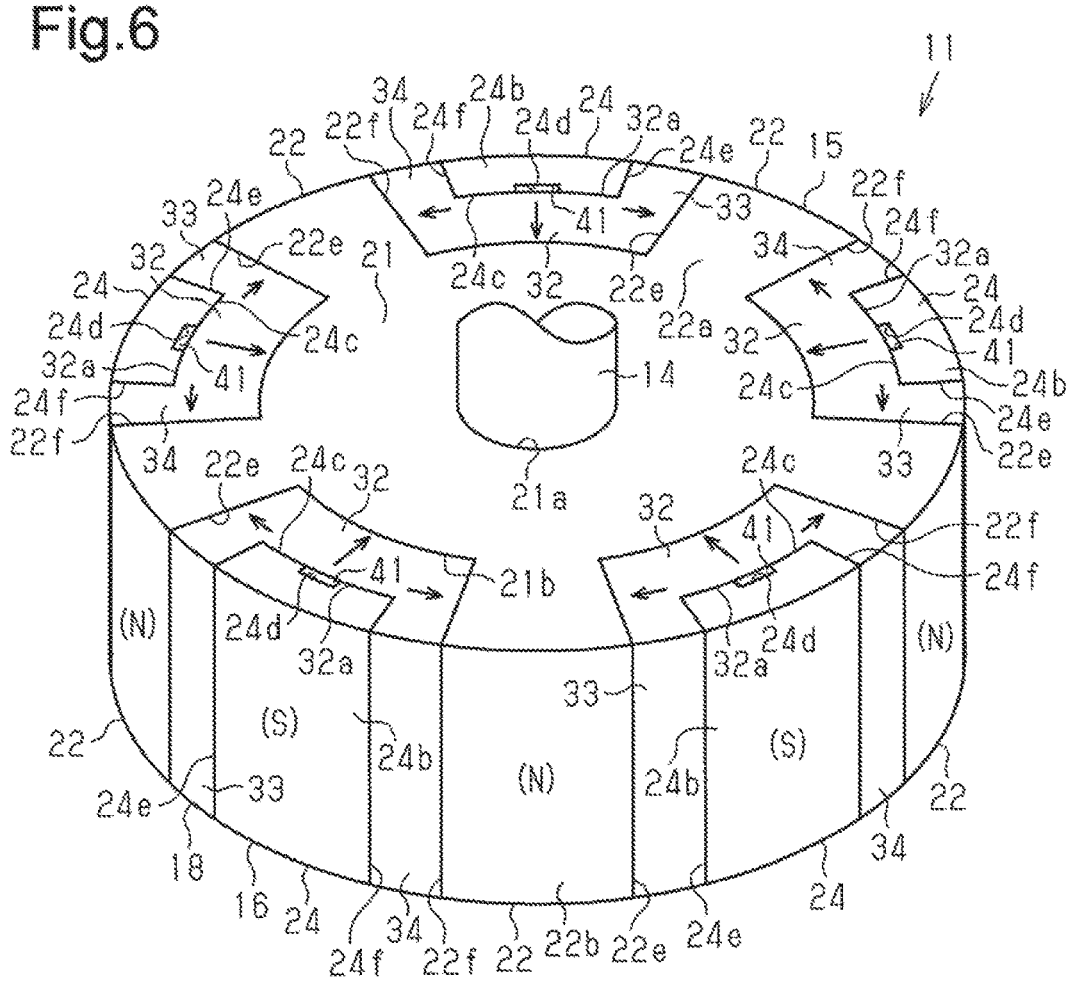
FIG. 6 is a perspective view of the rotor illustrated in FIG. 1.

As illustrated in FIGS. 1, 2, and 6, the rotation shaft 14 is press-fitted into the through holes 21a and 23a to fix the first rotor core 15 and the second rotor core 16 while maintaining an axial interval in between. The first and second rotor cores 15 and 16 are fixed to the rotation shaft 14 with the field magnet 17 and the commutator magnet 18 held between the first rotor core 15 and the second rotor core 16. The first rotor core 15 and the second rotor core 16 are fixed to the rotation shaft 14 stacked upon each other in the axial direction. Distal ends of the first axially extending portions 22b face directions opposite to distal ends of the second axially extending portions 24b. Further, the second claw poles 24 are located between the first claw poles 22 that are adjacent in the circumferential direction. The first axially extending portions 22b and the second axially extending portions 24b of the first and second rotor cores 15 and 16, which are fixed to the rotation shaft 14, are alternately arranged in the circumferential direction at equal intervals (interval of 36°) in the circumferential direction.

Figure 7:
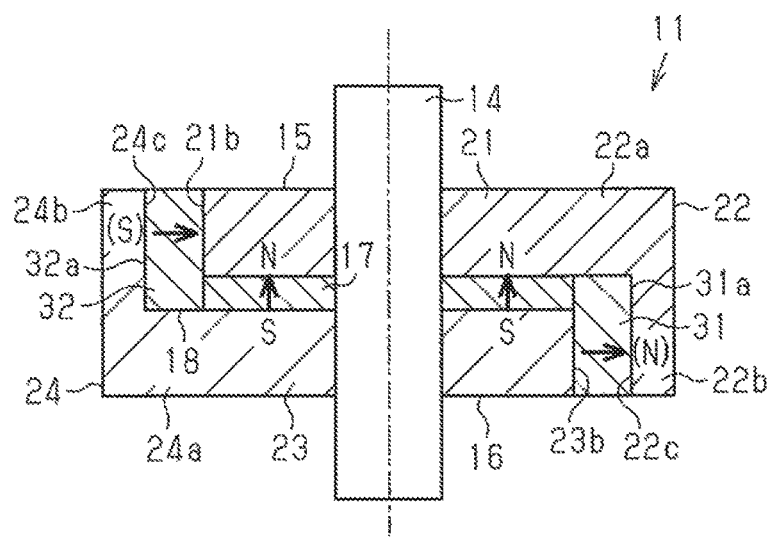
FIG. 7 is a cross-sectional view of the rotor illustrated in FIG. 6.

As illustrated in FIGS. 1, 2, and 7, when the first and second rotor cores 15 and 16 are coupled to each other, the field magnet 17 is located between the first core base 21 and the second core base 23 that are parallel to each other. For example, the field magnet 17 is a disk-shaped permanent magnet and formed by a ferrite magnet. A through hole 17a, through which the rotation shaft 14 is inserted, extends through the radially central portion of the field magnet 17. The field magnet 17 has one axial end surface (upper end surface as viewed in FIG. 2) and another axial end surface (lower end surface as viewed in FIG. 2) that are respectively in contact with the first core base 21 and the second core base 23. Further, the field magnet 17 is held and fixed between the first core base 21 and the second core base 23 in the axial direction. The field magnet 17 has the same outer diameter as the core bases 21 and 23.

The field magnet 17 is magnetized in the axial direction so that the first claw pole 22 functions as the N pole and the second claw pole 24 functions as the S pole. More specifically, the field magnet 17 is magnetized in the axial direction so that the portion closer to the first core base 21 serves as the N pole and a portion closer to the second core base 23 serving as the S pole. This results in the first and second claw poles 22 and 24 functioning as different magnetic poles in the circumferential direction. In this manner, the rotor 11 of the present embodiment is a Lundell rotor that uses the field magnet 17. The rotor 11 includes the five first claw poles 22, each serving as the N pole, and the five second claw poles 24, each serving as the S pole, that are alternately arranged in the circumferential direction. Thus, the rotor 11 includes a total of ten poles (five magnetic pole pairs).

Figure 4:
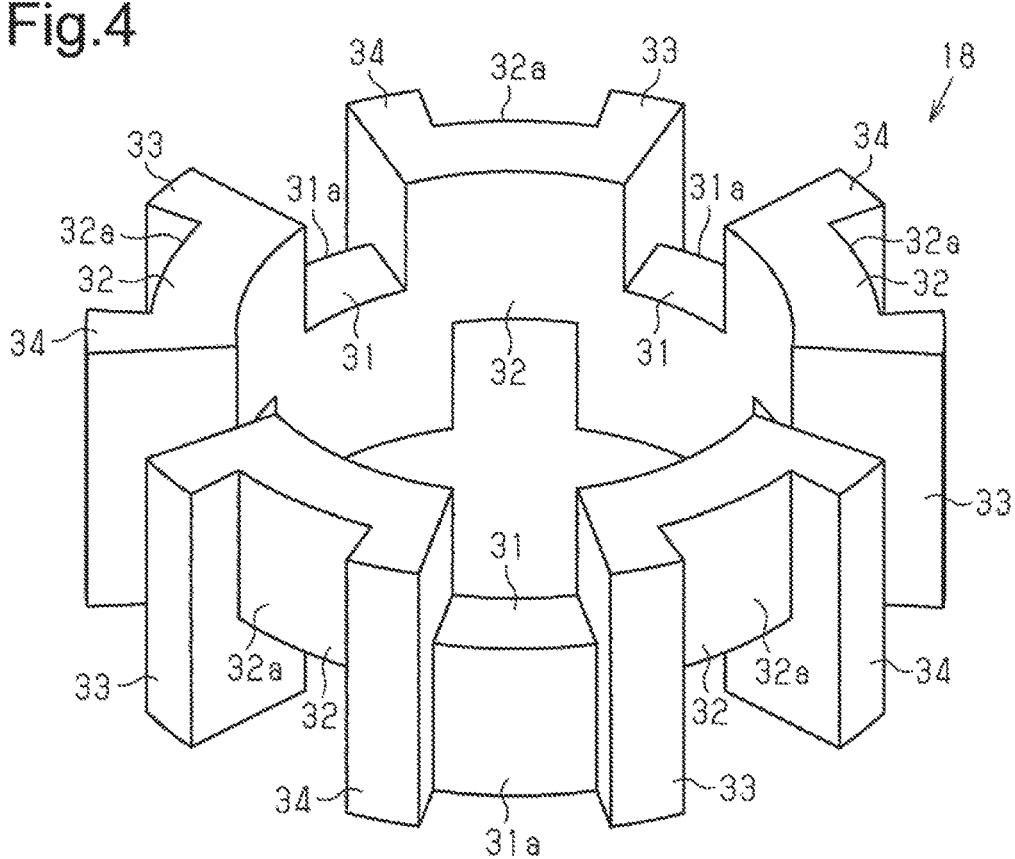
FIG. 4 is a perspective view of a commutator magnet illustrated in FIG. 2.

With reference to FIGS. 2 and 4, the commutator magnet 18 is formed by a neodymium bonded magnet, for example. The commutator magnet 18 has an annular shape, surrounds the outer circumference of the field magnet 17, and is arranged on the outer circumference of the field magnet 17 near the first and second claw poles 22 and 24. The commutator magnet 18 includes first and second back surface magnet portions 31 and 32 and first and second interpolar magnet portions 33 and 34.

As illustrated in FIGS. 4, 6, and 7, the first back surface magnet portion 31 is located between a back surface of each first claw pole 22 of the first rotor core 15 (i.e., radially inner surface, first core fixed surface 22c in present embodiment) and an outer circumferential surface 23b of the second core base 23. The second back surface magnet portion 32 is located between a back surface of each second claw pole 24 of the second rotor core 16 (i.e., radially inner surface, second core fixed surface 24c in present embodiment) and an outer circumferential surface 21b of the first core base 21. Thus, the commutator magnet 18 includes five first back surface magnet portions 31, which are arranged at equal intervals (interval of 72°) in the circumferential direction, and the second back surface magnet portions 32 that are located between corresponding the first back surface magnet portions 31 that are adjacent in the circumferential direction. The first back surface magnet portions 31 and the second back surface magnet portions 32 are alternately arranged at an interval of 36° in the circumferential direction.

As illustrated in FIGS. 4, 5, and 6, each of the first back surface magnet portions 31 is arcuate and has a constant width in the radial direction. The width of the each of the first back surface magnet portions 31 in the radial direction is substantially equal to the value of the interval between the first core fixed surface 22c and the outer circumferential surface 23b of the second core base 23. An outer radial surface of each first back surface magnet portion 31 defines a first magnet fixed surface 31a fixed to the first core fixed surface 22c by the adhesive 41. The first magnet fixed surface 31a is arcuate and has substantially the same curvature as the first core fixed surface 22c. The inner radial surface of the first back surface magnet portion 31 is arcuate and has substantially the same curvature as the outer circumferential surface 23b of the second core base 23. Each of the first back surface magnet portions 31 has one circumferential end (end in counterclockwise direction as viewed in FIG. 4) formed integrally with an first interpolar magnet portion 33 and another circumferential end (end in clockwise direction as viewed in FIG. 4) formed integrally with the second interpolar magnet portion 34.

Each of the second back surface magnet portions 32 is identical in shape to the first back surface magnet portion 31. The first back surface magnet portion 31 is formed on one axial side (lower side as viewed in FIG. 4) of the first and second interpolar magnet portions 33 and 34, and the second back surface magnet portion 32 is formed on the other axial side (upper side as viewed in FIG. 4) of the first and second interpolar magnet portions 33 and 34. An outer radial surface of each second back surface magnet portions 32 defines a second magnet fixed surface 32a fixed to the second core fixed surface 24c by the adhesive 41. The second magnet fixed surface 32a is arcuate and has substantially the same curvature as the second core fixed surface 24c.

The first back surface magnet portion 31 is magnetized so that the region facing the first core fixed surface 22c of the first claw pole 22 serves as the N pole, which is the same as the first claw pole 22, and the region facing the outer circumferential surface 23b of the second core base 23 serves as the S pole, which is the same as the second core base 23. The second back surface magnet portion 32 is magnetized so that the region facing the second core fixed surface 24c of the second claw pole 24 serves as the S pole, which is the same as the second claw pole 24, and the region facing the outer circumferential surface 21b of the first core base 21 serves as the N pole, which is the same as the first core base 21.

As illustrated in FIGS. 4 to 7, the first and second interpolar magnet portions 33 and 34 are each located between the first and second claw poles 22 and 24 that are adjacent to each other in the circumferential direction. More specifically, the first interpolar magnet portion 33 is located between one circumferential end surface 22e (counterclockwise end surface as viewed in FIG. 6) of a first claw pole 22 and the other circumferential end surface 24e (clockwise end surface as viewed in FIG. 6) of a second claw pole 24. The second interpolar magnet portion 34 is located between the other circumferential end surface 22f (clockwise end surface as viewed in FIG. 6) of a first claw pole 22 and one circumferential end surface 24f (counterclockwise end surface as viewed in FIG. 6) of a second claw pole 24.

The first interpolar magnet portion 33 is post-like and has a sectoral cross-section in a direction orthogonal to the axial direction. The first interpolar magnet portion 33 has a circumferential width that is substantially the same as the interval between one circumferential end surface 22e of the first claw pole 22 and the other circumferential end surface 24e of the second claw pole 24. The first interpolar magnet portion 33 has substantially the same radial width as the first claw pole 22. The first interpolar magnet portion 33 has the same axial length as the first claw pole 22. The radially outer surfaces of the first interpolar magnet portions 33 and the radially outer surfaces of the first and second claw poles 22 and 24 lie along the same circle extending about the rotation axis of the rotor 11, as viewed in the axial direction. The second interpolar magnet portion 34 is identical in shape to the first interpolar magnet portion 33. The first and second interpolar magnet portions 33 and 34 are magnetized in the circumferential direction so that the surfaces of the first and second claw poles 22 and 24 have the same polarity as the opposing first and second interpolar magnet portions 33 and 34. More specifically, the first and second interpolar magnet portions 33 and 34 are each magnetized in the circumferential direction so that the region closer to the first claw pole 22 serves as the N pole and the region closer to the second claw pole 24 serves as the S pole.

As illustrated in FIG. 1, a sensor magnet 52 is fixed to the rotation shaft 14 by a disk-shaped sensor magnet holder 51. The sensor magnet holder 51 is fitted and fixed to the outer portion of the rotation shaft 14 between the bearing 13 and the first rotor core 15. The sensor magnet holder 51 has an outer diameter that is smaller than that of the first rotor core 15 and larger than that of the first core base 21. The sensor magnet 52 is annular and extends along the outer circumferential portion of the sensor magnet holder 51. The sensor magnet 52 faces the first claw poles 22 in the axial direction with the sensor magnet holder 51 located in between. The sensor magnet 52 is magnetized so that the N and the S poles are alternately arranged in the circumferential direction.

The end plate 4 includes a Hall IC 53 that faces the sensor magnet 52 in the axial direction and serves as a magnetic sensor. When detecting a magnetic field of the N pole and a magnetic field of the S pole with the sensor magnet 52, the Hall IC 53 provides the control circuit S with a detection signal having an H level and a detection signal having an L level, respectively.

The operation of the first embodiment will now be described.

When the control circuit S supplies three-phase driving current to the coils 8, the stator 5 generates a rotating magnetic field that drives and rotates the rotor 11. Here, rotation of the sensor magnet 52, which faces the Hall IC 53, switches the level of the detection signal output from the Hall IC 53, in accordance with the rotational angle (position) of the rotor 11. The control circuit S supplies, the coils 8 with three-phase driving current switched at optimum timings in accordance with the detection signal. This generates the rotating magnetic field in a desirable manner, and the rotor 11 is continuously rotated and driven in a desirable manner.

As illustrated in FIGS. 2, 5, and 6, in the motor 1, the first and second rotor cores 15 and 16 of the rotor 11 are fixed to the commutator magnet 18 by the adhesive 41. More specifically, the first core fixed surface 22c of the first claw pole 22 and the first magnet fixed surface 31a of the first back surface magnet portion 31 are fixed to each other by the adhesive 41. Further, the second core fixed surface 24c of the second claw pole 24 and the second magnet fixed surface 32a of the second back surface magnet portion 32 are fixed to each other by the adhesive 41.

When adhering and fixing the first core fixed surface 22c and the first magnet fixed surface 31a to each other, the adhesive 41 is applied to the first core fixed surface 22c. Then, the first core fixed surface 22c is bonded with the first magnet fixed surface 31a. The first core fixed surface 22c includes the first collection recess 22d. This allows the adhesive 41 between the first core fixed surface 22c and the first magnet fixed surface 31a to enter the first collection recess 22d. The adhesive 41 may be applied to the first magnet fixed surface 31a or to both of the first core fixed surface 22c and the first magnet fixed surface 31a.

In the same manner, when adhering and fixing the second core fixed surface 24c and the second magnet fixed surface 32a to each other, the adhesive 41 is applied is to the second magnet fixed surface 32a. Then, the second core fixed surface 24c is bonded with the second magnet fixed surface 32a. The second core fixed surface 24c includes the second collection recess 24d. This allows the adhesive 41 between the second core fixed surface 24c and the second magnet fixed surface 32a to enter the second collection recess 24d. The adhesive 41 may be applied to the second magnet fixed surface 32a or to both of the second core fixed surface 24c and the second magnet fixed surface 32a.

When the adhesive 41 solidifies, the adhesive 41 fixes the first core fixed surface 22c and the first magnet fixed surface 31a to each other and the second core fixed surface 24c and the second magnet fixed surface 32a to each other. Thus, the adhesive 41 fixes the first and second rotor cores 15 and 16 to the commutator magnet 18.

The advantages of the first embodiment will now be described.

(1) The first and second rotor cores 15 and 16 are fixed to the commutator magnet 18 by the adhesive 41, and the first core fixed surface 22c includes the first collection recess 22d. Thus, when the first core fixed surface 22c and the first magnet fixed surface 31a are bonded and fixed to each other, the adhesive 41 between the first core fixed surface 22c and the first magnet fixed surface 31a is allowed to enter the first collection recess 22d. The second core fixed surface 24c includes the second collection recess 24d. Thus, when the second core fixed surface 24c and the second magnet fixed surface 32a are bonded and fixed to each other, the adhesive 41 between the second core fixed surface 24c and the second magnet fixed surface 32a is allowed to enter the second collection recess 24d. This reduces leakage of the adhesive 41 from between the first core fixed surface 22c and the first magnet fixed surface 31a that are fixed to each other and from between the second core fixed surface 24c and the second magnet fixed surface 32a that are fixed to each other. Thus, the adhesive 41 applied to the first core fixed surface 22c is more likely to remain between the first core fixed surface 22c and the first magnet fixed surface 31a. Further, the adhesive 41 applied to the second core fixed surface 24c is more likely to remain between the second core fixed surface 24c and the second magnet fixed surface 32a. This allows the adhesive 41 to be fixed by the commutator magnet 18 in a desirable manner.

(2) The first collection recess 22d and the second collection recess 24d are each simply shaped as a groove extending in the axial direction. This facilitates the formation of the first collection recess 22d and the second collection recess 24d in the first core fixed surface 22c and the second core fixed surface 24c, respectively. The first collection recess 22d extends from one end to the other end of the first core fixed surface 22c in the axial direction. Thus, the adhesive 41 is allowed to enter the first collection recess 22d from any axial position on the first core fixed surface 22c. In the same manner, the second collection recess 24d extends from one end to the other end of the second core fixed surface 24c in the axial direction. Thus, the adhesive 41 is allowed to enter the second collection recess 24d from any axial position on the second core fixed surface 24c. This reduces leakage of the adhesive 41 from between the first core fixed surface 22c and the first magnet fixed surface 31a, which are fixed to each other, and from between the second core fixed surface 24c and the second magnet fixed surface 32a, which are fixed to each other. Thus, the adhesive 41 applied to the first core fixed surface 22c is further likely to remain between the first core fixed surface 22c and the first magnet fixed surface 31a, and the adhesive 41 applied to the second core fixed surface 24c is further likely to remain between the second core fixed surface 24c and the second magnet fixed surface 32a. This allows the commutator magnet 18 to be fixed by the adhesive 41 in a desirable manner.

(3) The adhesive 41 allows the commutator magnet 18 to be easily fixed to the first and second rotor cores 15 and 16.

Second Embodiment

A motor according to a second embodiment will now be described. In the second embodiment, same reference numerals are given to those components that are the same as the corresponding components of the first embodiment. Such components will not be described.

Figure 8:
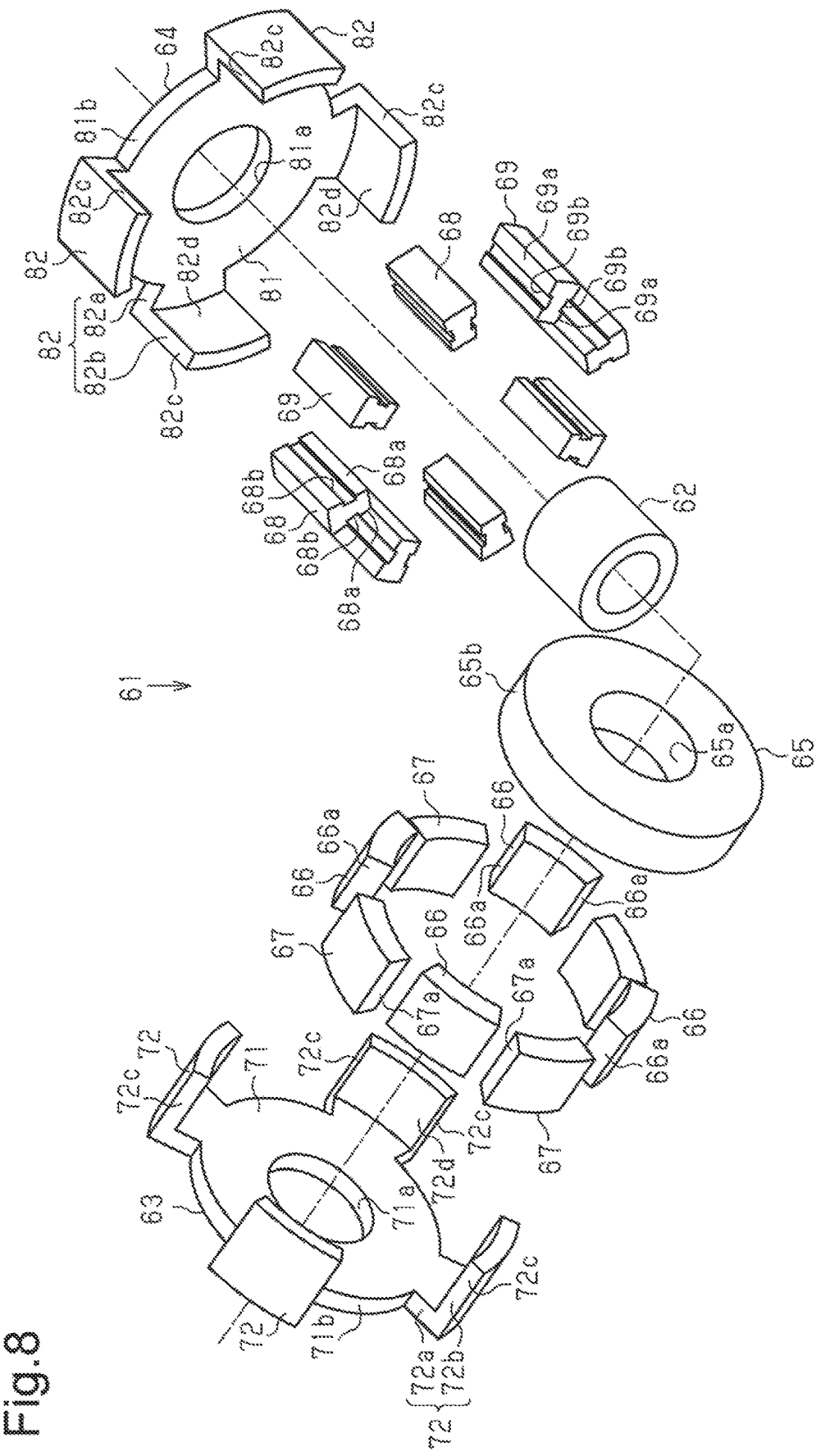
FIG. 8 is an exploded perspective view of a rotor according to a second embodiment of the present invention.
Figure 9A:
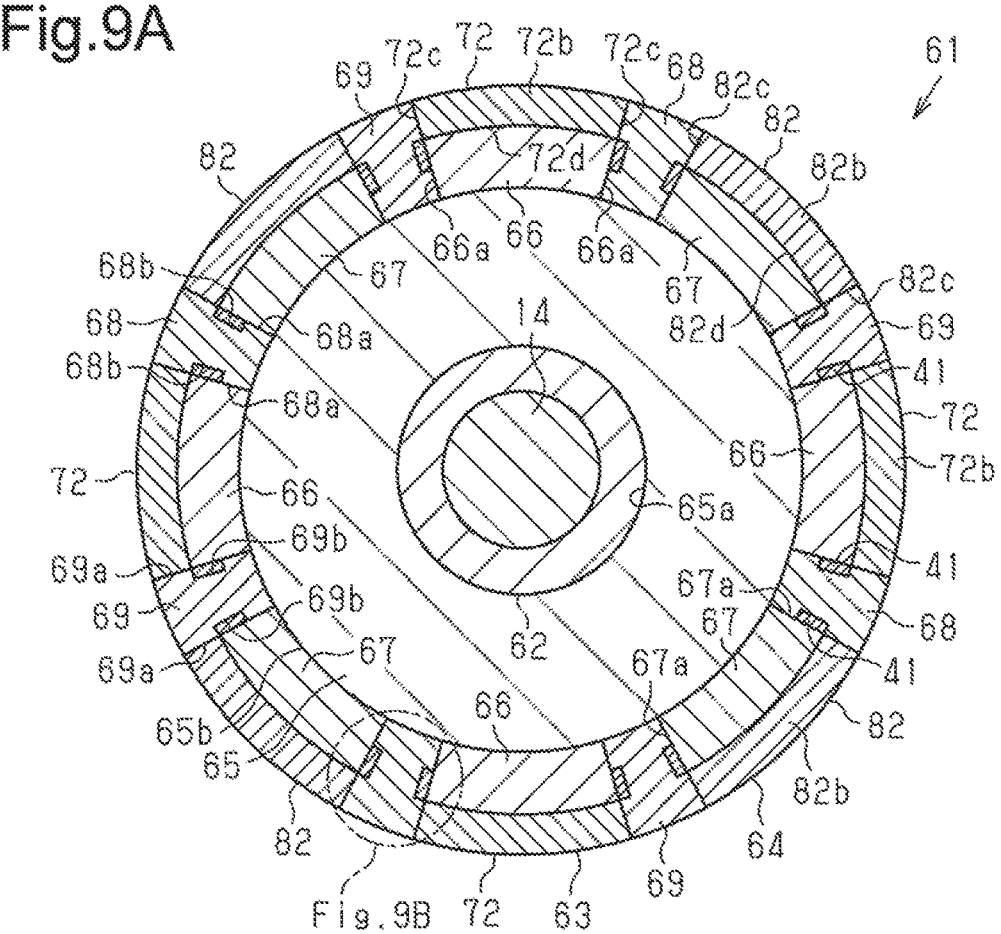
FIGS. 9A and 9B are cross-sectional views of the rotor illustrated in FIG. 8.

A rotor 61 of the second embodiment, illustrated in FIGS. 8 and 9A, is used instead of the rotor 11 of the first embodiment in the motor 1.

The rotor 61 includes a cylindrical fixed cylinder 62 fixed to the rotation shaft 14, first and second rotor cores 63 and 64 that are fixed to the fixed cylinder 62, a field magnet 65 located between the first and second rotor cores 63 and 64, and first and second back surface magnets 66 and 67 and first and second interpolar magnets 68 and 69 that are located on an outer circumference of the field magnet 65.

The first rotor core 63, which is formed by a magnetic steel plate of a soft magnetic material, includes a disk-shaped first core base 71 and a plurality of (four in the present embodiment) first claw poles 72 that are arranged in the circumferential direction on an outer circumferential portion of the first core base 71. A through hole 71a, into which the fixed cylinder 62 is inserted and fixed, extends through a radially central portion of the first core base 71. The four first claw poles 72 are arranged at equal intervals (interval of 90°) in the circumferential direction on the outer circumferential portion of the first core base 71.

The first claw poles 72 each include a first radially extending portion 72a, which extends outward in the radial direction from the outer circumferential portion of the first core base 71, and a first axially extending portion 72b, which projects toward one axial side from a distal end (outer end in radial direction) of the first radially extending portion 72a. The first radially extending portion 72a has a sectoral shape as viewed in the axial direction and widens in the circumferential direction toward the outer side in the radial direction. The first axially extending portion 72b has a sectoral cross-section in a direction orthogonal to the axial direction with a circumferential width that increases in the radial direction. The radially outer surface of each first axially extending portion 72b is arcuate and extends about the first rotation axis of the rotor 61, as viewed in the axial direction. The radially inner surfaces of the four first axially extending portions 72b are arcuate and lie along the same circle extending about the rotation axis of the rotor 61, as viewed in the axial direction. The two circumferential end surfaces of each first claw pole 72 define first core fixed surfaces 72c fixed to a first interpolar magnet 68 or a second interpolar magnet 69 by an adhesive 41. Each of the first core fixed surfaces 72c is planar and extends in the radial direction parallel to the axial direction. The first claw poles 72 are each symmetrical in shape with respect to a plane that extends through a circumferentially central portion and is orthogonal to the circumferential direction.

The second rotor core 64, which is identical in shape to the first rotor core 63, includes a second core base 81 and a plurality of (four in the present embodiment) second claw poles 82 that are arranged in the circumferential direction on an outer circumferential portion of the second core base 81. The second core base 81 includes a through hole 81a, in which the fixed cylinder 62 is inserted and fixed, and is identical in shape to the first core base 71 including the through hole 71a. Each of the second claw poles 82 includes a second radially extending portion 82a and a second axially extending portion 82b. The second claw poles 82 are identical in shape to the first claw poles 72, each including the first radially extending portion 72a and the first axially extending portion 72b. The circumferential end surfaces of each second claw pole 82 define second core fixed surfaces 82c fixed to a first interpolar magnet 68 or a second interpolar magnet 69 by the adhesive 41. Each of the second core fixed surfaces 82c is planar and extends in the radial direction parallel to the axial direction like the first core fixed surface 72c.

The fixed cylinder 62 is press-fitted in the through holes 71a and 81a to fix the first rotor core 63 and the second rotor core 64 to the fixed cylinder 62 with an interval maintained in between in the axial direction. The fixed cylinder 62 is fitted and fixed to the outer side of the rotation shaft 14. The first rotor core 63 and the second rotor core 64 are fixed to the rotation shaft 14 by the fixed cylinder 62. The first and second rotor cores 63 and 64 are fixed to the fixed cylinder 62, and the field magnet 65 is held between the first rotor core 63 and the second rotor core 64. The first rotor core 63 and the second rotor core 64 are fixed to the fixed cylinder 62 stacked upon each other in the axial direction, with distal ends of the first and second axially extending portions 72b and 82b thereof facing the directions opposite to each other. The second claw poles 82 are located between the adjacent first claw poles 72 in the circumferential direction. The first axially extending portions 72b and the second axially extending portions 82b of the first and second rotor cores 63 and 64, which are fixed to the fixed cylinder 62, are alternately arranged in the circumferential direction at equal intervals (interval of 45°).

When the first and second rotor cores 63 and 64 are coupled to each other, the first core base 71 and the second core base 81 are parallel to each other. Further, the field magnet 65 is located between the first core base 71 and the second core base 81. For example, the field magnet 65 is a disk-shaped permanent magnet and formed by a neodymium magnet. A through hole 65a, in which the fixed cylinder 62 is inserted, extends through a radially central portion of the field magnet 65. The field magnet 65 has one axial end surface (left end surface in FIG. 8) and another axial end surface (a right surface in FIG. 8) that are respectively in contact with the first core base 71 and the second core base 81. The field magnet 65 is held and fixed between the first core base 71 and the second core base 81. The field magnet 65 has the same outer diameter as the core bases 71 and 81.

The field magnet 65 is magnetized in the axial direction so that the first claw pole 72 functions as the N pole and the second claw pole 82 functions as the S pole. More specifically, the field magnet 65 is magnetized in the axial direction so that a portion closer to the first core base 71 serves as the N pole and a portion closer to the second core base 81 serves as the S pole. Consequently, the first and second claw poles 72 and 82 function as different magnetic poles in the circumferential direction. As described above, the rotor 61 in the present embodiment is a Lundell rotor that uses the field magnet 65. The rotor 61 includes the four first claw poles 72, each serving as the N pole, and the four second claw poles 82, each serving as the S pole, that are alternately arranged in the circumferential direction. Thus, the rotor 61 includes a total of eight poles (four magnetic pole pairs).

The first back surface magnets 66 are located between back surfaces 72d (i.e., radially inner surfaces of first claw poles 72) of the corresponding first claw poles 72 of the first rotor core 63 and an outer circumferential surface 81b of the second core base 81 and an outer circumferential surface 65b of the field magnet 65. The second back surface magnets 67 are located between back surfaces 82d (i.e., radially inner surfaces of second claw poles 82) of the corresponding second claw poles 82 of the second rotor core 64 and the outer circumferential surface 71b of the first core base 71 and the outer circumferential surface 65b of the field magnet 65. Thus, in the rotor 61, the first back surface magnets 66 are located at four positions arranged at equal intervals (interval of 90°) in the circumferential direction. The second back surface magnets 67 are located between adjacent first back surface magnets 66 in the circumferential direction. The first back surface magnets 66 and the second back surface magnets 67 are alternately arranged at intervals of 45° in the circumferential direction.

Each first back surface magnet 66 has a sectoral shape and a constant radial width as viewed in the axial direction. The radial width of the first back surface magnet 66 has substantially the same value as the interval between the back surface 72d of the first claw pole 72 and the outer circumferential surface 81b of the second core base 81. A radially outer surface of the first back surface magnet 66, which is arcuate and has substantially the same curvature as the back surface 72d of the first claw pole 72, is in contact with the back surface 72d of the corresponding first claw pole 72. A radially inner surface of the first back surface magnet 66, which is arcuate and has substantially the same curvature as the outer circumferential surface 81b of the second core base 81, is in contact with the outer circumferential surface 81b of the second core base 81 and the outer circumferential surface 65b of the field magnet 65. The first back surface magnet 66 has an axial length that is substantially the same as the sum of the axial lengths of the second core base 81 and the field magnet 65. The first back surface magnet 66 has one axial end surface (left end surface in FIG. 8) in contact with the first radially extending portion 72a and another axial end surface (the right end surface in FIG. 8) positioned on the same plane as a distal end surface of the first axially extending portion 72b in the axial direction. The first back surface magnet 66 has substantially the same circumferential width as the first radially extending portion 72a. The first back surface magnet 66 has two circumferential end surfaces defining first back surface magnet fixed surfaces 66a that are fixed to a first interpolar magnet 68 or a second interpolar magnet 69 by the adhesive 41. The first back surface magnet fixed surfaces 66a are planar and extend in the radial direction parallel to the axial direction. The first back surface magnet fixed surfaces 66a defined by the two circumferential sides of the first back surface magnet 66 are located on the same planes as the first core fixed surfaces 72c defined by the two circumferential ends of the first claw pole 72.

The first back surface magnet 66 is magnetized so that the part opposing the back surface 72d of the first claw pole 72 serves as the N pole, which is the same polarity as the first claw pole 72, and the part in contact with the outer circumferential surface 81b of the second core base 81 serves as the S pole, which is the same polarity as the second core base 81.

The second back surface magnets 67 are identical in shape to the first back surface magnets 66. A radially outer surface of each of the second back surface magnets 67 is in contact with the back surface 82d of the corresponding second claw pole 82. A radially inner surface of the second back surface magnets 67 is in contact with the outer circumferential surface 71b of the first core base 71 and the outer circumferential surface 65b of the field magnet 65. The second back surface magnet 67 has one axial end surface (right end surface in FIG. 8) in contact with the second radially extending portion 82a and another axial end surface (left end surface in FIG. 8) located on the same plane as the distal end surface of the second axially extending portion 82b in the axial direction. The second back surface magnet 67 has two circumferential end surfaces defining second back surface magnet fixed surfaces 67a that are fixed to the first interpolar magnet 68 or the second interpolar magnet 69 by the adhesive 41. The second back surface magnet fixed surfaces 67a at the two circumferential sides of the second back surface magnet 67 are located on the same planes as the second core fixed surfaces 82c at the two circumferential ends of the corresponding second claw pole 82.

The second back surface magnet 67 is magnetized so that the portion opposing the back surface 82d of the second claw pole 82 serves as the S pole, which is the same polarity as the second claw pole 82, and the portion opposing the outer circumferential surface 71b of the first core base 71 serves as the N pole, which is the same polarity as the first core base 71.

The first and second interpolar magnets 68 and 69 are each located between the first claw pole 72 and the second claw pole 82 that are adjacent in the circumferential direction.

The first interpolar magnet 68 is located between the first back surface magnet 66 and the second back surface magnet 67 that are adjacent in the circumferential direction. Further, the first interpolar magnet 68 is located between one first core fixed surface 72c (clockwise end surface as viewed in FIG. 9A) of a first claw pole 72 and one second core fixed surface 82c (counterclockwise end surface as viewed in FIG. 9A) of a second claw pole 82. The first interpolar magnet 68 is post-like and has a sectoral cross-section orthogonal to the axial direction. The first interpolar magnet 68 has a circumferential width that is substantially the same as the interval between one first core fixed surface 72c of the first claw pole 72 and one second core fixed surface 82c of the second claw pole 82. The first interpolar magnet 68 has substantially the same radial width as the first claw pole 72. The first interpolar magnet 68 has the same axial length as the first claw pole 72. A radially outer surface of the first interpolar magnet 68 and radially outer surfaces of the first and second claw poles 72 and 82 lie along the same circle extending about the rotation axis of the rotor 61, as viewed in the axial direction.

Figure 9B:
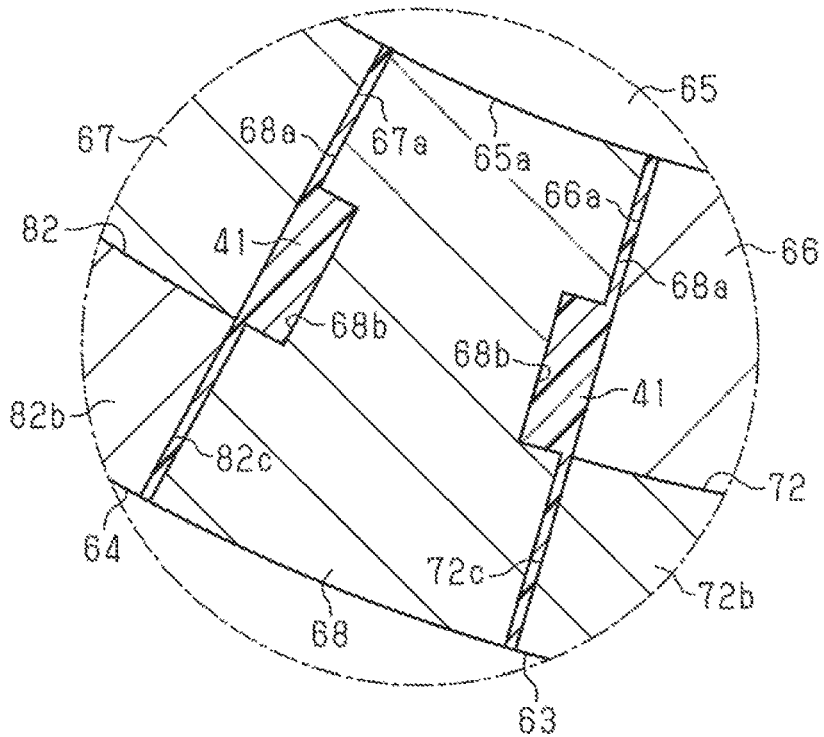

As illustrated in FIG. 9B, the first interpolar magnet 68 has two circumferential end surfaces defining first interpolar magnet fixed surfaces 68a fixed to the first back surface magnet 66 or the second back surface magnet 67 by the adhesive 41. Each of the first interpolar magnet fixed surfaces 68a is planar and extends in the radial direction and parallel to the axial direction. Each of the first interpolar magnet fixed surface 68a includes a first collection recess 68b. The first collection recess 68b is located in a radially central portion of the corresponding first interpolar magnet fixed surface 68a. Further, the first collection recess 68b has the form of a groove extending in the axial direction. The first collection recess 68b extends over the first interpolar magnet fixed surface 68a from one end to the other end of in the axial direction. The first collection recess 68b has a rectangular cross-sectional shape and a constant circumferential width. The cross-sectional shape is uniform from one end to the other end of the first collection recess 68b in the axial direction. The first collection recess 68b is open at one circumferential side and two axial sides.

As illustrated in FIGS. 8 and 9A, the second interpolar magnet 69 is identical in shape to the first interpolar magnet 68. The second interpolar magnet 69 is located between the first back surface magnet 66 and the second back surface magnet 67 that are adjacent in the circumferential direction. Further, the second interpolar magnet 69 is located between the one first core fixed surface 72c of the first claw pole 72 (counterclockwise end surface as viewed in FIG. 9A) and one second core fixed surface 82c of the second claw pole 82 (counterclockwise end surface as viewed in FIG. 9A). The second interpolar magnet 69 has two circumferential end surfaces defining second interpolar magnet fixed surfaces 69a fixed to the first back surface magnet 66 or the second back surface magnet 67 by the adhesive 41. The second interpolar magnet fixed surface 69a includes a second collection recess 69b having the same shape as the first collection recess 68b.

The first and second interpolar magnets 68 and 69 are magnetized in the circumferential direction so that the opposing surfaces of the first and second claw poles 72 and 82 and the first and second interpolar magnets 68 and 69 have the same polarity. More specifically, the first and second interpolar magnets 68 and 69 are magnetized in the circumferential direction so that the portion closer to the first claw pole 72 serves as the N pole and the portion closer to the second claw pole 82 serves as the S pole.

The operation of the second embodiment will now be described.

As illustrated in FIGS. 9A and 9B, the four first back surface magnets 66, the four second back surface magnets 67, the four first interpolar magnets 68, and the four second interpolar magnets 69 are arranged on the outer circumference of the field magnet 65 in an annular form as a whole surrounding the outer circumference of the field magnet 65. Circumferentially adjacent ones of the four first back surface magnets 66, the four second back surface magnets 67, the four first interpolar magnets 68, and the four second interpolar magnets 69 are fixed to each other by the adhesive 41.

More specifically, the adhesive 41 fixes the first interpolar magnet fixed surface 68*a* at the other circumferential side (distal end side in counterclockwise direction as viewed in FIG. 9) of the first interpolar magnet 68 to the first back surface magnet fixed surface 66*a* at one circumferential side (distal end side in clockwise direction as viewed in FIG. 9) of the first back surface magnet 66 and the first core fixed surface 72*c* at one circumferential side (distal end side in clockwise direction as viewed in FIG. 9) of the first claw pole 72. When adhering and fixing the first interpolar magnet 68 to the first back surface magnet 66 and the first claw pole 72, which are adjacent to the first interpolar magnet 68 in the circumferential direction, the adhesive 41 is applied to the first interpolar magnet fixed surface 68*a*. The adhesive 41 may be applied to the first core fixed surface 72*c* and the first back surface magnet fixed surface 66*a*. Alternatively, the adhesive 41 may be applied to every one of the first interpolar magnet fixed surface 68*a*, the first core fixed surface 72*c*, and the first back surface magnet fixed surface 66*a*. Then, the first interpolar magnet fixed surface 68*a* is placed upon the first back surface magnet fixed surface 66*a* and the first core fixed surface 72*c* that oppose the first interpolar magnet fixed surface 68*a* in the circumferential direction. The first interpolar magnet fixed surface 68*a* includes the first collection recess 68*b*. Thus, the adhesive 41 between the first back surface magnet fixed surface 66*a* and the first core fixed surface 72*c* and the first interpolar magnet fixed surface 68*a* can enter the first collection recess 68*b*. When the adhesive 41 solidifies, the adhesive 41 fixes the first interpolar magnet fixed surface 68*a* to the first core fixed surface 72*c* and the first back surface magnet fixed surface 66*a*, which are opposed to the first interpolar magnet fixed surface 68*a* in the circumferential direction. Thus, the adhesive 41 fixes the first interpolar magnet 68 to the first back surface magnet 66 and the first claw pole 72, which are arranged in the circumferential direction.

In the same manner, the adhesive 41 fixes the first interpolar magnet fixed surface 68*a* at one circumferential side (distal end side in clockwise direction as viewed in FIG. 9) of the first interpolar magnet 68 to the second back surface magnet fixed surface 67*a* at the other circumferential side (distal end side in counterclockwise direction as viewed in FIG. 9) of the second back surface magnet 67 and the second core fixed surface 82*c* at the other circumferential side (distal end in the counterclockwise direction in FIG. 9A) of the second claw pole 82.

In the same manner, the adhesive 41 fixes the second interpolar magnet fixed surface 69*a* at one circumferential side (distal end side in clockwise direction as viewed in FIG. 9A) of the second interpolar magnet 69 to the first back surface magnet fixed surface 66*a* at the other circumferential side (distal end side in counterclockwise direction as viewed in FIG. 9A) of the first back surface magnet 66 and the first core fixed surface 72*c* at the other circumferential side (distal end side in counterclockwise direction as viewed in FIG. 9A) of the first claw pole 72.

In the same manner, the adhesive 41 fixes the second interpolar magnet fixed surface 69*a* at the other circumferential side (distal end side in counterclockwise direction as viewed in FIG. 9A) of the second interpolar magnet 69 to the second back surface magnet fixed surface 67*a* at one circumferential side (distal end side in clockwise direction as viewed in FIG. 9A) of the second back surface magnet 67 and second core fixed surfaces 82*c* at one circumferential side (distal end side in clockwise direction as viewed in FIG. 9A) of the second claw pole 82.

The second embodiment has the following advantages in addition to advantage (2) of the first embodiment.

(4) The adhesive 41 fixes the circumferentially adjacent ones of the four first back surface magnets 66, the four second back surface magnets 67, the four first interpolar magnets 68, and the four second interpolar magnets 69. Each first interpolar magnet fixed surface 68*a* includes the first collection recess 68*b*. Thus, when the first interpolar magnet fixed surface 68*a* is placed on and fixed to the first back surface magnet fixed surface 66*a* and the first core fixed surface 72*c*, the adhesive 41 located in between enters the first collection recess 68*b*. When the first interpolar magnet fixed surface 68*a* is placed on and fixed to the second back surface magnet fixed surface 67*a* and the second core fixed surface 82*c*, the adhesive 41 enters the first collection recess 68*b*. In the same manner, each second interpolar magnet fixed surface 69*a* includes the second collection recess 69*b*. Thus, when the second interpolar magnet fixed surface 69*a* is placed on and fixed to the first back surface magnet fixed surface 66*a* and the first core fixed surface 72*c*, the adhesive 41 located in between enters the second collection recess 69*b*. When the second interpolar magnet fixed surface 69*a* is placed on and fixed to the second back surface magnet fixed surface 67*a* and the second core fixed surface 82*c*, the adhesive 41 located in between enters the second collection recess 69*b*. This limits the leakage of the adhesive 41 from between the first interpolar magnet fixed surface 68*a* and the first back surface magnet fixed surface 66*a* and the first core fixed surface 72*c* that are fixed to each other and from between the first interpolar magnet fixed surface 68*a* and the second back surface magnet fixed surface 67*a* and second core fixed surface 82*c* that are fixed to each other. Further, leakage of the adhesive 41 from between the second interpolar magnet fixed surface 69*a* and the first back surface magnet fixed surface 66*a* and first core fixed surface 72*c* that are fixed to each other and from between the second interpolar magnet fixed surface 69*a* and the second back surface magnet fixed surface 67*a* and second core fixed surface 82*c* that are fixed to each other. Thus, the adhesive 41 applied to the first interpolar magnet fixed surface 68*a* is apt to remain between the first interpolar magnet fixed surface 68*a* and the first back surface magnet fixed surfaces 66*a* or the second back surface magnet fixed surfaces 67*a* opposed to each other in the circumferential direction and between the first interpolar magnet fixed surface 68*a* and the first core fixed surface 72*c* or the second core fixed surface 82*c* opposed to each other in the circumferential direction. Further, the adhesive 41 applied to the second interpolar magnet fixed surface 69*a* is apt to remain between the second interpolar magnet fixed surface 69*a* and the first back surface magnet fixed surfaces 66*a* or the second back surface magnet fixed surfaces 67a opposed to each other in the circumferential direction, and between the second interpolar magnet fixed surface 69a and the first core fixed surface 72c or the second core fixed surface 82c opposed to each other in the circumferential direction. As a result, the first and second back surface magnets 66 and 67 and the first and second interpolar magnets 68 and 69 are fixed in a desirable manner by the adhesive 41.

(5) Further, the circumferentially adjacent ones of the first back surface magnets 66, the second back surface magnets 67, the first interpolar magnets 68, and the second interpolar magnets 69 are easily fixed to each other by the adhesive 41. The first and second interpolar magnets 68 and 69 and the first and second rotor cores 63 and 64 are easily fixed to each other by the adhesive 41.

The first and second embodiments may be modified as follows.

In the first embodiment, the first collection recess 22d is in the form of a groove extending in the axial direction from one axial end to the other axial end of the first core fixed surface 22c. However, the form of the first collection recess 22d is not limited in such a manner. For example, the first collection recess 22d may be shorter than the first core fixed surface 22c in the axial direction. The first collection recess 22d may have the form of a groove extending in the circumferential direction in the first core fixed surface 22c. The form of the first collection recess 22d is not limited to a groove and may be a semispherical, cubic, pyramidal, or conical recess. A plurality of the first collection recesses 22d may be formed in each first core fixed surface 22c. The same applies to the second collection recess 24d of the second core fixed surface 24c.

The first collection recess 68b and the second collection recess 69b in the second embodiment are also not limited to the forms of the second embodiment. For example, the first collection recess 68b and the second collection recess 69b may be a groove that is shorter than the first interpolar magnet fixed surface 68a and the second interpolar magnet fixed surface 69a in the axial direction or may be a groove extending in the radial direction. The first collection recess 68b and the second collection recess 69b may be a semispherical, cubic, pyramidal, or conical recess. The first interpolar magnet fixed surface 68a may include a plurality of first collection recesses 68b, and the second interpolar magnet fixed surface 69a may include a plurality of second collection recesses 69b.

Figure 10:
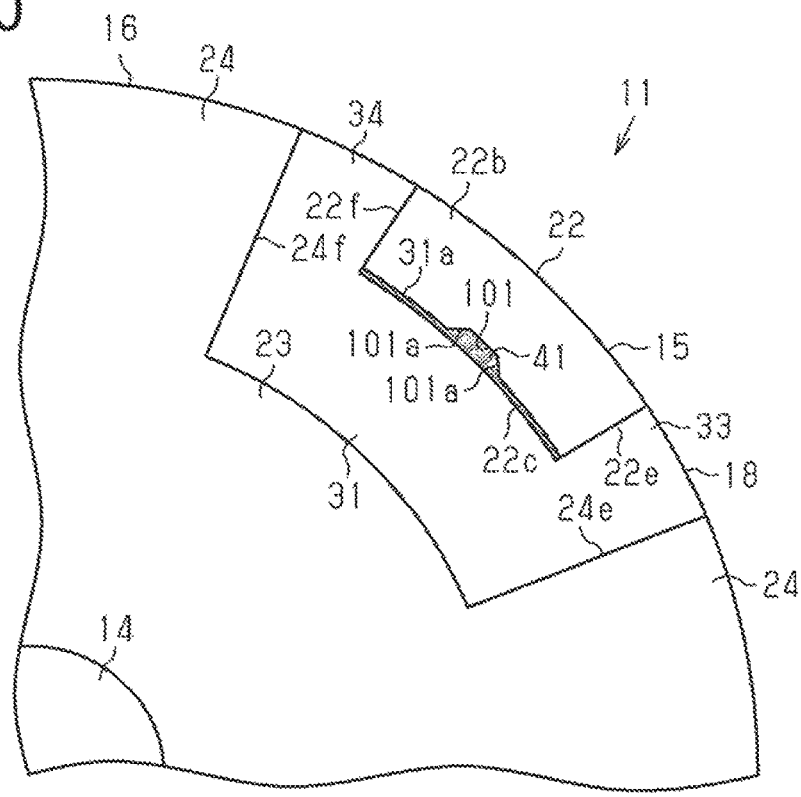
FIG. 10 is a partially enlarged view of a rotor in a modification of the first embodiment.

As illustrated in FIG. 10, the first core fixed surface 22c may include a first collection recess 101 instead of the first collection recess 22d in the first embodiment. The first collection recess 101 has the form of a groove that extends in the axial direction and opens at the side of the first magnet fixed surface 31a (radially inner side as viewed in FIG. 10). The first collection recess 101 has an inner circumferential surface including inclined surfaces 101a that extend continuously from the two circumferential ends of the first collection recess 101 in the first core fixed surface 22c and are inclined relative to the first core fixed surface 22c. The angle is obtuse between each inclined surfaces 101a and the first core fixed surface 22c where the first core fixed surface 22c is fixed to the first magnet fixed surface 31a. The inclined surfaces 101a in the inner circumferential surface of the first collection recess 101 allows the adhesive 41 between the first core fixed surface 22c and the first magnet fixed surface 31a, which are fixed to each other, to enter the first collection recess 101. This further limits the leakage of the adhesive 41 from between the first core fixed surface 22c and the first magnet fixed surface 31a, which are fixed to each other. Thus, the adhesive 41 applied to the first core fixed surface 22c or the first magnet fixed surface 31a is apt to remain between the first core fixed surface 22c and the first magnet fixed surface 31a. This fixes the commutator magnet 18 in a further desirable manner with the adhesive 41.

The same advantage may be obtained by forming the first collection recess 101 with two inclined surfaces 101a so that the first collection recess 101 has a V-shaped cross-sectional in a direction orthogonal to the axial direction and opens toward the first magnet fixed surface 31a. The inner circumferential surface of the first collection recess 101 may be formed to have the inclined surfaces 101a only on one of the ends in the circumferential direction. The second collection recess 24d of the second core fixed surface 24c, may have the same shape as the first collection recess 101. The inner circumferential surface of the first collection recess 68b in the second embodiment may be an inclined surface that extends continuously from the first interpolar magnet fixed surface 68a and is inclined relative to the first interpolar magnet fixed surface 68a. In the same manner, the inner circumferential surface of the second collection recess 69b of the second embodiment may be an inclined surface that extends continuously from the second interpolar magnet fixed surface 69a and is inclined relative to the second interpolar magnet fixed surface 69a.

Figure 11:
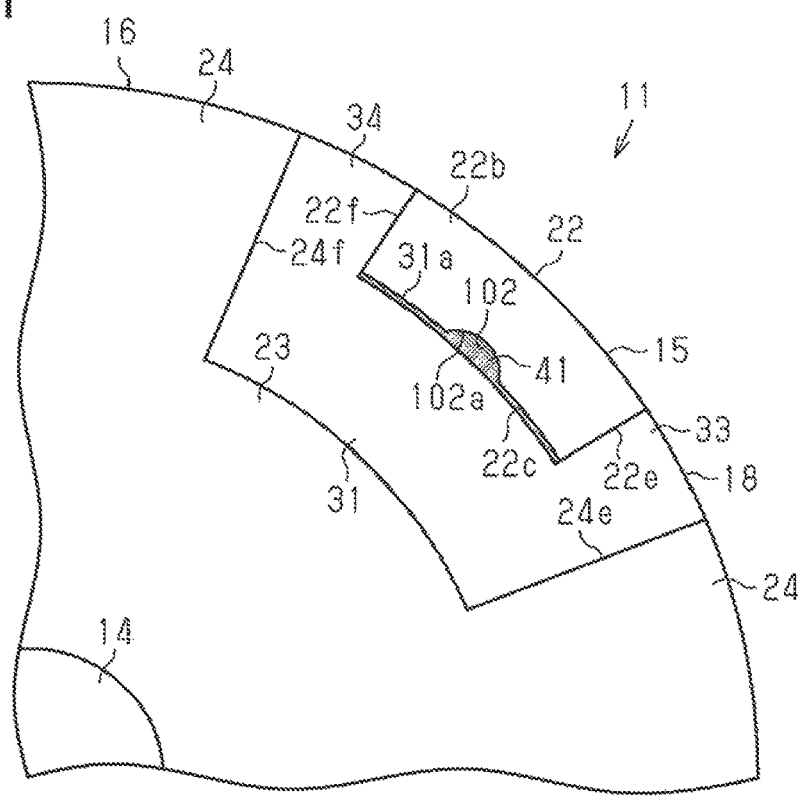
FIG. 11 is a partially enlarged view of a rotor in a modification of the first embodiment.

As illustrated in FIG. 11, the first core fixed surface 22c may include a first collection recess 102 instead of the first collection recess 22d in the first embodiment. The first collection recess 102 has the form of a groove that extends in the axial direction and opens toward the first magnet fixed surface 31a (radially inner side as viewed in FIG. 11). The inner circumferential surface of the first collection recess 102 is an arcuate surface 102a that extends continuously from the first core fixed surface 22c and is curved to be arcuate. The angle is obtuse between the arcuate surface 102a and the first core fixed surface 22c where the first core fixed surface 22c is fixed to the first magnet fixed surface 31a. The arcuate surface 102a in the inner circumferential surface of the first collection recess 102 allows the adhesive 41 between the first core fixed surface 22c and the first magnet fixed surface 31a, which are fixed to each other, to easily enter the first collection recess 102. This limits the leakage of the adhesive 41 from between the first core fixed surface 22c and the first magnet fixed surface 31a, which are fixed to each other. Further, the adhesive 41 applied to the first core fixed surface 22c or the first magnet fixed surface 31a is further apt to remain between the first core fixed surface 22c and the first magnet fixed surface 31a, which are fixed to each other. Thus, the commutator magnet 18 is fixed in a further desirable manner by the adhesive 41.

Figure 12:
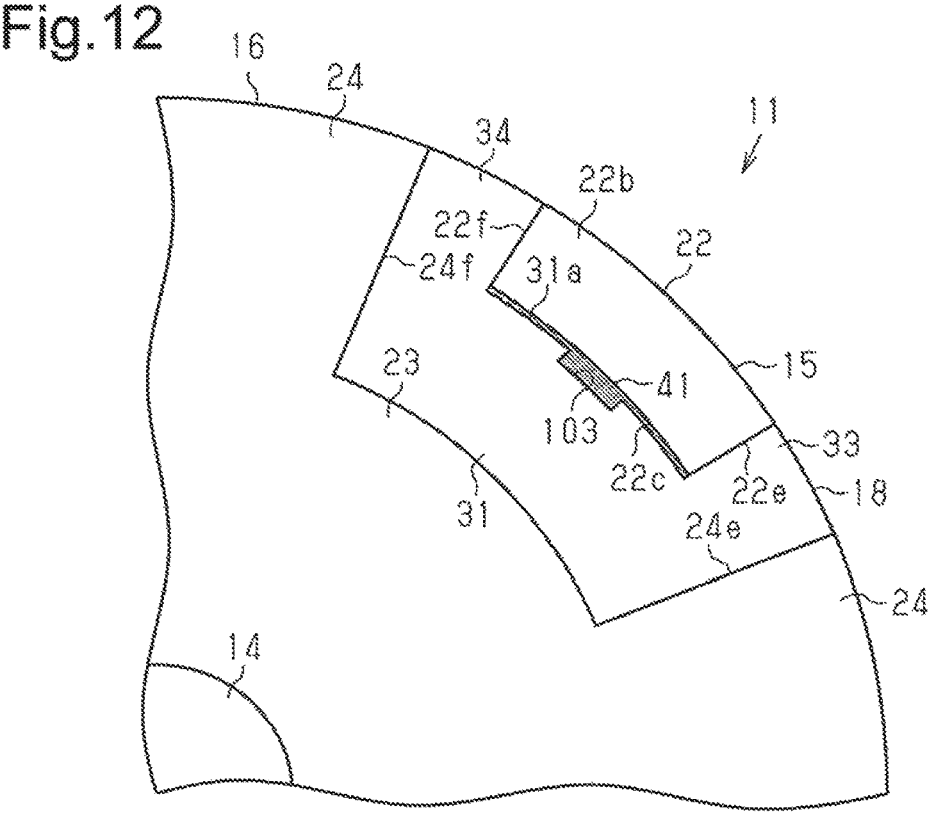
FIG. 12 is a partially enlarged view of a rotor in a modification of the first embodiment.

The inner circumferential surface of the first collection recess 102 may have at least one circumferential end that extends continuously from the first core fixed surface 22c and is curved in an arcuate manner. In this case, the angle is obtuse between the arcuate surface and the first core fixed surface 22c where the first magnet fixed surface 31a is fixed to the first core fixed surface 22c. The second collection recess 24d of the second core fixed surface 24c may have the same shape as the first collection recess 102. The inner circumferential surface of the first collection recess 68b in the second embodiment may be an arcuate surface that extends continuously from the first interpolar magnet fixed surface 68a and is curved to be arcuate. In the same manner, the inner circumferential surface of the second collection recess 69b in the second embodiment may be an arcuate surface that extends continuously from the second interpolar magnet fixed surface 69a and is curved to be arcuate In the first embodiment, the first rotor core 15 includes the first collection recess 22d, and the second rotor core 16 includes the second collection recess 24d. However, the commutator magnet 18 may include a collection recess. For example, as illustrated in FIG. 12, the first magnet fixed surface 31a may include a collection recess 103 that has the same shape as the first collection recess 22d in the first embodiment and is open toward the first core fixed surface 22c.

In the second embodiment, the first core fixed surface 72c and the second core fixed surface 82c may include a collection recess. Further, the first back surface magnet fixed surface 66a and the second back surface magnet fixed surface 67a may include a collection recess.

In the rotor 61 of the second embodiment, the back surface 72d of the first claw pole 72 may be fixed to the first back surface magnet 66 by the adhesive 41. In this case, the back surface 72d and the radially outer surface of the first back surface magnet 66 serve as fixed surfaces that are fixed to each other by the adhesive 41. A collection recess is included in at least one of the back surface 72d and the radially outer surface of the first back surface magnet 66. In the same manner, the back surface 82d of the second claw pole 82 may be fixed to the second back surface magnet 67 by the adhesive 41. In this case, the back surface 82d and the radially outer surface of the second back surface magnet 67 serve as fixed surfaces fixed to each other by the adhesive 41. A collection recess is included in at least one of the back surface 82d and the radially outer surface of the second back surface magnet 67.

Figure 13:
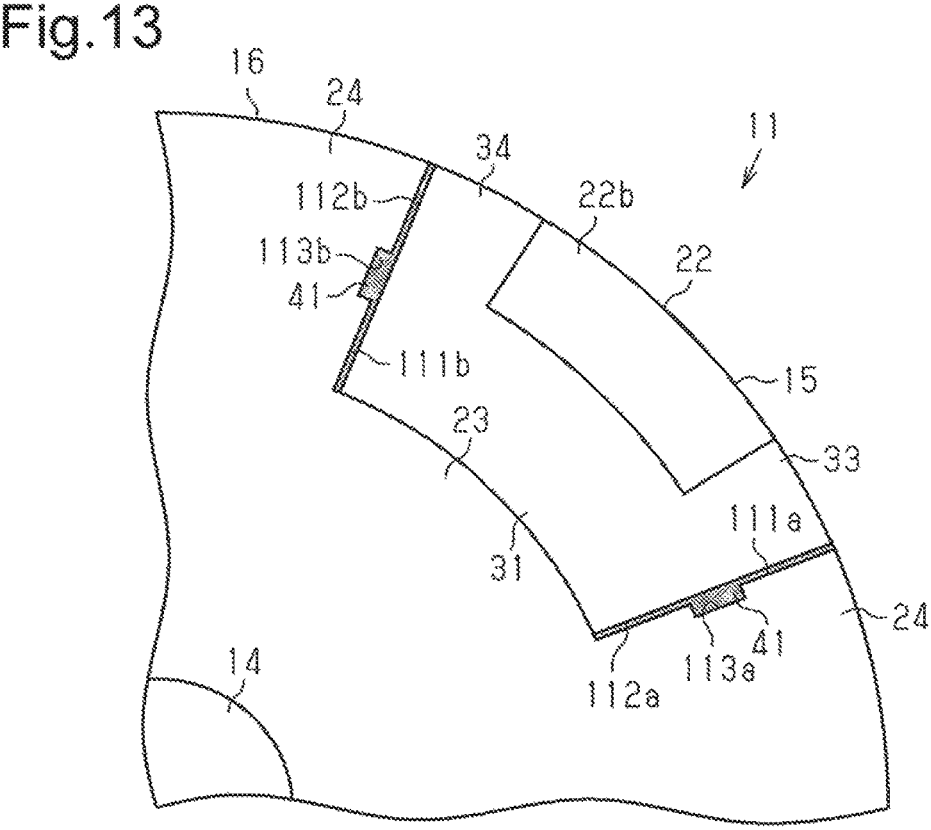
FIG. 13 is a partially enlarged view of a rotor in a modification of the first embodiment.

The location where the first and second rotor cores 15 and 16 are fixed to the commutator magnet 18 by the adhesive 41 is not limited to that of the first embodiment. For example, in an example illustrated in FIG. 13, the second claw pole 24 has one circumferential end surface (end surface in counterclockwise direction as viewed in FIG. 13) that defines a fixed core surface 111a, fixed to the first interpolar magnet portion 33. The first interpolar magnet portion 33 has the other circumferential end surface (end surface in clockwise direction as viewed in FIG. 13) that defines a fixed magnet surface 112a fixed to the fixed core surface 111a. The fixed core surface 111a includes a collection recess 113a that is open toward the fixed magnet surface 112a. The fixed core surface 111a and the fixed magnet surface 112a are fixed to each other by the adhesive 41. The second claw pole 24 has another circumferential end surface (end surface in the clockwise direction as viewed in FIG. 13) that defines a fixed core surface 111b fixed to the second interpolar magnet portion 34. The second interpolar magnet portion 34 has another circumferential end surface (end surface in the counterclockwise direction as viewed in FIG. 13) that defines a fixed magnet surface 112b fixed to the fixed core surface 111b. The fixed core surface 111b includes a collection recess 113b that is open toward the fixed magnet surface 112b. The fixed core surface 111b and the fixed magnet surface 112b are fixed to each other by the adhesive 41.

In the second embodiment, the first and second rotor cores 63 and 64 and the first and second interpolar magnets 68 and 69 are fixed to each other by the adhesive 41. However, the first and second rotor cores 63 and 64 and the first and second interpolar magnets 68 and 69 do not necessarily have to be fixed to each other. In such a case, circumferentially adjacent ones of the first and second back surface magnets 66 and 67 and the first and second interpolar magnets 68 and 69 are fixed to each other by the adhesive 41. The first interpolar magnet fixed surface 68a includes a first collection recess 68b. Thus, when the first interpolar magnet fixed surface 68a and the first back surface magnet fixed surface 66a are placed upon and fixed to each other, the adhesive 41 in between enters the first collection recess 68b. When the first interpolar magnet fixed surface 68a and the second back surface magnet fixed surface 67a are placed upon and fixed to each other, the adhesive 41 can enter the first collection recess 68b. In the same manner, the second interpolar magnet fixed surface 69a includes the second collection recess 69b. Thus, when the second interpolar magnet fixed surface 69a and the first back surface magnet fixed surface 66a are placed upon and fixed to each other, the adhesive 41 in between can enter the second collection recess 69b. When the second interpolar magnet fixed surface 69a and the second back surface magnet fixed surface 67a are placed upon and fixed to each other, the adhesive 41 in between can enter the second collection recess 69b. This limits leakage of the adhesive 41 from between the first interpolar magnet fixed surface 68a and the first back surface magnet fixed surface 66a, which are fixed to each other, and from between the first interpolar magnet fixed surface 68a and the second back surface magnet fixed surface 67a, which are fixed to each other. In the same manner, leakage of the adhesive 41 is limited from between the second interpolar magnet fixed surface 69a and the first back surface magnet fixed surface 66a, which are fixed to each other, and from between the second interpolar magnet fixed surface 69a and the second back surface magnet fixed surface 67a, which are fixed to each other. Thus, the adhesive 41 is apt to remain between the first back surface magnet fixed surface 66a and the first interpolar magnet fixed surface 68a, between the first interpolar magnet fixed surface 68a and the second back surface magnet fixed surface 67a, between the second interpolar magnet fixed surface 69a and the first back surface magnet fixed surface 66a, and between the second interpolar magnet fixed surface 69a and the second back surface magnet fixed surface 67a. As a result, the first and second back surface magnets 66 and 67e and the first and second interpolar magnets 68 and 69 are fixed to each other in a desirable manner by the adhesive 41.

In the first embodiment, the first rotor core 15 and the second rotor core 16 are both fixed to the commutator magnet 18 by the adhesive 41. Alternatively, the adhesive 41 may fix only one of the first rotor core 15 and the second rotor core 16 to the commutator magnet 18.

In the first embodiment, the first rotor core 15 includes the five first claw poles 22, and the second rotor core 16 includes the five second claw poles 24. However, there is no limit to the number of the claw poles 22 and 24 in the first and second rotor cores 15 and 16 are the number may be changed when required. In such a case, the number of the first and second back surface magnet portions 31 and 32 and the number of the first and second interpolar magnet portions 33 and 34 in the commutator magnet 18 are changed in accordance with the number of the claw poles 22 and 24.

In the same manner, in the second embodiment, the number of the first claw poles 72 in the first rotor core 63 and the number of the second claw poles 82 in the second rotor core 64 may be changed when required. In such a case, the numbers of the first and second back surface magnets 66 and 67 and the numbers of the first and second interpolar magnets 68 and 69 are changed in accordance with the numbers of the claw poles 72 and 82. The rotor 61 does not necessarily have to include the first and second back surface magnets 66 and 67.

In the first embodiment, the rotor 11 includes only one pair of the first and second rotor cores 15 and 16. Alternatively, the rotor 11 may include more than one pair of the first and second rotor cores 15 and 16. In such a case, the field magnet 17 is located between the first and second core bases 21 and 23 in each pair of the first and second rotor cores 15 and 16, and the commutator magnet 18 is located on the outer circumference of each field magnet 17. The pairs of the first and second rotor cores 15 and 16 are stacked upon each other in the axial direction. In the same manner, the rotor 61 of the second embodiment may include more than one pair of the first and second rotor cores 63 and 64.

The first embodiment, the second embodiment, and each of the above modifications may be combined.

Third Embodiment

A motor according to a third embodiment will now be described with reference to FIGS. 14 to 18.

Figure 14:
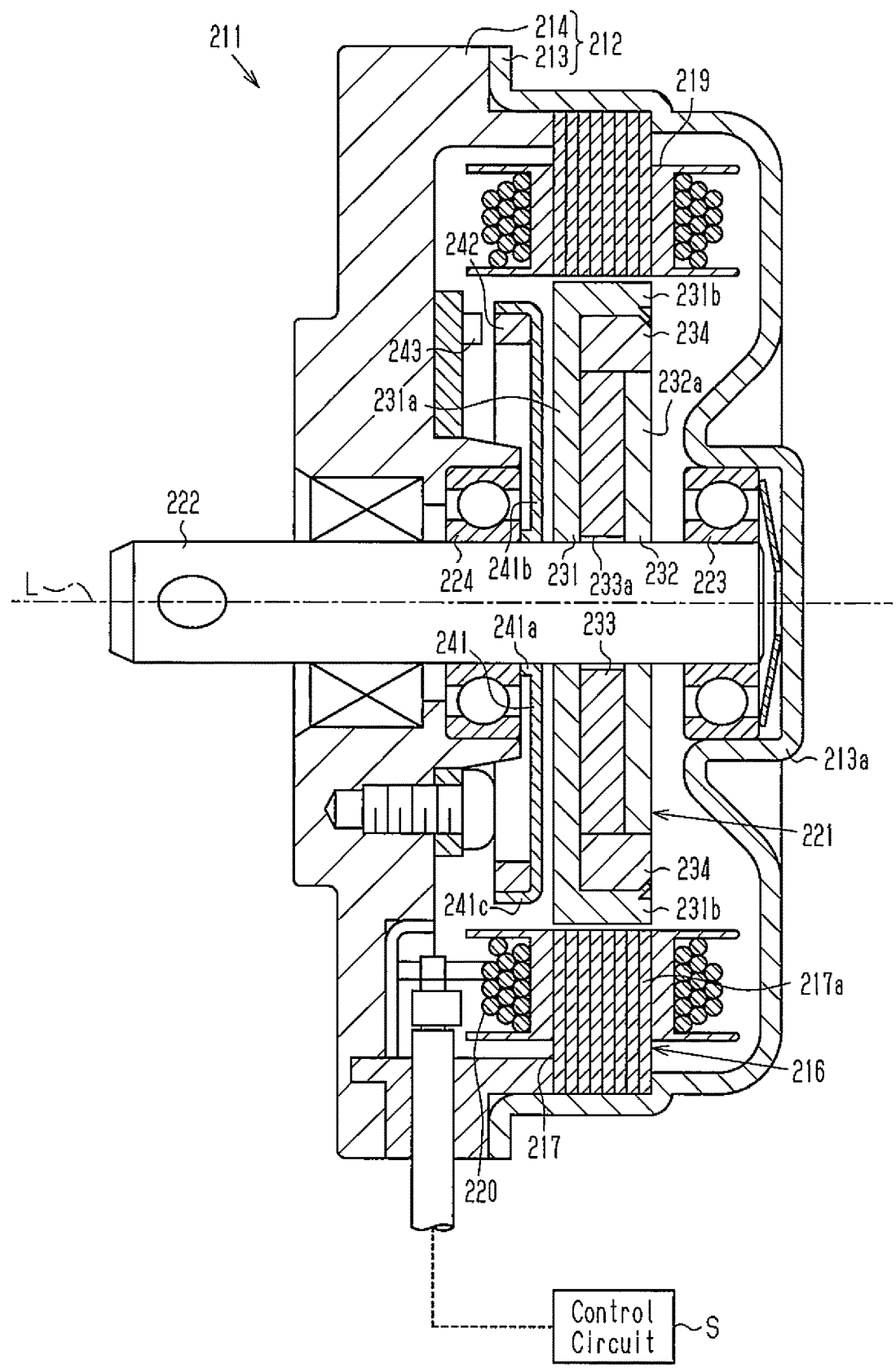
FIG. 14 is a partial cross-sectional view of a motor according to a third embodiment of the present invention.

As illustrated in FIG. 14, a motor casing 212 of a brushless motor 211, serving as the motor, includes a yoke housing 213, which is cylindrical and has a closed end, and an end housing 214, which is a nonmagnetic body formed from an aluminum alloy and closes an opening of the yoke housing 213.

As illustrated in FIG. 14, a stator 216 is fixed to an inner circumferential surface of the yoke housing 213. The stator 216 includes a stator core 217 and coils 220. The stator core 217 includes a plurality of teeth 217a extending inward in a radial direction. The coils 220 are wound around the teeth 217a with an insulator 219 arranged in between. The stator 216 generates a rotating magnetic field when the external control circuit S supplies driving current to the coils 220.

Figure 15:
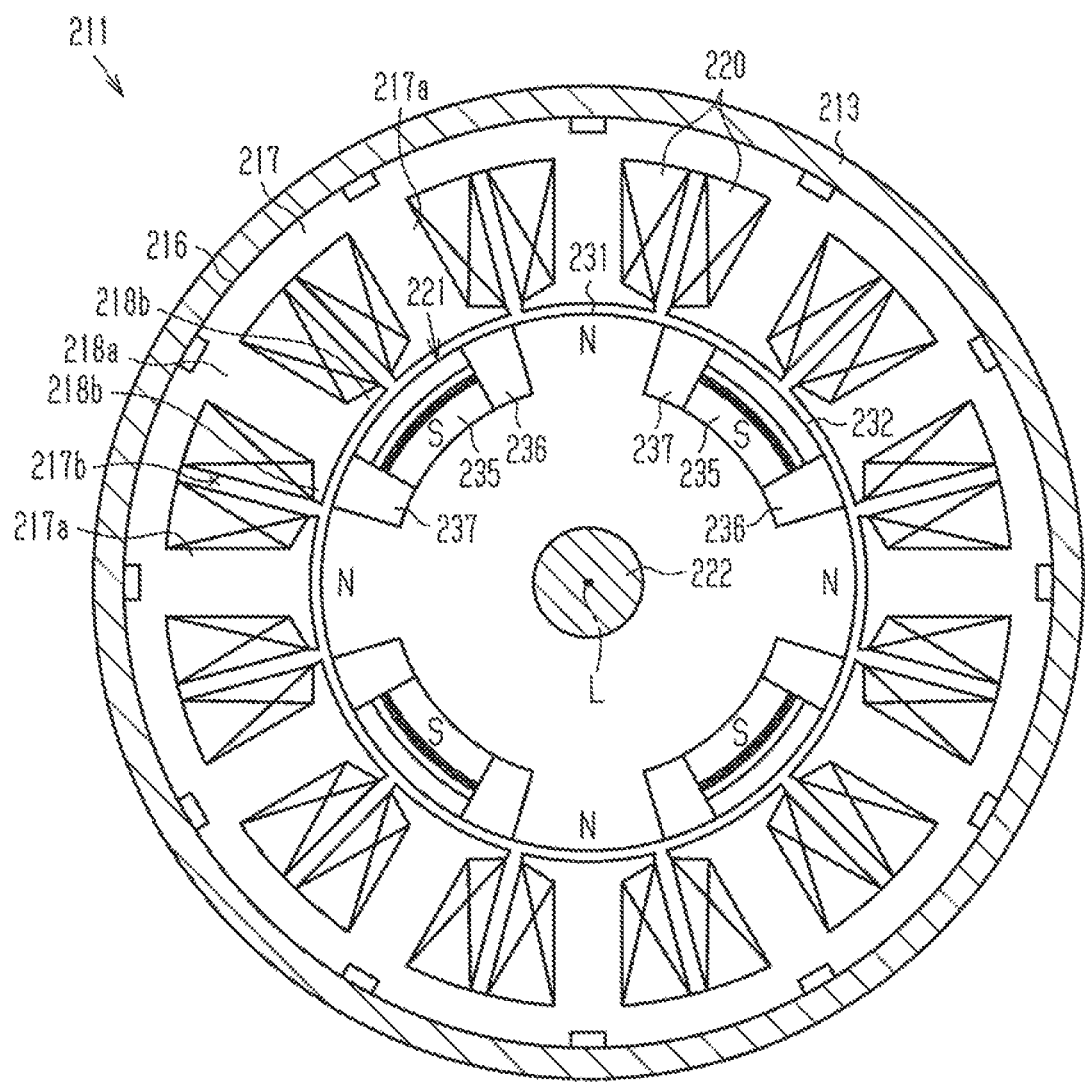
FIG. 15 is a partial cross-sectional view of the motor illustrated in FIG. 14.

As illustrated in FIG. 15, the stator core 217 in the present embodiment includes twelve teeth 217a arranged in the circumferential direction. Accordingly, twelve slots 217b are also formed between adjacent ones of the teeth 217a is 12.

As illustrated in FIG. 15, the teeth 217a each include a winding portion 218a and projections 218b projecting from the radially inner end of the winding portion 218a toward opposite sides in the circumferential direction. Coils 220 of the U, V, and W phases are wound around the winding portions 218a through concentrated winding.

As illustrated in FIG. 14, a rotor 221 of the brushless motor 211 includes a rotation shaft 222 and is located inside the stator 216. The rotation shaft 222 is rotationally supported about an axis L by bearings 223 and 224 (ball bearings). The bearing 223 is supported by the center of a bottom portion 213a of the yoke housing 213, and the bearing 224 is supported by the center of the end housing 214.

Figure 16:
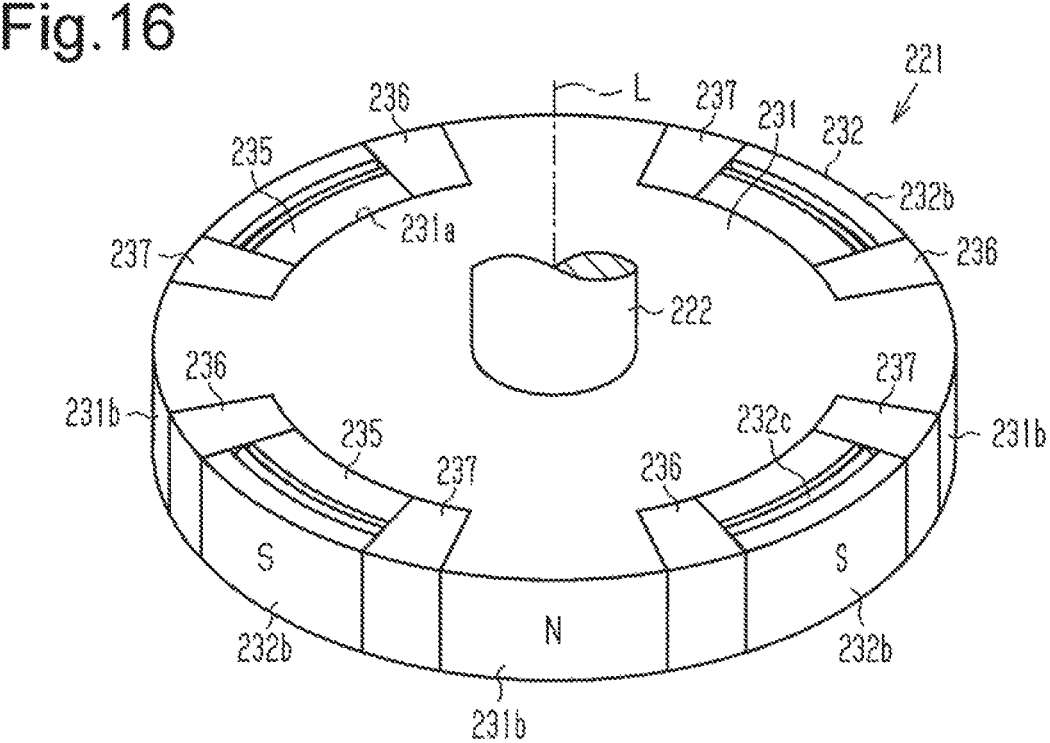
FIG. 16 is a perspective view of a rotor illustrated in FIG. 15.

As illustrated in FIGS. 14 and 16, the rotor 221 includes first and second rotor cores 231 and 232, which are supported by (fixed to) the rotation shaft 222, and an annular field magnet (disk magnet) 233. The rotation shaft 222 is press-fitted into the rotor 221 to maintain the interval between the first and second rotor cores 231 and 232 in the axial direction. The field magnet 233 (disk magnet) located between the first rotor core 231 and the second rotor core 232 in the axial direction. The rotor 221 further includes back surface magnets 234 and 235 and interpolar magnets 236 and 237.

More specifically, the first rotor core 231 includes a plurality of (four in the present embodiment) first claw poles 213b arranged at equal intervals on an outer circumferential portion of the first core base 231a, which is substantially disk-shaped. The first claw poles 213b project outward in the radial direction and extend in the axial direction.

The second rotor core 232, which is identical in shape to the first rotor core 231, includes a plurality of second claw poles 232b arranged at equal intervals on an outer circumferential portion of the second core base 232a, which is substantially disk-shaped. The second claw poles 232b project outward in the radial direction and extend in the axial direction. The first and second rotor cores 231 and 232 have center holes into which the rotation shaft 222 is inserted and press-fitted to that the first and second rotor cores 231 and 232 are fixed to (supported by) the rotation shaft 222. The second rotor core 232 is coupled to the first rotor core 231 so that each second claw pole 232b is located between two first claw poles 213b that are adjacent to each other in the circumferential direction and so that the field magnet 233 is located (held) between the first core base 231a and the second core base 232a in the axial direction, in which the first core base 231a and the second core base 232a are opposed to each other.

The field magnet 233 is a ferrite magnet or a neodymium magnet. The field magnet 233 is annular shape and includes a center hole 233a into which the rotation shaft 222 is inserted formed. The field magnet 233 is magnetized in the axial direction so that each first claw pole 213b functions as a first magnetic pole (the N pole in the present embodiment) and each second claw pole 232b functions as a second magnetic pole (the S pole in the present embodiment). Thus, the rotor 221 in the present embodiment is a Lundell rotor that uses the field magnet 233. The rotor 221 includes the four first claw poles 231b, each serving as the N pole, and the four second claw poles 232b, each serving as the S pole, that are alternately arranged in the circumferential direction. Thus, the rotor 221 includes a total of eight poles (four magnetic pole pairs). In the present embodiment, the number of poles of the rotor 221 is set to "eight," and the number of teeth 217a of the stator 216 is set to "twelve."

The back surface magnet 234, serving as the commutator magnet, is located between the back surface of each first claw pole 231b (a surface on the inner side in the radial direction) and the outer circumferential surface of the second core base 232a. The back surface magnet 234, which has a sectoral cross-section in a direction orthogonal to the axis, and is magnetized so that the portion in contact with the back surface of the first claw pole 231b serves as the N pole, which is the same polarity as the first claw pole 231b, and the portion in contact with the outer circumferential surface of the second core base 232a serves as the S pole, which is the same polarity of the second core base 232a. This limits magnetic flux leakage from these portions.

The back surface magnet 235 is located between the back surface of each second claw pole 232b (a surface on the inner side in the radial direction) and the outer circumferential surface of the first core base 231a, like in the first claw pole 231b. The back surface magnet 235, which has a sectoral cross-section in a direction orthogonal to the axis, is magnetized so that the portion in contact with the back surface of the second claw pole 232b serves as the S pole and the portion in contact with the outer circumferential surface of the first core base 231a serves as the N pole. This limits magnetic flux leakage from these portions.

As illustrated in FIGS. 15 and 16, interpolar magnets 236 and 237 are located between the first claw poles 231b and the second claw poles 232b in the circumferential direction (between the back surface magnets 234 and the back surface magnets 235 in the circumferential direction). The interpolar magnets 236 and 237 are magnetized in the circumferential direction to limit magnetic flux leakage from these portions.

As illustrated in FIG. 14, the rotor 221 includes a sensor magnet 242 held by a magnet holder 241 that is substantially disk-shaped. More specifically, the magnet holder 241 includes a disk portion 241b, which has a boss 241a formed at the center, and a cylindrical portion 241c, which extends from an outer edge of the disk portion 241b. The sensor magnet 242 is annular and adhered to the inner circumferential surface of the cylindrical portion 241c and a surface of the disk portion 241b. The boss 241a is fitted to the rotation shaft 222 to fix the magnet holder 241 to the rotation shaft 222.

The end housing 214 includes a Hall IC 243 that opposes the sensor magnet 242 in the axial direction and serves as a magnetic sensor. When detecting a magnetic field of the N pole and a magnetic field of the S pole of the sensor magnet 242, the Hall IC 243 sends a detection signal having an H level and a detection signal having an L level to the control circuit S, respectively. The control circuit S supplies the driving current to the coil 220 based on the detection signal.

The first and second claw poles 231b and 232b include protrusions 231c and 232c protruding inward in the radial direction to restrict the movement of the back surface magnets 234 and 235 in the axial direction. The protrusions 231c and 232c are formed by arranging the back surface magnets 234 and 235 in the first and second rotor cores 231 and 232 and then pressing the first and second claw poles 231b and 232b in the axial direction.

Figure 17:
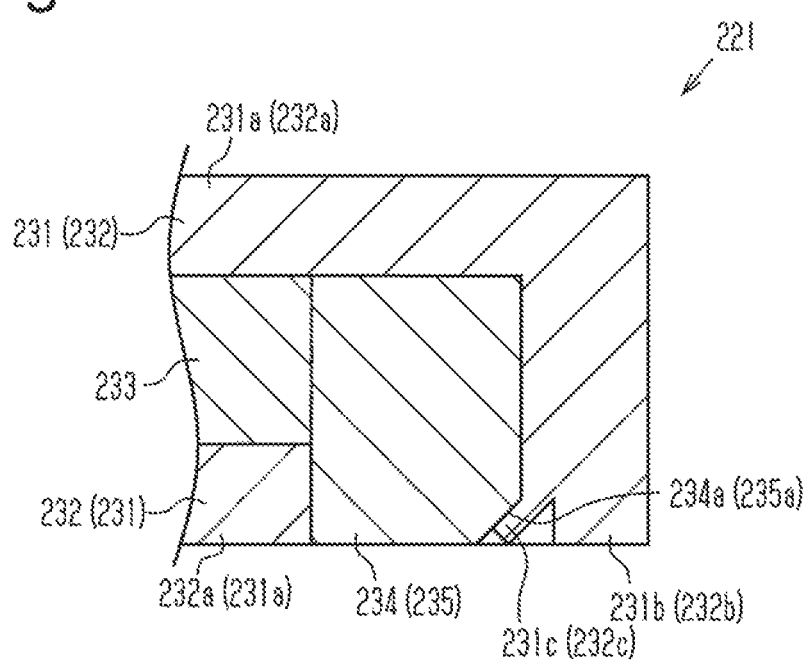
FIG. 17 is a partially enlarged cross-sectional view of the rotor illustrated in FIG. 16.
Figure 18A:
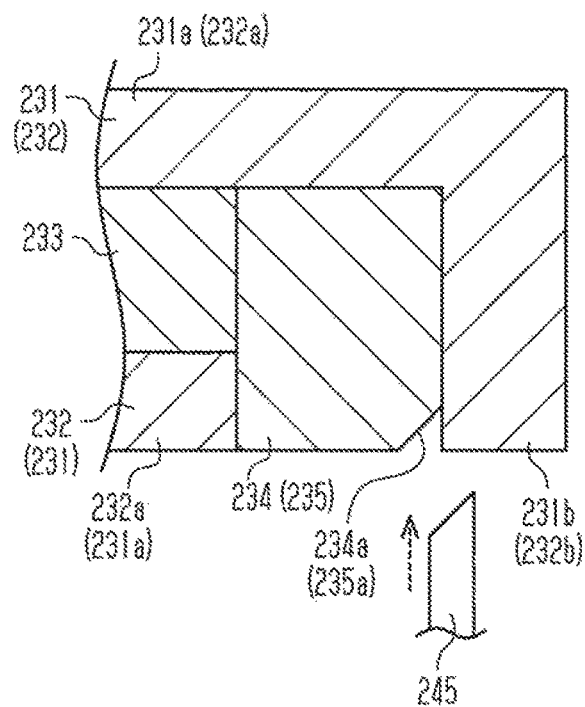
FIGS. 18A and 18B are schematic cross-sectional views showing a method for manufacturing the rotor illustrated in FIG. 16.
Figure 18B:
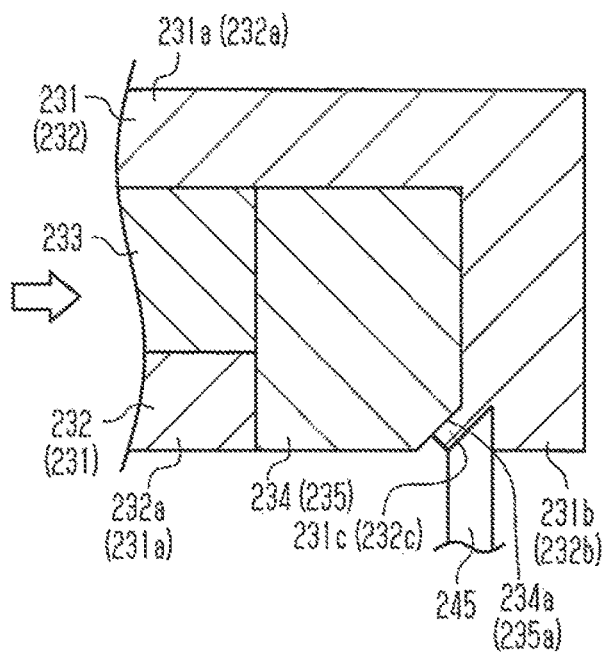

More specifically, as illustrated in FIG. 17, the back surface magnet 234 (235) includes a chamfered portion 234a (235a) at a location corresponding to the protrusion 231c (232c), that is, at the radially outer side of the axial end. The distal end of the first claw pole 231b (second claw pole 232b) includes the protrusion 231c (232c) that projects inward in the radial direction and contacts the chamfered portion 234a. The protrusions 231c and 232c of the present embodiment are located within an axial range in which the first core base 231a and the second core base 232a are located. The protrusion 231c (232c) in the present embodiment is formed by deforming part of the distal end of the first claw pole 231b (second claw pole 232b) with a jig 245 wedged in the axial direction (see FIG. 18B) into the distal end of the first claw pole 231b (second claw pole 232b) that has no protrusion 231c (232c) as illustrated in FIG. 18A. Thus, the protrusions 231c and 232c hold and restrict axial movement of the back surface magnets 234 and 235.

The operation of the brushless motor 211 will now be described.

When the control circuit S supplies three-phase driving current to the coils 220, the stator 216 generates a rotating magnetic field that drives and rotates the rotor 221. Here, rotation of the sensor magnet 242, which opposes the Hall IC 243, switches the level of the detection signal output from the Hall IC 243 in accordance with the rotational angle (position) of the rotor 221. In response to the detection signal, the control circuit S supplies the coils 220 with the three-phase driving current switched at optimum timings. This generates the rotating magnetic field in a desirable manner, and continuously rotates the rotor 221 in a continuous manner.

The advantages of the third embodiment will now be described.

(6) The first and second claw poles 231b and 232b include the protrusions 231c and 232c protruding inward in the radial direction to restrict axial movement of the back surface magnets 234 and 235. Compared with when, for example, restricting axial movement with only an adhesive for example, resistance to high temperatures is increased and the back surface magnets 234 and 235 can be held more firmly. An adhesive is not used as in the present embodiment. This allows the back surface magnets 234 and 235 to be in close contact, minimizes the magnetic gap in between, and limits magnetic flux leakage from the back surface magnets 234 and 235. Since the present embodiment does not use an adhesive, time is not used to dry the adhesive is required. This improves the productivity.

(7) The chamfered portions 234a and 235a are formed on the back surface magnets 234 and 235 at locations corresponding to the protrusions 231c and 232c. This limits cracking of the back surface magnets 234 and 235.

(8) The protrusions 231c and 232c are located within an axial range in which the first core base 231a and the second core base 232a are arranged. Thus, the protrusions 231c and 232c do not protrude in the axial direction, and such portions are not enlarged in the axial direction.

The third embodiment may be modified as follows.

Figure 19:
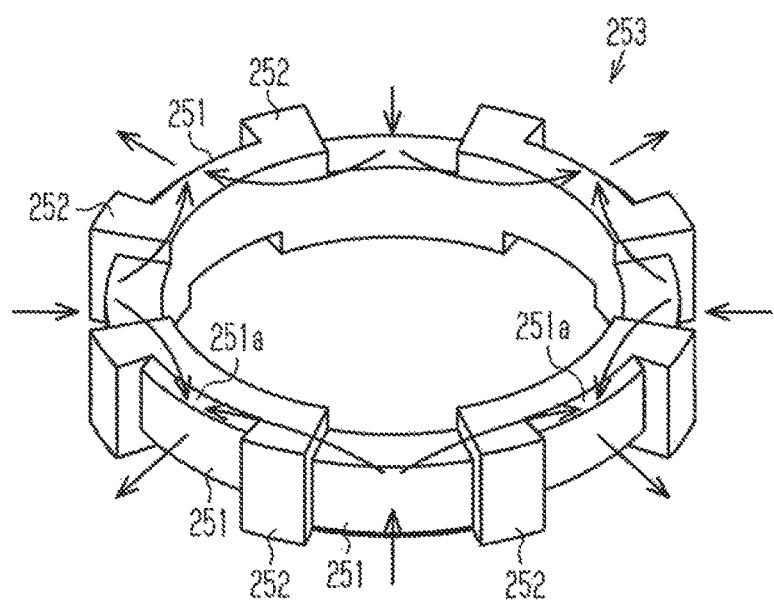
FIG. 19 is a perspective view of an anisotropic magnet in a modification of the third embodiment.

The back surface magnets 234 and 235 and the interpolar magnets 236 and 237 in the third embodiment may be replaced with a polar anisotropic magnet 253 as illustrated in FIG. 19. The polar anisotropic magnet 253 serves as an annular commutator magnet including back surface magnet portions 251, which serve as the back surface magnets, and interpolar magnet portions 252, which serve as the interpolar magnets, are alternately arranged (integrally formed). As schematically shown by the arrows in FIG. 19, the polar anisotropic magnet 253 is oriented from the outer circumferential surface of the back surface magnet portion 251 to the outer circumferential surfaces of the back surface magnet portions 251 that are adjacent in the circumferential direction. Thus, the polar anisotropic magnet 253 is magnetized so that leakage flux is reduced at each of the back surface magnet portions 251 and the interpolar magnet portions 252. In this example, the back surface magnet portions 251 include chamfered portions 251a at locations corresponding to the protrusions 231c and 232c like the embodiments described above. In this configuration, the back surface magnet portions 251 and the interpolar magnet portions 252 are both firmly held by the protrusions 231c and 232c.

Figure 20A:
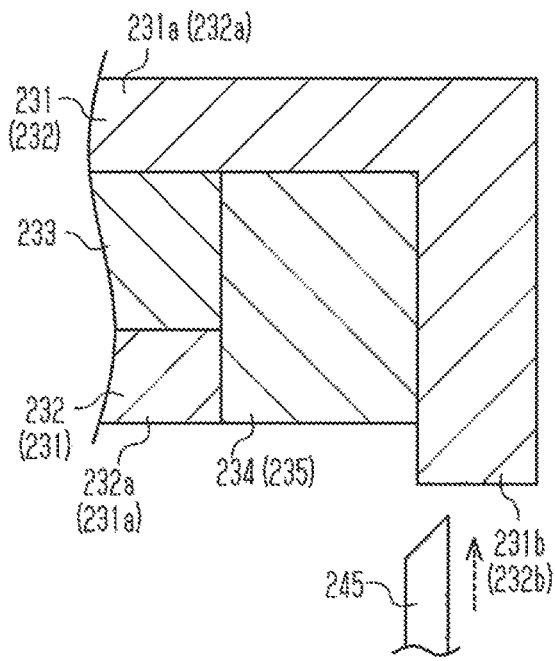
FIGS. 20A and 20B are schematic cross-sectional views showing a method for manufacturing a rotor in a modification of the third embodiment.
Figure 20B:
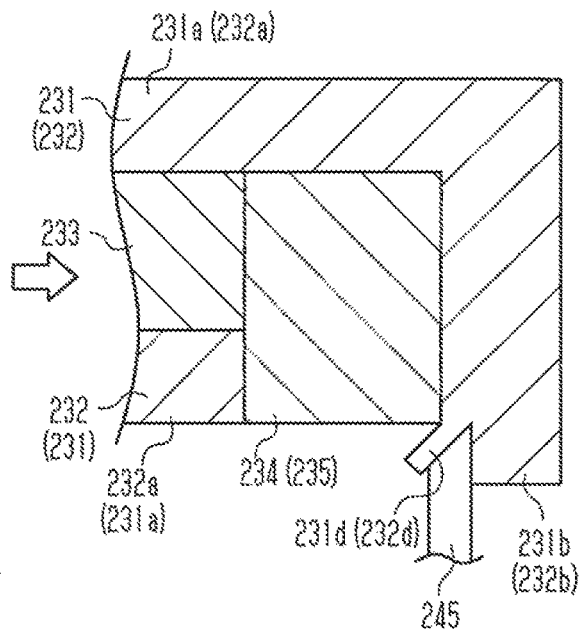

In the third embodiment, the back surface magnets 234 and 235 include the chamfered portions 234a and 235a. Instead, for example, as illustrated in FIGS. 20A and 20B, the chamfered portions 234a and 235a may be omitted. In this example, the first claw pole 231b (second claw pole 232b) has a distal end extending out of the axial range where the first core base 231a and the second core base 232a are arranged. A protrusion 231d (232d) is formed by partially deforming the distal end of the first claw pole 231b (second claw pole 232b) with a jig 245 wedged into the distal end in the axial direction.

Figure 21A:
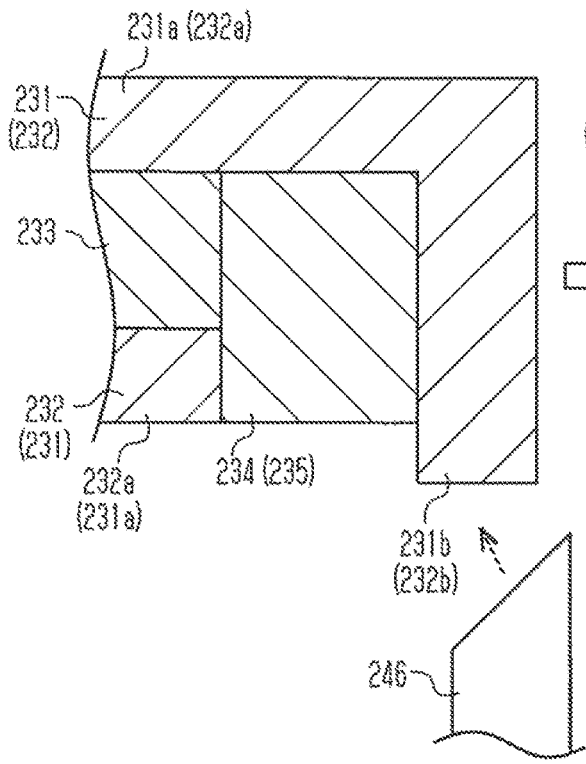
FIGS. 21A and 21B are schematic cross-sectional views showing a method for manufacturing a rotor in a modification of the third embodiment.
Figure 21B:
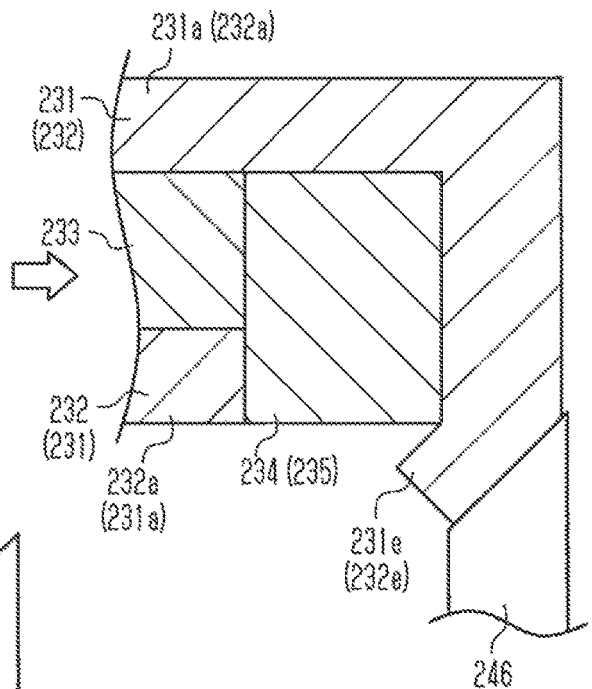

For example, as illustrated in FIGS. 21A and 21B, the entire distal end of the first claw pole 231b (second claw pole 232b) extending out of the axial range where the first core base 231a and the second core base 232a are arranged may be bent (or crushed) with a jig 246 to form a protrusion 231e (232e).

Figure 22A:
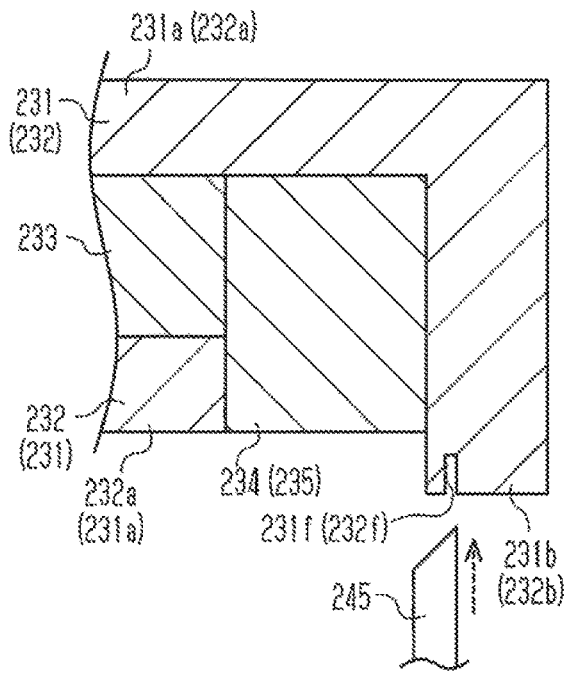
FIGS. 22A and 22B are schematic cross-sectional views showing a method for manufacturing a rotor in a modification of the third embodiment.
Figure 22B:
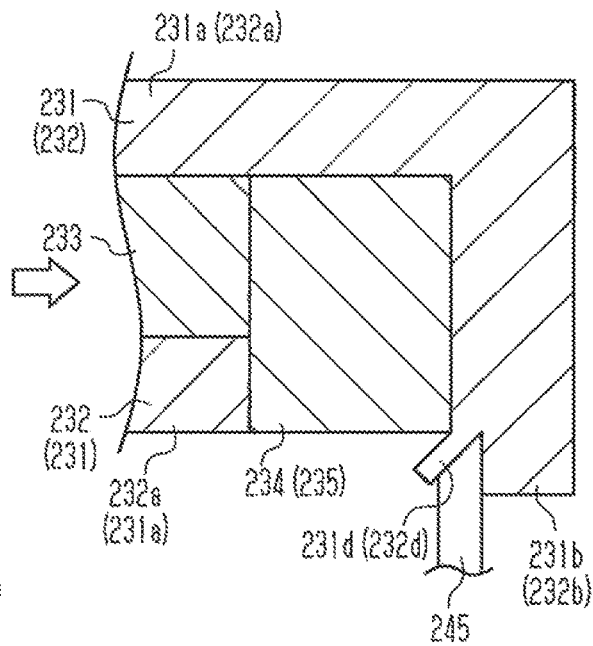

For example, as illustrated in FIGS. 22A and 22B, a slit 231f (232f) may be formed in advance in the distal end of the first claw pole 231b (second claw pole 232b) of the modification described above (see FIGS. 20A and 20B), and the protrusion 231d (232d) may be formed by wedging the jig 245 into the slit 231f (232f).

Figure 23A:
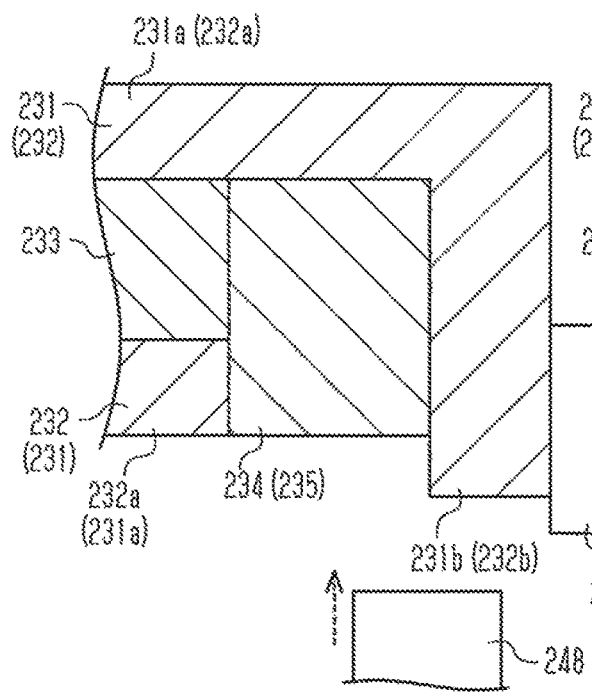
FIGS. 23A and 23B are schematic cross-sectional views showing a method for manufacturing a rotor in a modification of the third embodiment.
Figure 23B:
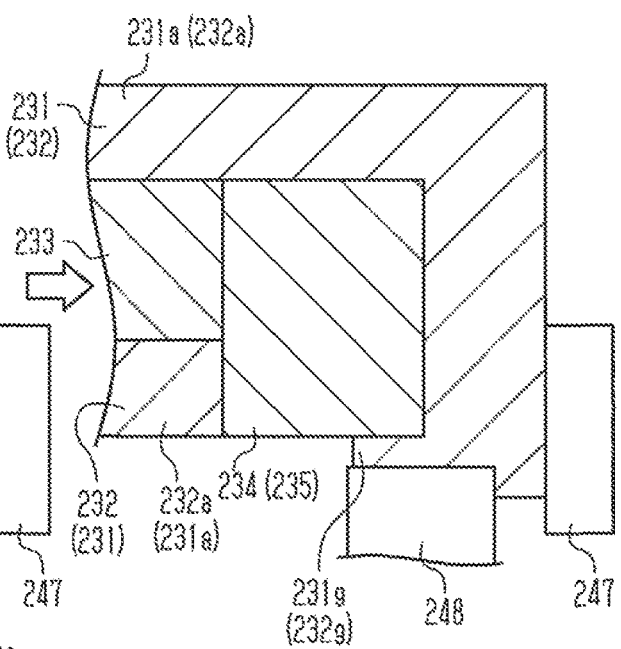

For example, as illustrated in FIGS. 23A and 23B, the first claw pole 231*b* (second claw pole 232*b*) may extend out of the axial range where the first core base 231*a* and the second core base 232*a* are arranged, and a jig 247 may be used to limit radial outward protrusion of the distal end. In this state, a protrusion 231*g* (232*g*) may be formed by crushing the distal end with a jig 248.

In the third embodiment, the protrusions 231*c* and 232*c* are formed entirely over the first and second claw poles 231*b* and 232*b* in the circumferential direction. Instead, the protrusions 231*c* and 232*c* may be formed on portions of the first and second claw poles 231*b* and 232*b* in the circumferential direction.

Figure 24:
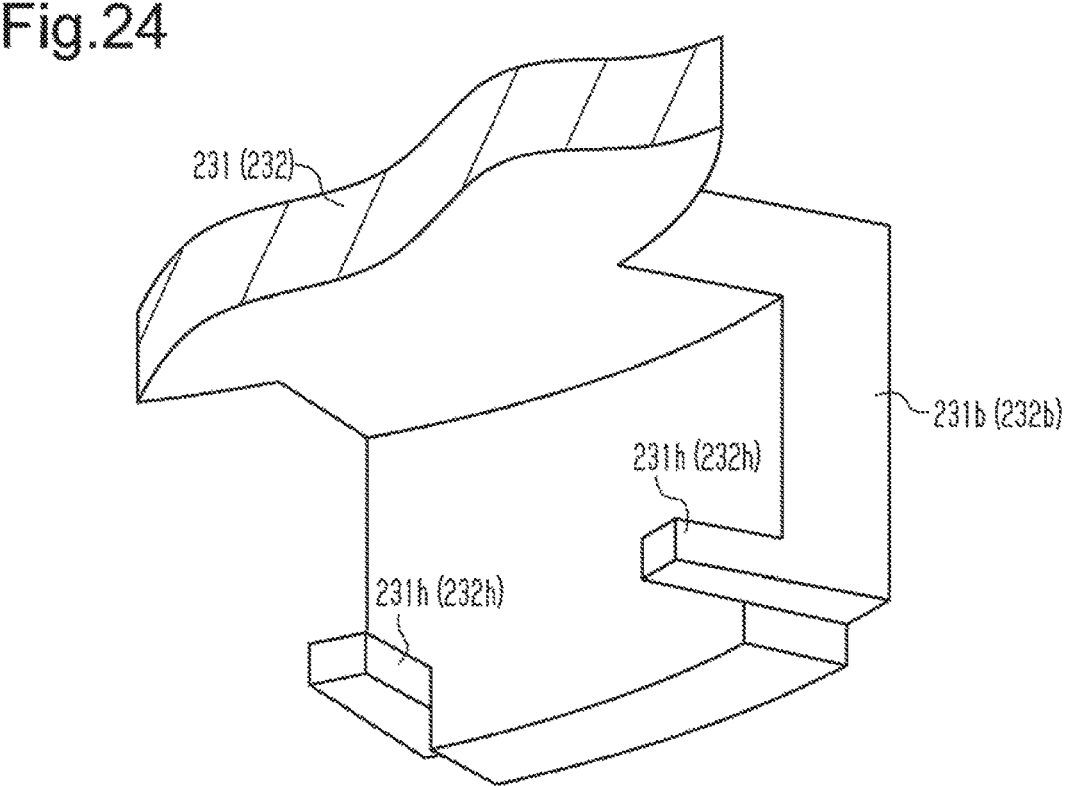
FIG. 24 is a partial perspective view for describing a protrusion in a modification of the third embodiment.
Figure 25:
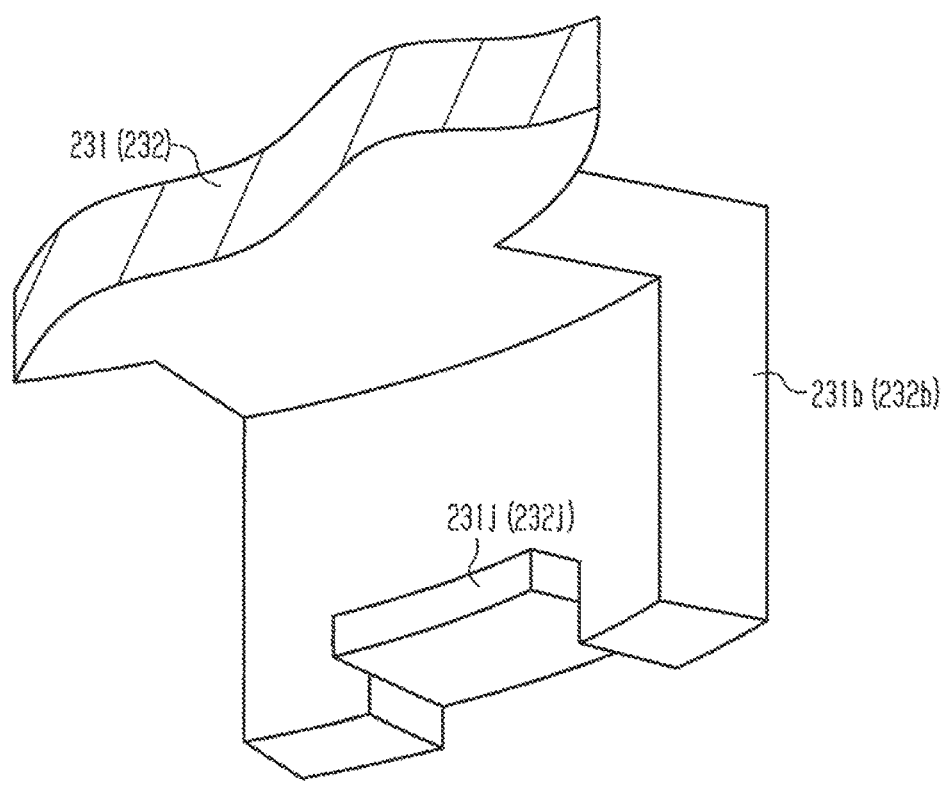
FIG. 25 is a partial perspective view showing a protrusion in a modification of the third embodiment.

For example, as illustrated in FIG. 24, protrusions 231*h* and 232*h* may be formed on the two circumferential ends of each of the first and second claw poles 231*b* and 232*b*. Alternatively, for example, as illustrated in FIG. 25, protrusions 231*j* and 232*j* may be formed only on central portions of the first and second claw poles 231*b* and 232*b* in the circumferential direction.

In the third embodiment, the back surface magnets 234 and 235 are held by only the protrusions 231*c* and 232*c*. Instead, the back surface magnets 234 and 235 may be adhered to each by an adhesive.

The rotor in each of the third embodiment and the modifications of the third embodiment includes the interpolar magnets 236 and 237. However, the interpolar magnets 236 and 237 may be omitted.

The protrusions 231*c* and 232*c* protrude inward in the radial direction in the third embodiment. However, the protrusions may protrude in the circumferential direction as long as axial movement of the commutator magnet that is either the back surface magnets 234 and 235 or the interpolar magnets 236 and 237 can be restricted.

Figure 26:
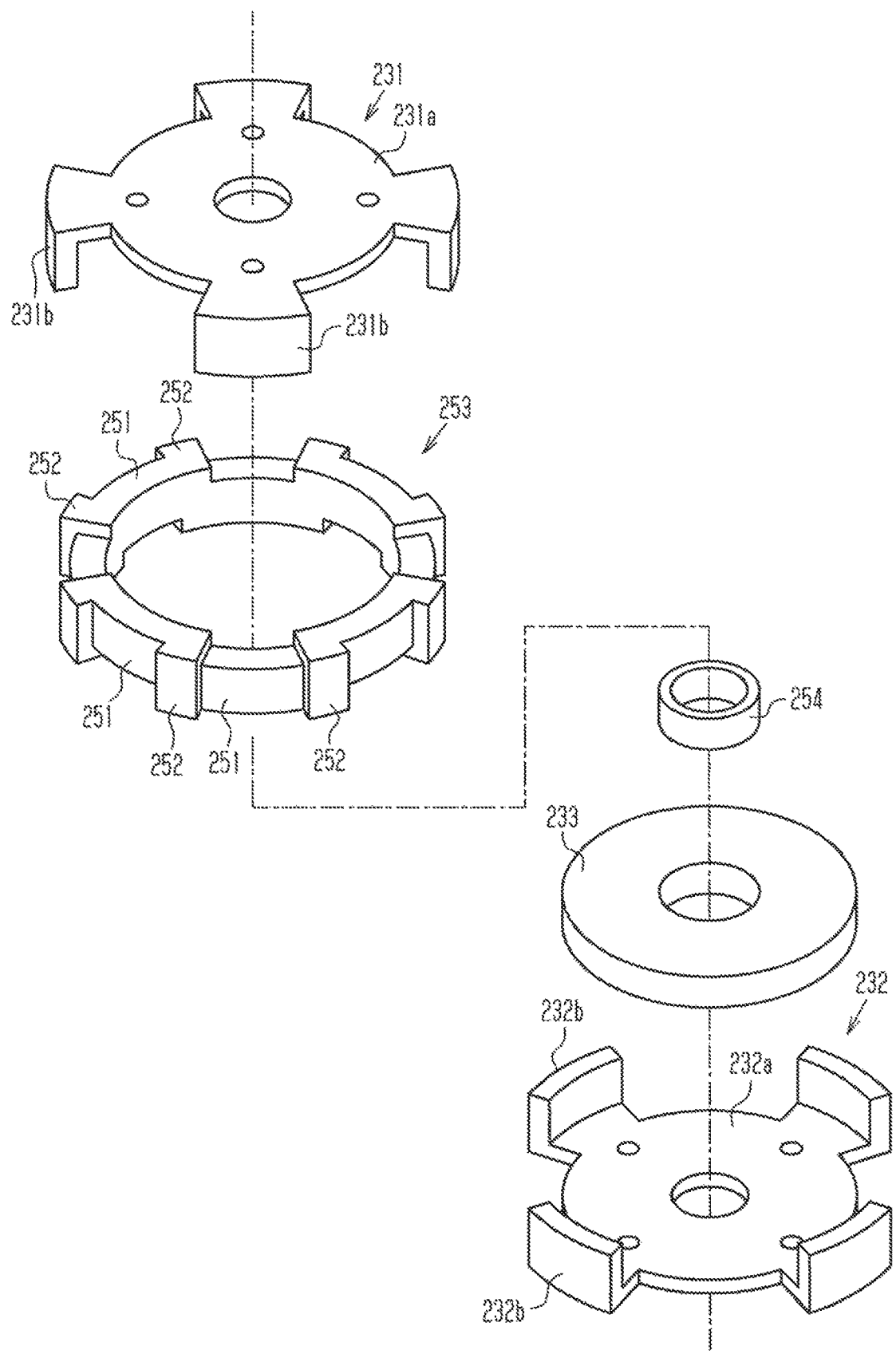
FIG. 26 is an exploded perspective view showing a rotor in a modification of the third embodiment.
Figure 27A:
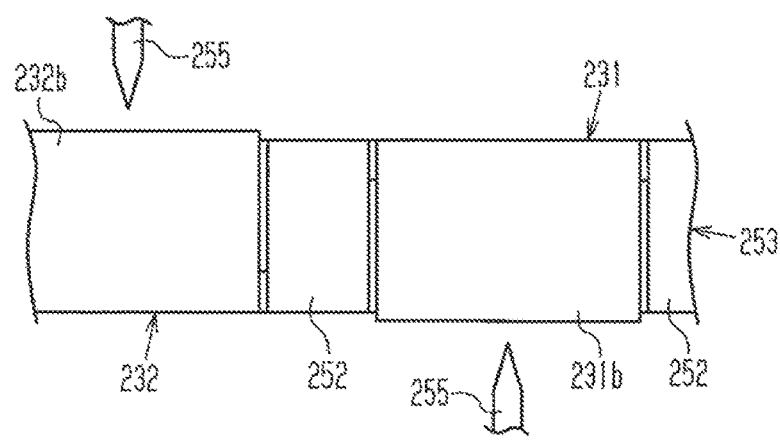
FIGS. 27A and 27B are schematic side views showing a method for manufacturing a rotor in a modification of the third embodiment.

For example, a modification illustrated in FIGS. 26 and 27 may be employed. In this example, the back surface magnets 234 and 235 and the interpolar magnets 236 and 237 in the third embodiment are replaced with the polar anisotropic magnet 253 that is an annular commutator magnet, in which the back surface magnet portions 251, serving as the back surface magnets, and the interpolar magnet portions 252, serving as the interpolar magnets, are alternately arranged in the circumferential direction (integrally formed) like in the modification described above (see FIG. 19). The chamfered portions 251*a* in the modification described above (see FIG. 19) are not formed in the polar anisotropic magnet 253 of this example. In this example, a cylindrical insulating collar 254 is arranged at the inner side of the field magnet 233 (between the field magnet 233 and the rotation shaft 222).

Figure 27B:
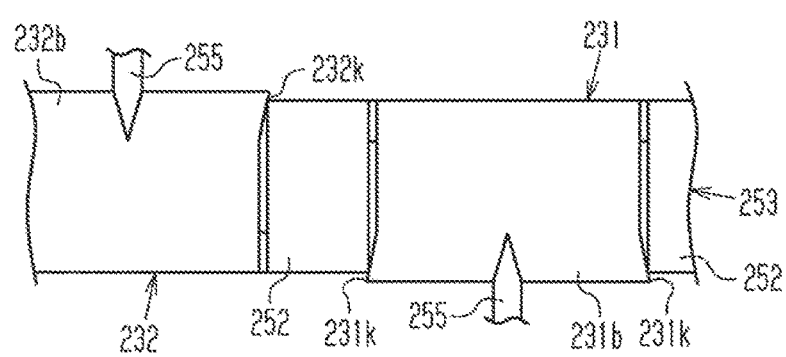

As illustrated in FIG. 27B, the first and second claw poles 231*b* and 232*b* include protrusions 231*k* and 232*k* projecting in the circumferential direction to restrict axial movement of the interpolar magnet portions 252 (and the polar anisotropic magnet 253 including the back surface magnet portions 251). More specifically, distal ends of the first and second claw poles 231*b* and 232*b* of this example extend out of the axial range where the first core base 231*a* and the second core base 232*a* are arranged. Jigs 255 (see FIG. 27B) are wedged into the distal ends of the first and second claw poles 231*b* and 232*b* that are less the protrusions 231*k* and 232*k* (see FIG. 27A) in the axial direction to partially deform and extend the distal ends of the first and second claw poles 231*b* and 232*b* outward in the circumferential direction. Thus, the protrusions 231*k* and 232*k* hold the interpolar magnet portions 252 in the axial direction and restrict movement. As a result, the back surface magnet portions 251 and the interpolar magnet portions 252 that are formed integrally as the polar anisotropic magnet 253 are both firmly held by the protrusions 231*k* and 232*k*.

Figure 28A:
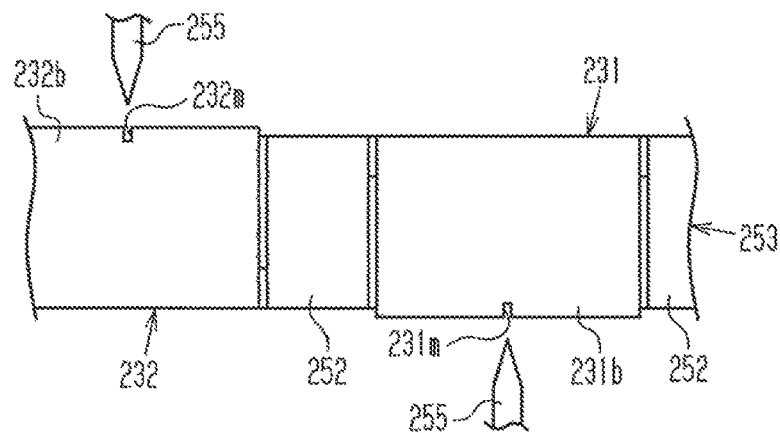
FIGS. 28A and 28B are schematic side views showing a method for manufacturing a rotor in a modification of the third embodiment.
Figure 28B:
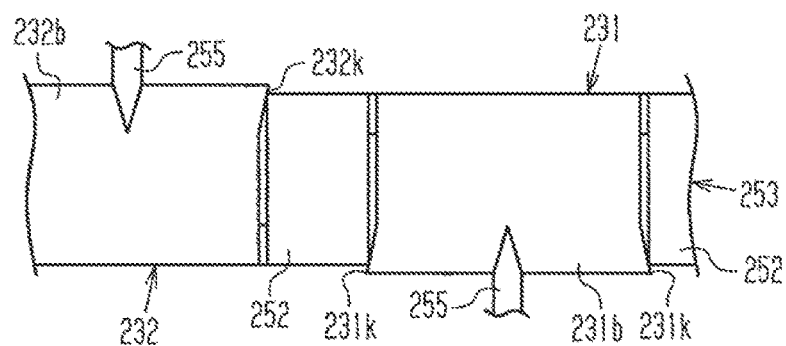

For example, as illustrated in FIGS. 28A and 28B, the protrusions 231*k* and 232*k* may be formed by wedging the jig 255 into slits 231*m* and 232*m* formed in advance in the distal ends of the first and second claw poles 231*b* and 232*b* of the modification described above (see FIGS. 27A and 27B).

Figure 29A:
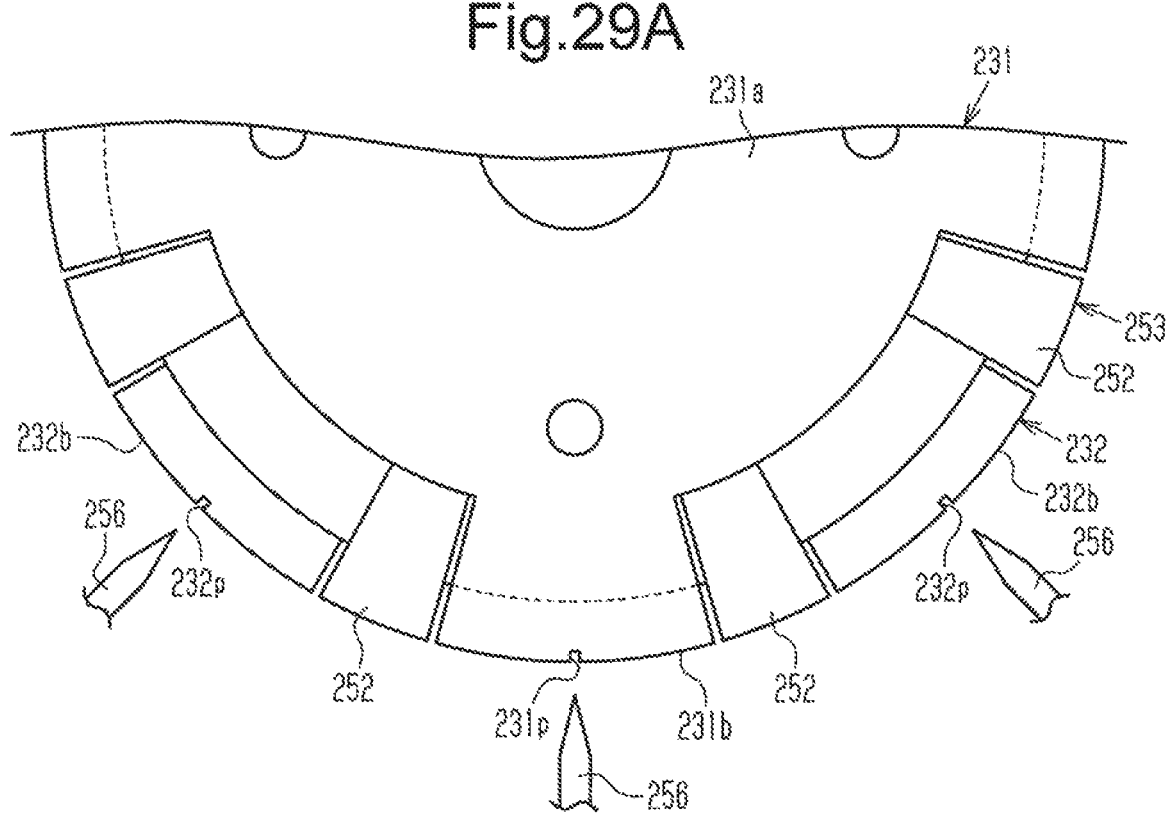
FIGS. 29A and 29B are schematic plan views showing a method for manufacturing a rotor in a modification of the third embodiment.
Figure 29B:
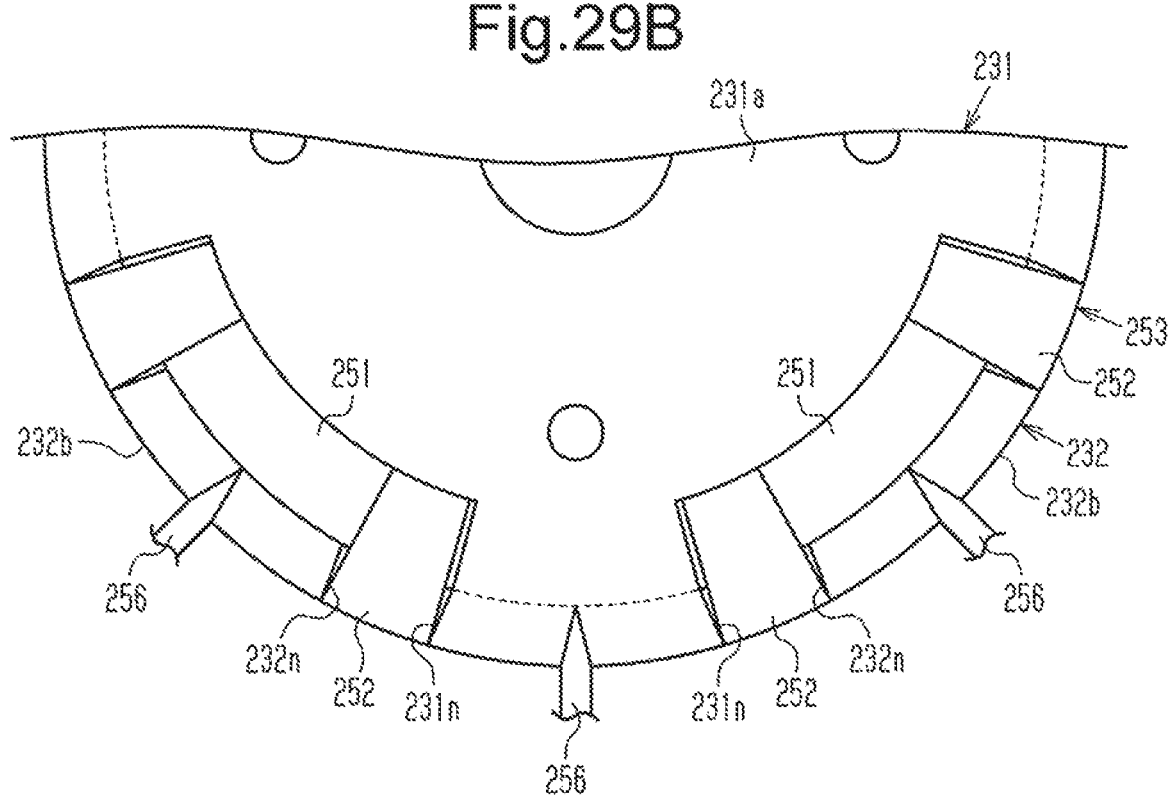

For example, a modification as illustrated in FIGS. 29A and 29B may be employed. Protrusions 231*n* and 232*n* of this example are formed by wedging a jig 256 into an outer circumference of the first and second claw poles 231*b* and 232*b* (see FIG. 29A), which are less the protrusions 231*n* and 232*n*, from the outer side in the radial direction (see FIG. 29B) so that the first and second claw poles 231*b* and 232*b* are partially deformed to extend outward in the circumferential direction. In this example, the protrusions 231*n* and 232*n* are formed by wedging the jig 256 into slits 231*p* and 232*p* (see FIG. 29A) formed in advance in the outer circumferential surfaces of the first and second claw poles 231*b* and 232*b*.

Thus, each of the interpolar magnet portions 252 is sandwiched (held) between the protrusions 231*n* and 232*n* in the circumferential direction so that axial movement is restricted. Thus, the back surface magnet portion 251 and the interpolar magnet portion 252, which are formed integrally as the polar anisotropic magnet 253, are both firmly held by the protrusions 231*n* and 232*n*.

In these examples (see FIGS. 26 to 29), the protrusions 231*k*, 232*k*, 231*n*, and 232*n* restrict axial movement of the interpolar magnet portions 252. This, in turn, restricts axial movement of the back surface magnet portions 251. Alternatively, the protrusions 231*k*, 232*k*, 231*n*, and 232*n* may be used when the interpolar magnet portions 252 are independent interpolar magnets. In such a case, axial movement of the back surface magnets and the interpolar magnets may be restricted by protrusions protruding inward in the radial direction in addition to protrusions protruding in the circumferential direction.

Chamfered portions may be formed in the interpolar magnet portions 252 (interpolar magnets) at locations corresponding to the protrusions 231*k*, 232*k*, 231*n*, and 232*n* protruding in the circumferential direction. This limits cracking of the interpolar magnet portions 252 (interpolar magnets).

In the third embodiment, the present invention is embodied in the brushless motor 211 in which the number of poles of the rotor 221 is set to "eight" and the number of the teeth 217*a* of the stator 216 is set to "twelve." The number of poles of the rotor 221 and the number of teeth 217*a* of the stator 216 may be changed. For example, the present invention may be implemented as a brushless motor in which the number of poles of the rotor 221 is set to "ten" and the number of the teeth 217*a* of the stator 216 is set to "twelve."

Technical concepts that can be acknowledged from the third embodiment and its modifications will now de described together with their advantages.

(I) A motor, wherein the protrusion is located in an axial range in which two core bases of the first and second rotor cores are arranged.

In this configuration, the protrusions are located within the axial range in which the two core bases of the first and second rotor cores are arranged and thus do not protrude in the axial direction. Thus, such portion is not enlarged in the axial direction.

(II) A motor, wherein the protrusion is formed by applying pressure to the claw pole in an axial direction or a radial direction in a state in which the commutator magnet is arranged.

In this configuration, the protrusions are formed by applying pressure to the claw pole in the axial direction or the radial direction in a state in which the commutator magnet is arranged. This facilitates the formation of the protrusion that restricts axial movement of the commutator magnet.

Fourth Embodiment

A brushless motor according to a fourth embodiment will now be described with reference to FIGS. 30 to 34.

Figure 30:
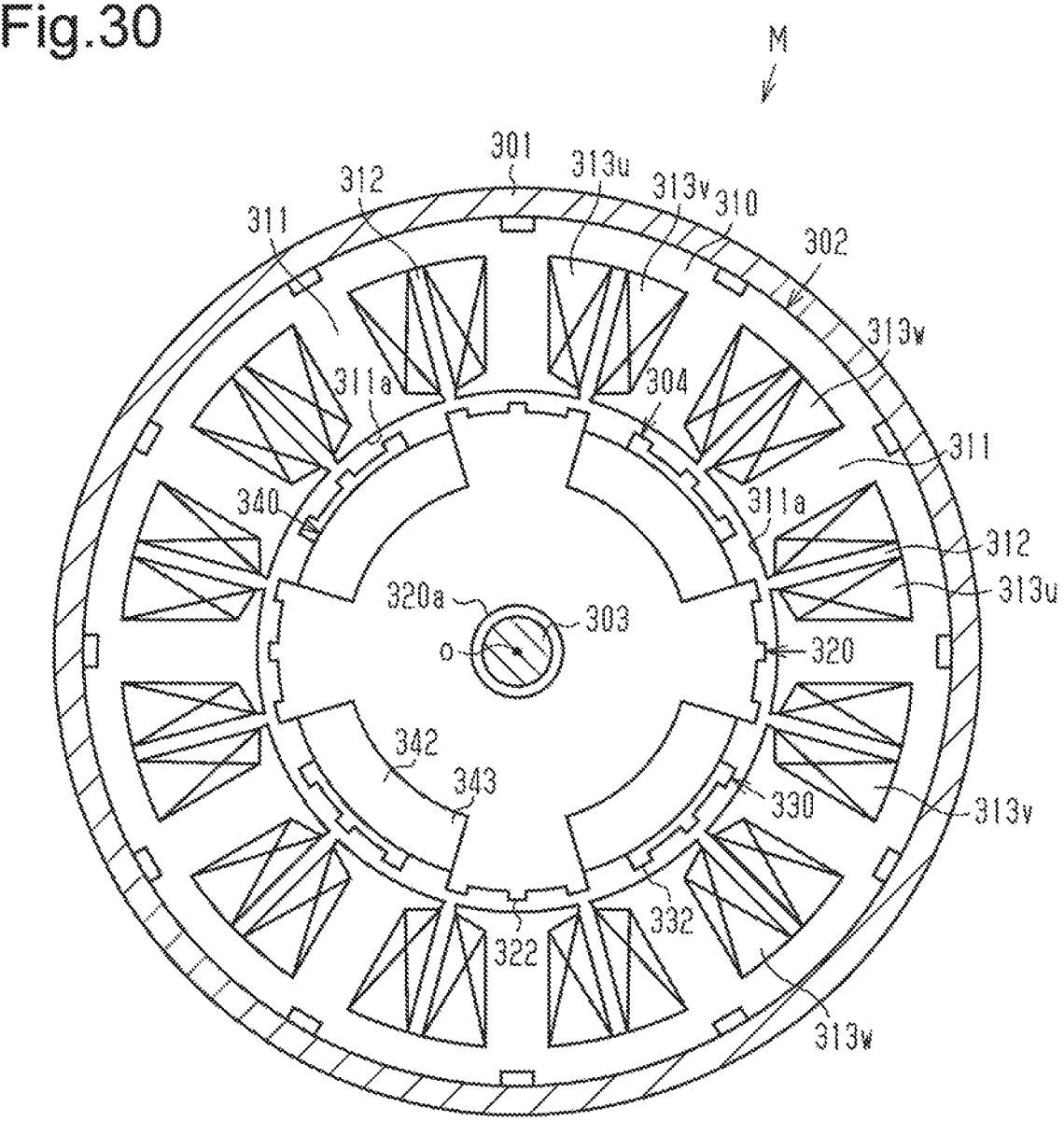
FIG. 30 is a partial cross-sectional view of a brushless motor according to a fourth embodiment of the present invention.

As illustrated in FIG. 30, a brushless motor M serving as the motor includes a stator 302, which is fixed to an inner circumferential surface of a motor casing 301. A rotor 304, which has a Lundell configuration, is fixed to a rotation shaft 303 and rotated integrally with the rotation shaft 303. The rotation shaft 303 is a stainless shaft that is a nonmagnetic body. Bearings (not shown) support the rotation shaft 303 rotationally relative to the motor casing 301.

The stator 302 includes a cylindrical stator core 310 having a shape. The outer circumferential surface of the stator core 310 is fixed to the inner side surface of the motor casing 301. A plurality of teeth 311, formed along the axial direction and arranged at an equal pitch in the circumferential direction, are formed on the inner side of the stator core 310 and extended inward in the radial direction. Each tooth 311 is T-shaped and has a radially inner side that defines an inner circumferential surface 311a, which is an arcuate surface extending in the axial direction. The inner circumferential surface 311a is concentric to an arc extending about the axis O of the rotation shaft 303.

A slot 312 is formed between adjacent ones of the teeth 311 in the circumferential direction. In the present embodiment, the number of the teeth 311 is twelve. The number of the slots 312 is the same as the number of the teeth 311 and is thus twelve. Three phase coils, namely, a U-phase coil 313u, a V-phase coil 313v, and a W-phase coil 313w are wound in a concentrated winding around the twelve teeth 311 in the slots 312. The coils are wound in order in the circumferential direction.

Three-phase power supply voltage is applied to the phase coils 313u, 313v, and 313w so that the stator 302 generates a rotating magnetic field and rotates the rotor 304, which is fixed to the rotation shaft 303 at the inner side of the stator 302.

As illustrated in FIGS. 31 to 34, the rotor 304 includes first and second rotor cores 320 and 330 and an integrated permanent magnet 340.

The first rotor core 320 is formed of a soft magnetic material. In the present embodiment, the first rotor core 320 is formed by a magnetic steel plate and includes a first core base 321, which is substantially disk-shaped and has a boss 320a. The rotation shaft 303 is press-fitted in the boss 320a. A plurality of (four in the present embodiment) first claw poles 322 are formed at equal intervals on an outer circumferential portion of the first core base 321. The first claw poles 322 are projected outward in the radial direction and extended in the axial direction.

The second rotor core 330 and the first rotor core 320 are formed from the same material and identical in shape. The second rotor core 330 includes a second core base 331, which is substantially disk-shaped and has a boss 330a. The rotation shaft 303 is press-fitted in the boss 330a. A plurality of (four in the present embodiment) second claw poles 332 are formed at equal intervals on an outer circumferential portion of the second core base 331. The second claw poles 332 are projected outward in the radial direction and extended in the axial direction.

The rotation shaft 303 is press-fitted to the bosses 320a and 330a to fix the first and second rotor cores 320 and 330 to the rotation shaft 303. The second rotor core 330 is coupled to the first rotor core 320 by arranging the second claw poles 332 between adjacent ones of the first claw poles 322 in the circumferential direction and arranging (holding) a field magnet (hereinafter, referred to as a field magnet main body 341) of the integrated permanent magnet 340 between the first core base 321 and the second core base 331 in the axial direction.

Figure 31:
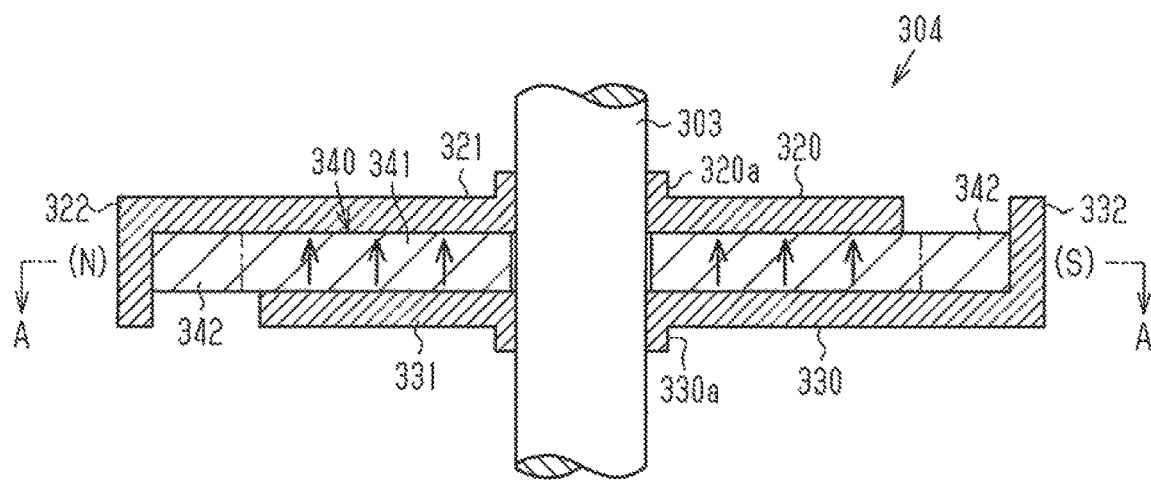
FIG. 31 is a partial cross-sectional view of a rotor illustrated in FIG. 30.
Figure 32:
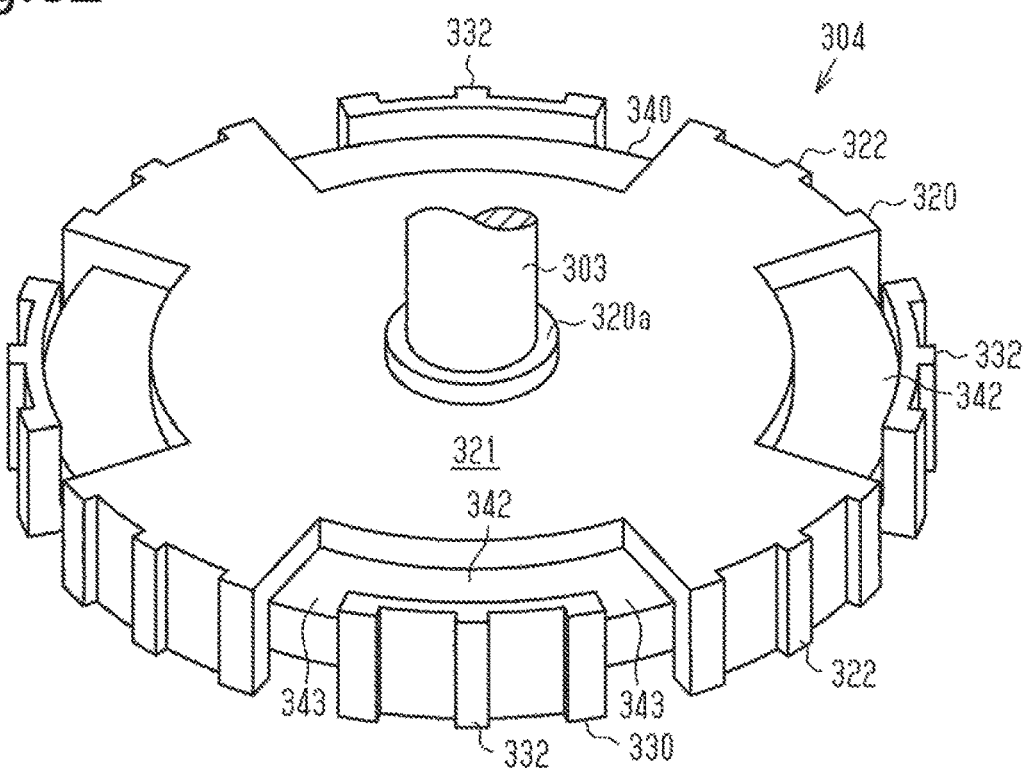
FIG. 32 is a perspective view of the rotor illustrated in FIG. 31.
Figure 33:
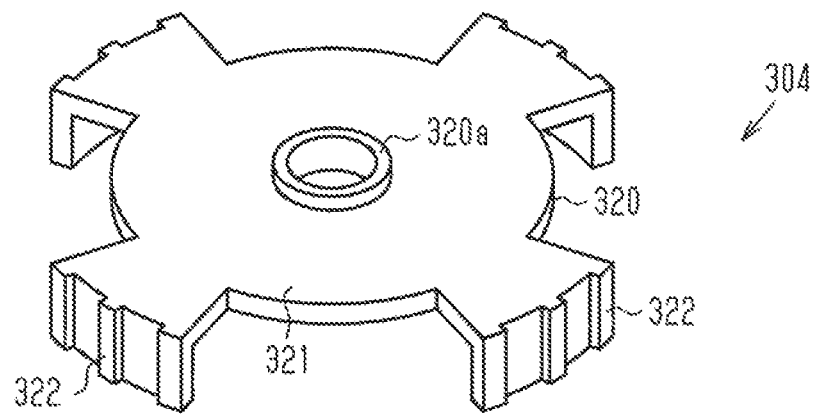
FIG. 33 is an exploded perspective view of the rotor illustrated in FIG. 32.
Figure 33:
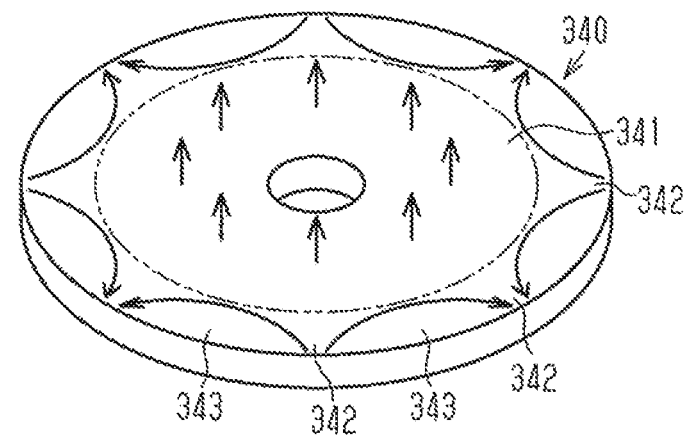
Figure 33:
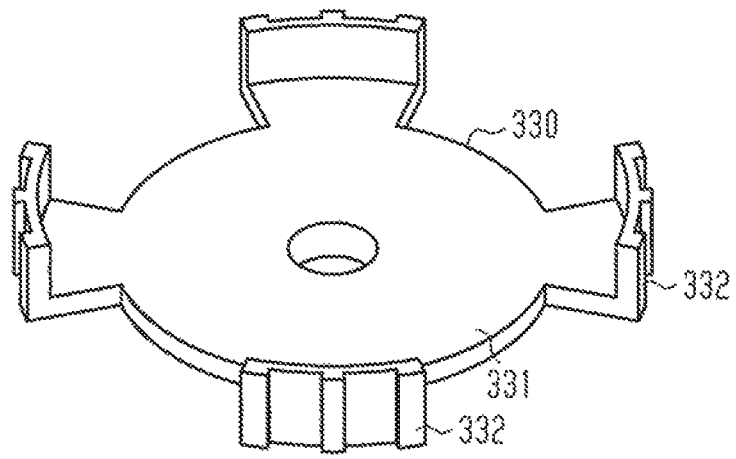
Figure 34:
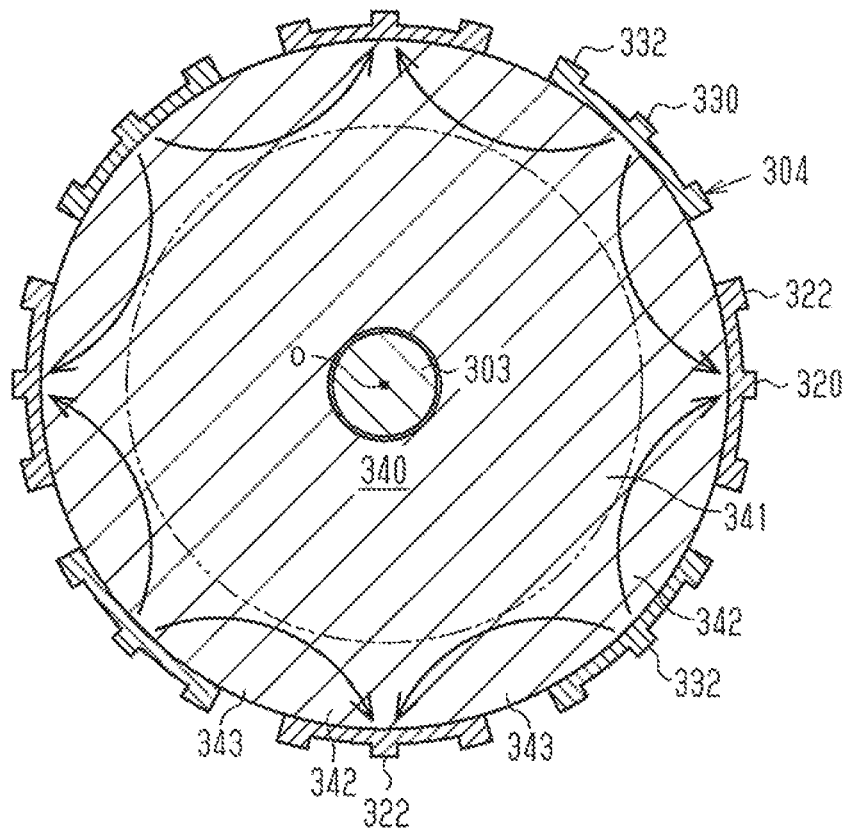
FIG. 34 is a cross-sectional view taken along line A-A in FIG. 31.

As illustrated in FIGS. 31, 33, and 34, the field magnet main body 341 of the integrated permanent magnet 340 is disk-shaped and includes a center hole. The field magnet main body 341 is magnetized in the axial direction so that each first claw pole 322 functions as a first magnetic pole (N pole in the present embodiment) and each second claw pole 332 functions as a second magnetic pole (S pole in the present embodiment). The rotor 304 of the present embodiment is a Lundell rotor. The rotor 304 includes the four first claw poles 322, serving as the N poles, and the four second claw poles 332, serving as the S poles, alternately arranged in the circumferential direction. Thus, the rotor 304 includes a total of eight magnetic poles (four magnetic pole pairs). In the present embodiment, the number of poles of the rotor 304 is set to "eight," and the number of teeth 311 (slots 312) of the stator 302 is set to "twelve."

The integrated permanent magnet 340 is obtained by integrally forming the field magnet main body 341, back surface magnet portions 342, and interpolar magnet portions 343. The back surface magnet portions 342, which are located between the field magnet main body 341 and the first and second claw poles 322 and 332, are magnetized to limit magnetic flux leakage from where the back surface magnet portions 342 are located. The interpolar magnet portions 343 are located between adjacent ones of the back surface magnet portions 342 in the circumferential direction and magnetized to limit magnetic flux leakage from where the interpolar magnet portions 343 are located (between the first and second claw poles 322 and 332).

More specifically, the back surface magnet portions 342 and the interpolar magnet portions 343 are alternately arranged at the radially outer side of the field magnet main body 341 in an annular form. The back surface magnet portions 342 and the interpolar magnet portions 343 are oriented from the outer circumferential surface of the back surface magnet portion 342 to the outer circumferential surfaces of the adjacent back surface magnet portion 342 in the circumferential direction as schematically indicated by the arrows in FIGS. 33 and 34. Further, the back surface magnet portions 342 and the interpolar magnet portions 343 are magnetized so that each of the back surface magnet portions 342 and the interpolar magnet portions 343 reduces leakage fluxes. The back surface magnet portions 342 and the interpolar magnet portions 343 are magnetized by large currents flowing through the coils near the outer circumferential surface of each back surface magnet portion 342. Thus, the back surface magnet portions 342 are mainly magnetized in the radial direction, and the interpolar magnet portions 343 are mainly magnetized in the circumferential direction. In FIGS. 33 and 34, the double-dashed line schematically indicates the boundary of the field magnet main body 341 with the back surface magnet portions 342 and the interpolar magnet portions 343.

The back surface magnet portions 342 and the interpolar magnet portions 343 are formed within an axial range that is the same as the axial range in which the field magnet main body 341 is formed. More specifically, in the integrated permanent magnet 340 of the present embodiment, each axial end surface is entirely flat. The axial end surface includes the boundary of the field magnet main body 341 with the back surface magnet portions 342 and the interpolar magnet portions 343. The outer circumference of the integrated permanent magnet 340 is circular and extends along radially inner end surfaces of the first and second claw poles 322 and 332.

The operation of the brushless motor M will now be described.

When three-phase power supply voltage is applied to the phase coils 313u, 313v, and 313w of the stator core 310, the stator 302 generates a rotating magnetic field. The rotating magnetic field rotates and drives the rotor 304, which is fixed to the rotation shaft 303 located at the inner side of the stator 302.

The back surface magnet portions 342 limit magnetic flux leakage at where the back surface magnet portions 342 are located (in the radial direction) and the interpolar magnet portion 343 limit magnetic flux leakage at where the interpolar magnet portion 343 are located (in the circumferential direction). Thus, the rotating magnetic field of the stator 302 acts with highly efficiency to drive and rotate the rotor 304.

The advantages of the fourth embodiment will now be described.

(9) The field magnet main body 341, the back surface magnet portions 342, and the interpolar magnet portions 343 are formed integrally to form the integrated permanent magnet 340. This achieves high efficiency without increasing the number of components. The back surface magnet portions 342 and the interpolar magnet portions 343 are formed within the same axial range as the axial range in which the field magnet main body 341 is formed. This facilitates the formation of the integrated permanent magnet 340 as compared when there is a portion projecting in the axial direction from the axial range where the field magnet main body 341 is formed. As a result, the rotor 304 and the brushless motor M may be easily manufactured.

(10) Each axial end surface of the integrated permanent magnet 340 is a single flat surface including the boundary of the field magnet main body 341 with the back surface magnet portions 342 and the interpolar magnet 343. This facilitates the formation as compared with when the boundary includes a groove.

(11) The outer circumference of the integrated permanent magnet 340 is circular and extends along the radially inner end surfaces of the first and second claw poles 322 and 332. This facilitates formation of the integrated permanent magnet 340 as compared with when parts of the interpolar magnet portions 343 project outward in the radial direction.

The fourth embodiment may be modified as described below.

Figure 35:
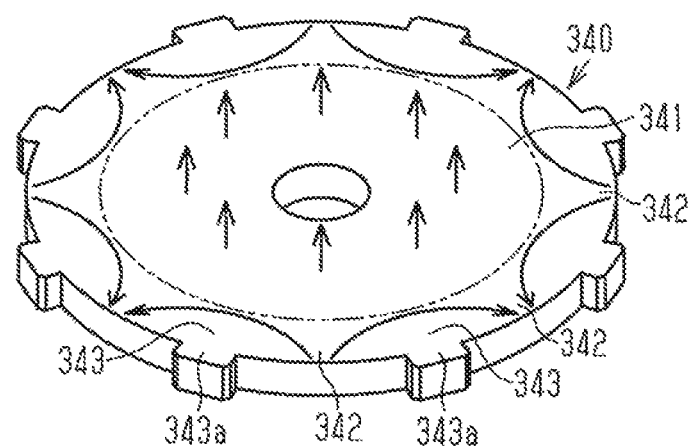
FIG. 35 is a perspective view of an integrated permanent magnet in a modification of the fourth embodiment.

In the fourth embodiment, the outer circumference of the integrated permanent magnet 340 is circular and extends along the radially inner end surfaces of the first and second claw poles 322 and 332. Instead, as illustrated in FIG. 35, the interpolar magnet portions 343 may each include an interpolar projection 343a projecting outward in the radial direction from the radially outer end surfaces of the back surface magnet portion 342. This further reduces magnetic flux leakage as compared with when there are no interpolar projections 343a (in the embodiment described above).

Figure 36A:
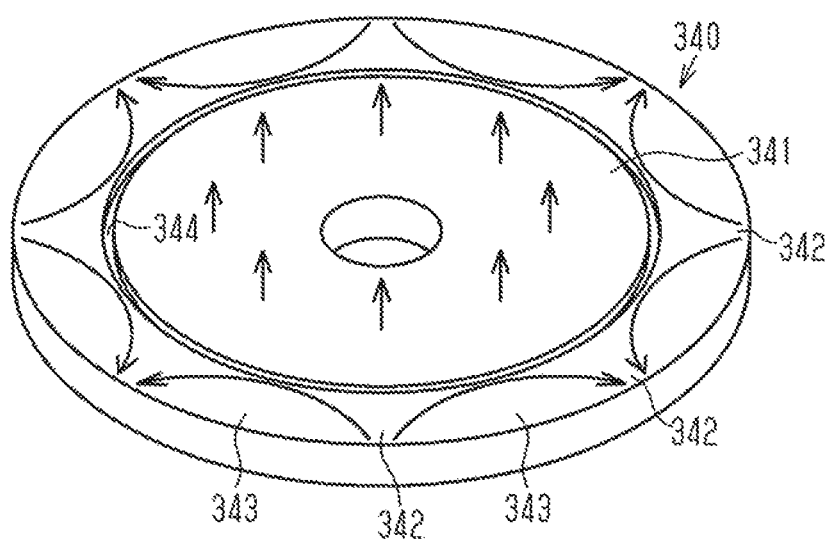
FIG. 36A is a perspective view of an integrated permanent magnet in a modification of the fourth embodiment.
Figure 36B:
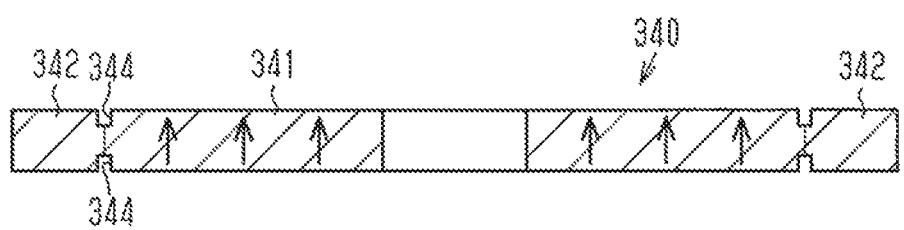
FIG. 36B is a cross-sectional view of the integrated permanent magnet illustrated in FIG. 36A.

In the fourth embodiment, each axial end surface of the integrated permanent magnet 340 is a single flat surface including the boundary of the field magnet main body 341 with the back surface magnet portions 342 and the interpolar magnet portions 343. Instead, as illustrated in FIGS. 36A and 36B, the boundary may include a groove 344. This increases the accuracy of the magnetizing direction when magnetized. More specifically, it is desirable that the field magnet main body 341 be magnetized in the axial direction, the back surface magnet portions 342 be magnetized in the radial direction, and the interpolar magnet portions 343 be magnetized in the circumferential direction. When magnetized, it is difficult for the magnetic flux to extend beyond the portion where the groove 344 is formed and into a range beyond the magnetizing range. This acts to more easily obtain the desired magnetization directions.

In the fourth embodiment, although not particularly mentioned, the material type and manufacturing method of the integrated permanent magnet 340 are not particularly limited, and various types of magnets may be used. For example, a ferrite magnet, a samarium-iron-nitrogen based magnet, a samarium-cobalt based magnet, a neodymium magnet, or an alnico magnet may be used. A sintered magnet or a bonded magnet may be used. When a bonded magnet is used, compression molding or injection molding may be employed.

In the fourth embodiment, the present invention is embodied in the brushless motor M in which the number of poles of the rotor 304 is set to "eight," and the number of the teeth 311 of the stator 216 is set to "twelve." However, the number of poles of the rotor 304 and the number of teeth 311 of the stator 302 may be changed. For example, the present invention may be embodied in a brushless motor in which the number of poles of the rotor 304 is set to "ten," and the number of the teeth 311 of the stator 302 is set to "twelve."

Technical concepts that can be recognized from the fourth embodiment and its modifications will now be described together with their advantages.

(III) A motor, wherein the integrated permanent magnet includes an axial end surface that entirely forms a single flat surface including a boundary of the field magnet main body with the back surface magnet portion and the interpolar magnet portion.

In this configuration, the integrated permanent magnet includes an axial end surface that entirely forms a single flat surface including a boundary of the field magnet main body with the back surface magnet portion and the interpolar magnet portion. This facilitates the formation as compared with when the boundary includes a groove, for example.

(IV) In the motor, the interpolar magnet portions each include an interpolar protrusion projecting outward in the radial direction beyond end surfaces of the back surface magnet portion on an outer side in the radial direction.

In this configuration, the interpolar magnet portions each include an interpolar protrusion projecting outward in the radial direction beyond end surfaces of the back surface magnet portion on the outer side in the radial direction. Thus, the magnetic flux can be more effectively prevented from leaking compared with a configuration without the interpolar protrusion.

Fifth Embodiment

A motor according to a fifth embodiment will now be described with reference to FIGS. 37 and 38.

Figure 37:
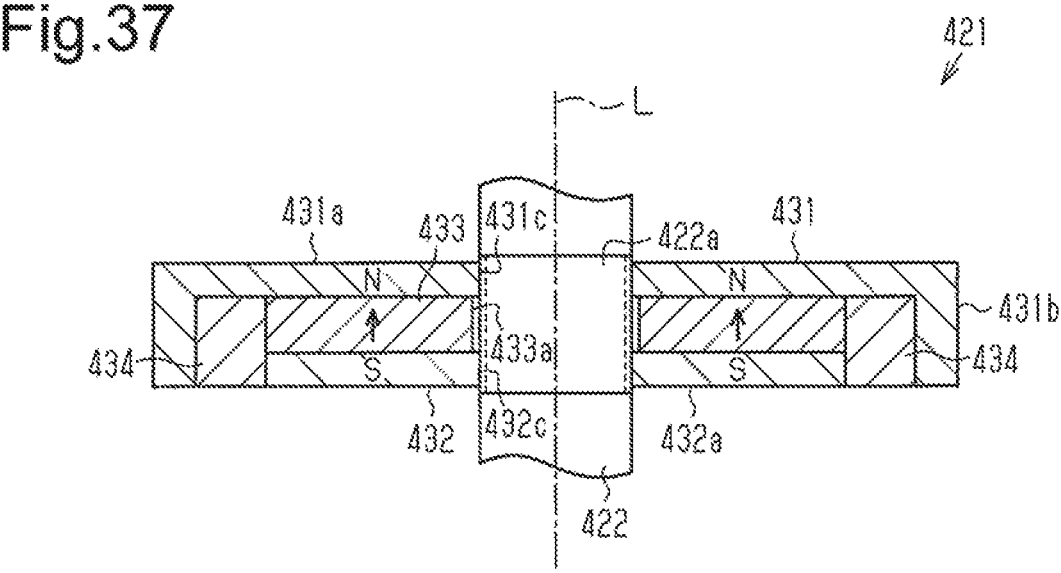
FIG. 37 is a partial cross-sectional view of a rotor according to a fifth embodiment of the present invention.

As illustrated in FIG. 37, a rotation shaft 422 of the present embodiment is formed by a magnetic body of iron.

The rotation shaft 422 includes a demagnetized portion 422a, which undergoes a demagnetization process to increase the magnetic resistance between a through hole 431c of a first rotor core 431 and a through hole 432c of a second rotor core 432.

More specifically, in the present embodiment, the demagnetized portion 422a is located at an axial position including a range extending from the end of the through hole 431c in the first rotor core 431 opposite to a field magnet 433 (end facing away from the field magnet 433) and the end of the through hole 432c in the second rotor core 432 opposite to the field magnet 433 (end facing away from the field magnet 433). Thus, in the present embodiment, the demagnetized portion 422a is located at an axial position in a range slightly larger than a range between the two axial ends of the first and second rotor cores 431 and 432, which are arranged on opposite sides of the field magnet 433. The demagnetizing process in the present embodiment includes applying a liquid containing nitrogen and executing high-temperature heating (laser radiation) so that nitrogen sinks in.

The operation of a brushless motor 411 having the configuration will now be described.

When the control circuit S supplies three-phase driving current to the coils 420, the stator 416 generates a rotating magnetic field to rotate and drive the rotor 421. This rotates a sensor magnet 42, which is opposed to a Hall IC 443, and switches the level of the detection signal output from the Hall IC 443 in accordance with the rotational angle (position) of the rotor 421. In response to the detection signal, the control circuit S supplies the coils 420 with three-phase driving current switched at optimum timings. Thus, the rotating magnetic field is generated in a desirable manner, and the rotor 421 is continuously rotated and driven in a desirable manner.

The advantages of the fifth embodiment will now be described.

(12) The rotation shaft 422 includes the demagnetized portion 422a that undergoes the demagnetizing process to obtain a higher magnetic resistance between the through hole 431c in the first rotor core 431 and the through hole 432c in the second rotor core 432. Thus, for example, the magnetic flux leakage can be reduced at the portion described above without using a rotation shaft that is entirely formed from a nonmagnetic metal material (for example, stainless steel). For example, when the rotation shaft is formed from iron like in the present embodiment, the rotation shaft 422 has high rigidity. Further, costs are lowered in comparison to when the rotation shaft is formed from stainless steel or the like.

(13) The demagnetized portion 422a is located at an axial position including the range from the end of the through hole 431c in the first rotor core 431 at the side opposite to the field magnet 433 and the end of the through hole 432c in the second rotor core 432 at the side opposite to the field magnet 433. This limits magnetic flux leakage with a simple configuration (range).

The fifth embodiment may be modified as described below.

In the fifth embodiment, the demagnetized portion 422a is located at the axial position including the range from the end of the through hole 431c in the first rotor core 431 at the side opposite to the field magnet 433 and the end and the end of the through hole 432c in the second rotor core 432 at the side opposite to the field magnet 433. Instead, the demagnetized portion 422a may be located only at axial positions corresponding to the through holes 431c and 432c. This obtains advantage (11) of the fifth embodiment.

The rotation shaft 422 in the fifth embodiment may be replaced with a rotation shaft including a recess to obtain a higher magnetic resistance between the through hole 431c in the first rotor core 431 and the through hole 432c in the second rotor core 432.

Figure 38:
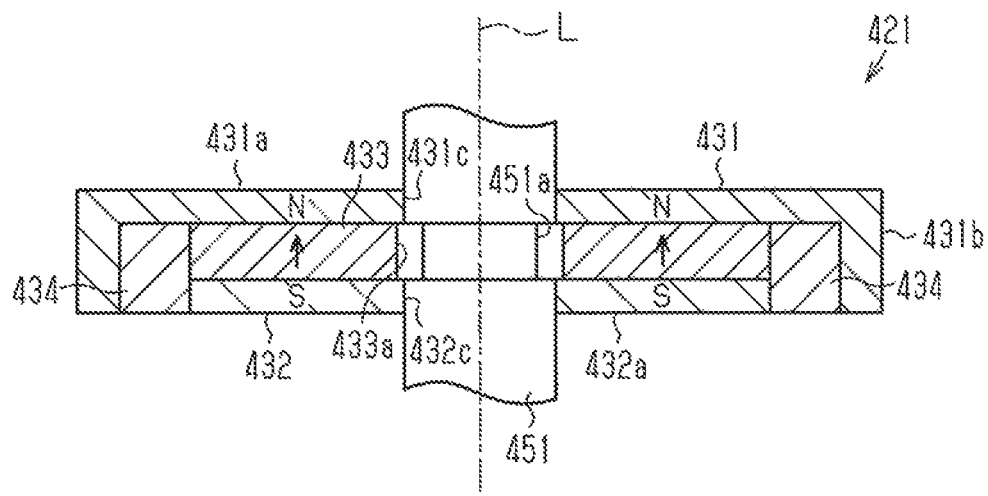
FIG. 38 is a partial cross-sectional view of a rotor in a modification of the fifth embodiment.

For example, as illustrated in FIG. 38, a rotation shaft 451 may include a recess 451a at (only) an axial position corresponding to the field magnet 433 (through hole 433a). The recess 451a of this example has a uniform depth and extends throughout the entire outer circumference of the rotation shaft 451 at the axial position of the rotation shaft 451 corresponding to the field magnet 433.

This configuration also reduces magnetic flux leakage from between the through hole 431c in the first rotor core 431 and the through hole 432c in the second rotor core 432 without using, for example, a rotation shaft entirely formed from a nonmagnetic metal material (for example, stainless steel). For example, when the rotation shaft is made of iron or the like, the rotation shaft 451 has high rigidity and reduces costs as compared to a rotation shaft formed from stainless steel or the like.

The recess 451a is formed only at the axial position corresponding to the field magnet 433. Thus, the magnetic flux leakage may be reduced without changing the configuration in which the rotation shaft 451 is supported by the through holes 431c and 432c in the first and second rotor cores 431 and 432 while maintaining the supporting force.

Sixth Embodiment

A motor according to a sixth embodiment will now be described.

Figure 39:
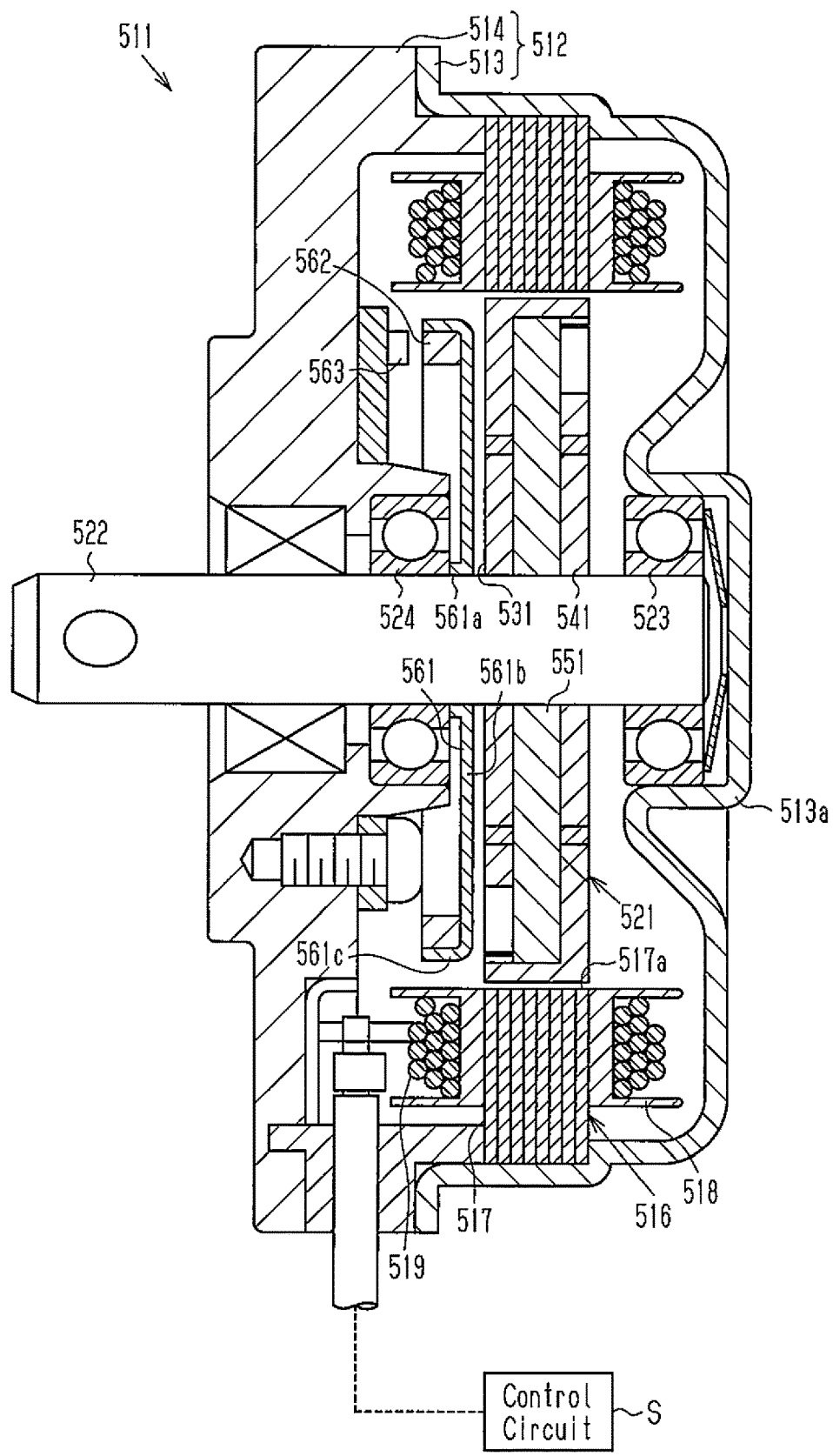
FIG. 39 is a cross-sectional view of a motor according to a sixth embodiment of the present invention.

As illustrated in FIG. 39, a motor casing 512 of a brushless motor 511, which serves as the motor, includes a yoke housing 513, which is cylindrical and has a closed end, and an end plate 514, which closes an opening at a front side (left side in FIG. 39) of the yoke housing 513.

As illustrated in FIG. 39, a stator 516 is fixed to an inner circumferential surface of the yoke housing 513. The stator 516 includes a stator core 517 including a plurality of teeth 517a, which extend inward in a radial direction, and coils 519, which are wound around the teeth 517a with an insulator 518 arranged in between. The stator 516 generates a rotating magnetic field when the external control circuit S supplies driving current to the coil 519.

As illustrated in FIG. 39, a rotor 521 of the brushless motor 511 includes a rotation shaft 522 and is located at an inner side of the stator 516. The rotation shaft 522 is a metal shaft that is a nonmagnetic body and is rotationally supported by bearings 523 and 524, which are supported by a bottom portion 513a of the yoke housing 513 and the end plate 514.

Figure 40:
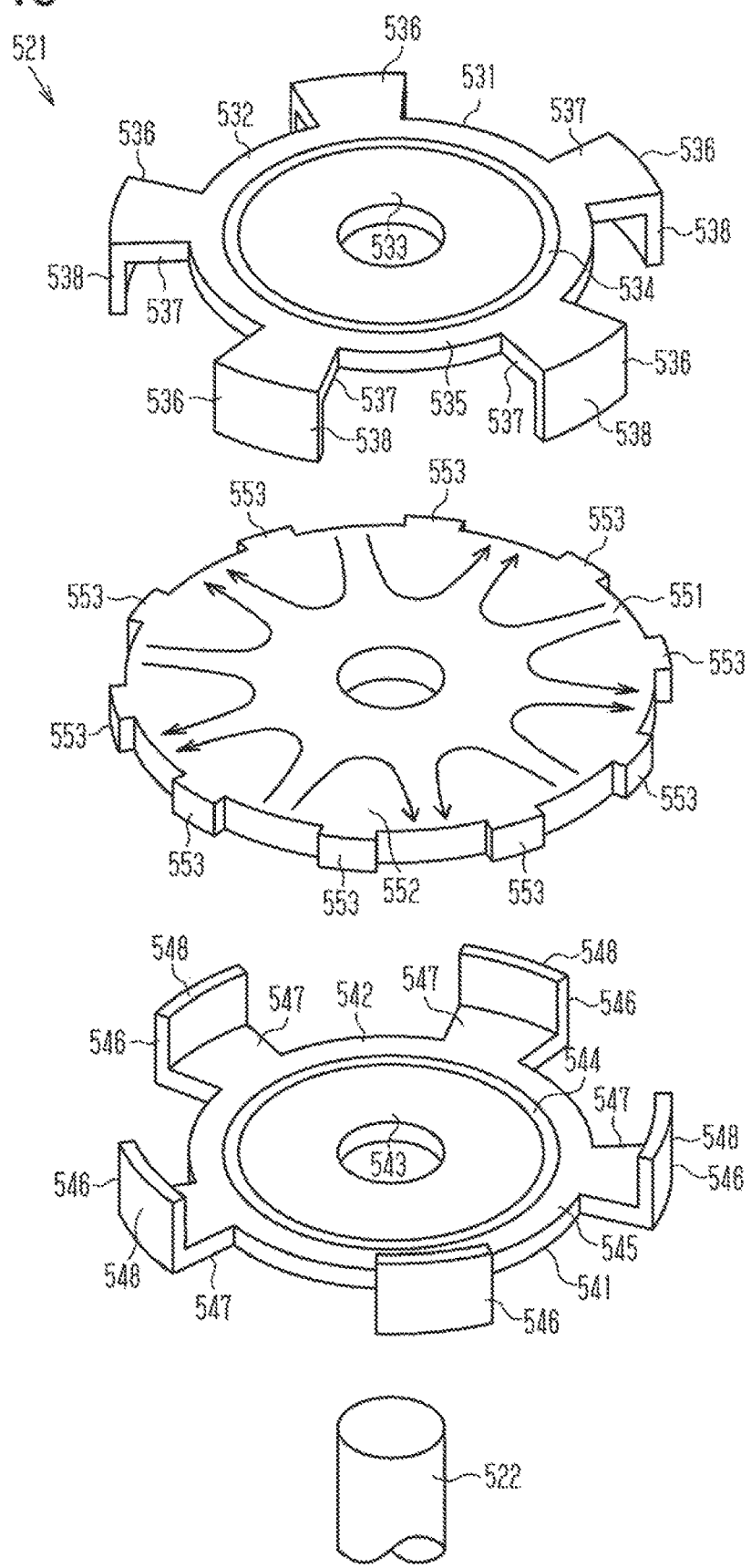
FIG. 40 is an exploded perspective view of a rotor illustrated in FIG. 39.
Figure 41:
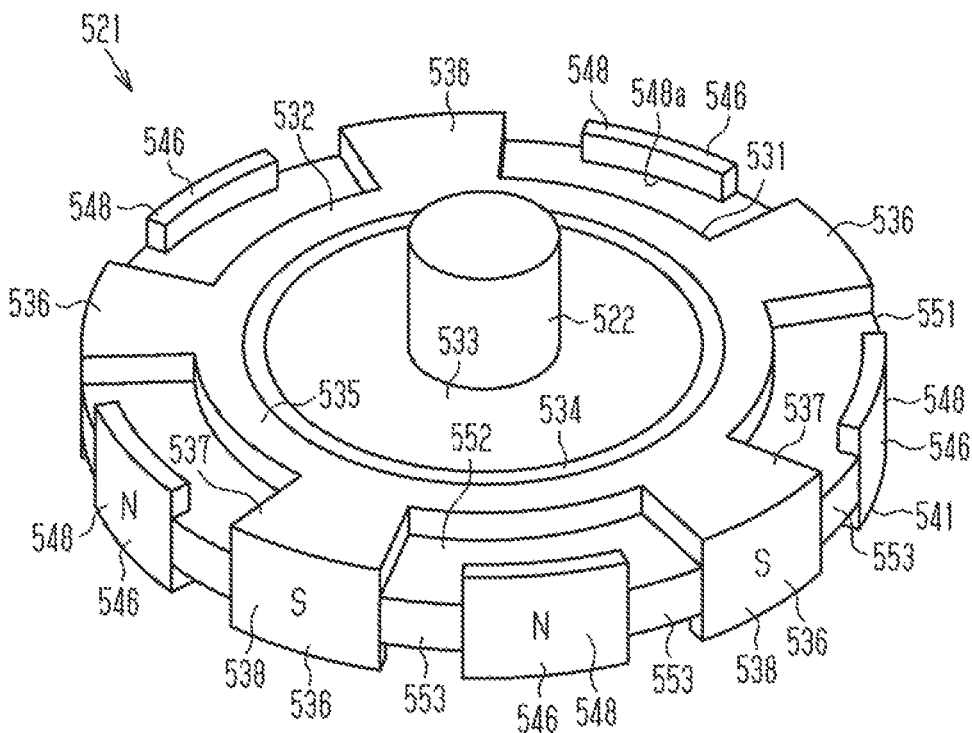
FIG. 41 is a perspective view of the rotor illustrated in FIG. 40.
Figure 42:
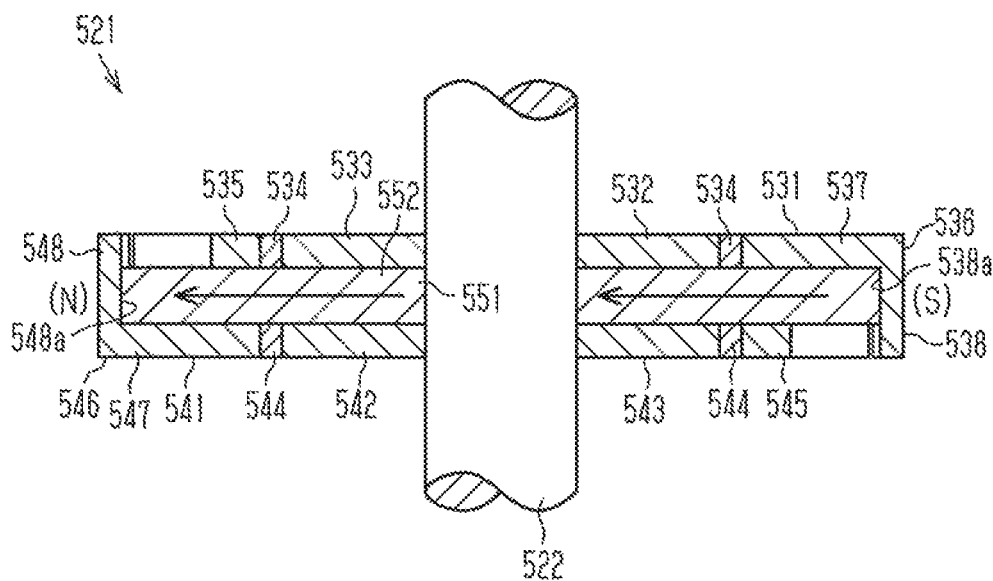
FIG. 42 is a cross-sectional view of the rotor illustrated in FIG. 41.

As illustrated in FIGS. 40 to 42, the rotor 521 includes two rotor cores 531 and 541 and a field magnet 551. The rotor cores 531 and 541 are press-fitted to the rotor 521. This fixes the rotor cores 531 and 541 to the rotation shaft 522 with an interval maintained in between in the axial direction. The field magnet 551 is annular and located between the rotor cores 531 and 541 in the axial direction.

As illustrated in FIGS. 40 and 41, the rotor core 531 has a plurality of (five in the present embodiment) claw poles 536 that are arranged at equal intervals in the circumferential direction on an outer circumferential portion of the core base 532, which is substantially disk-shaped. The claw poles 536 project outward in the radial direction and extend in the axial direction.

The core base 532 is obtained by integrally forming an inner core base 533, an intermediate core base 534 located at the outer side of the inner core base 533, and an outer core base 535 located at the outer side of the intermediate core base 534. The inner core base 533 and the outer core base 535 may be formed by a magnetic body of iron, for example. The intermediate core base 534 is formed by a nonmagnetic body, for example. Thus, for example, the intermediate core base 534 has a weaker magnetic property (for example, magnetic permeability) than the inner core base 533 and the outer core base 535.

The claw pole 536 includes a radially extending portion 537, which projects outward in the radial direction from the outer circumferential portion of the core base 532 (outer core base 535), and an axially extending portion 538, which is located on the distal end of the radially extending portion 537 and extends in the axial direction. The radially extending portion 537 is substantially sectoral as viewed in the axial direction. The axially extending portion 538 has a sectoral cross-section extending in a direction orthogonal to the axis. The claw pole 536 is formed by a magnetic body and may be formed from iron, for example, like the inner core base 533 and the outer core base 535.

As illustrated in FIG. 40, the rotor core 541, which has substantially the same shape as the rotor core 531, includes a plurality of (five in the present embodiment) claw poles 546 that are arranged at equal intervals in the circumferential direction on an outer circumferential portion of the core base 542, which is substantially disk-shape. The claw poles 546 project outward in the radial direction and extend in the axial direction.

The core base 542 is formed by integrally forming an inner core base 543, an intermediate core base 544 located at the outer side of the inner core base 543, and an outer core base 545 located at the outer side of the intermediate core base 544. The inner core base 543 and the outer core base 545 are formed by a magnetic body of iron, for example. The intermediate core base 544 is formed by a nonmagnetic body, for example. Thus, for example, the intermediate core base 544 has a weaker magnetic property (for example, magnetic permeability) than the inner core base 543 and the outer core base 545.

The claw pole 546 includes a radially extending portion 547, which projects outward in the radial direction from the outer circumferential portion of the core base 542 (outer core base 545), and an axially extending portion 548, which is located on the distal end of the radially extending portion 547 and extends in the axial direction. The radially extending portion 547 is substantially sectoral as viewed in the axial direction. The axially extending portion 548 has a sectoral cross-section extending in a direction orthogonal to the axis. The claw pole 546 is formed by a magnetic body of iron, for example, like the inner core base 543 and the outer core base 545.

As illustrated in FIGS. 40 to 42, the field magnet 551 includes a disk portion 552 and radially extending portions 553. The disk portion 552 has a larger diameter than the core bases 532 and 542 of the rotor cores 531 and 541. More specifically, the diameter of the disk portion 552 is equal to the sum of the diameter of the core bases 532 and 542 the radial length of the radially extending portions 537 and 547. Thus, when the field magnet 551 is held between the rotor cores 531 and 541, inner surfaces 538a and 548a of the axially extending portions 538 and 548 of the claw poles 536 and 546 are in contact with the disk portion 552 in the radial direction. The radially extending portions 553 are located between the axially extending portions 538 of the claw pole 536 and the axially extending portions 548 of the claw pole 546 in the circumferential direction.

As illustrated in FIG. 42, the field magnet 551 has a substantially uniform length (thickness) in the axial direction. The field magnet 551 is shorter than the claw poles 536 and 546 (axially extending portions 538 and 548) of the rotor cores 531 and 541 in the axial direction.

As illustrated in FIGS. 40 and 42, the field magnet 551 is anisotropically oriented so that the claw poles 536 (axially extending portions 538) of the rotor core 531, which are in contact with the field magnet 551, function as S poles and the claw poles 546 (axially extending portions 548) of the rotor core 541, which are in contact with the field magnet 551, function as the N poles. This forms magnetic poles that change alternately in the circumferential direction. Thus, the rotor core 531 and the rotor core 541 have different magnetic poles. The number of the claw poles 536 is five and the number of the claw poles 546 is five as described above. Thus, the field magnet 551 obtains ten poles (five magnetic pole pairs).

As illustrated in FIG. 39, the rotor 521 includes a sensor magnet 562 held by a magnet holder 561 that is substantially disk-shaped. More specifically, the magnet holder 561 includes a disk portion 561b and a cylindrical portion 561c. A boss 561a is formed at the center of the disk portion 561b. The cylindrical portion 561c extends from an outer edge of the disk portion 561b. The sensor magnet 562 is annular and fixed to an inner circumferential surface of the cylindrical portion 561c and a surface of the disk portion 561b. The boss 561a is fitted to the rotation shaft 522 to fix the magnet holder 561 to the rotation shaft 522 near the rotor core 531.

The end plate 514 includes a Hall IC 563 that opposes the sensor magnet 562 in the axial direction and serves as a magnetic sensor. The Hall IC 563 outputs a detection signal having an H level and a detection signal having an L level to the control circuit S respectively when a magnetic field of the N pole and a magnetic field of the S pole are detected from the sensor magnet 562.

The operation of the brushless motor 511 will now be described.

When the control circuit S supplies three-phase driving current to the coil 519, the stator 516 generates a rotating magnetic field to rotate and drive the rotor 521. Rotation of the sensor magnet 562, which opposes the Hall IC 563, switches the level of the detection signal output from the Hall IC 563 in accordance with the rotational angle (position) of the rotor 521. In response to the detection signal, the control circuit S supplies the coil 519 with three-phase driving current switched at optimum timings. Thus, the rotating magnetic field is generated in a desirable manner, and the rotor 521 is continuous rotated and driven in a desirable manner.

In the rotor 521 of the present embodiment, the field magnet 551, which is a single anisotropically oriented magnet, acts so that the claw poles 536 and 546 of the rotor cores 531 and 541 function as different magnetic poles in the circumferential direction.

Next, the advantages of the sixth embodiment will be described.

(14) The field magnet 551, which is anisotropically oriented, acts so that the claw poles 536 and 546 arranged in the circumferential direction function as different magnetic poles in the circumferential direction. Thus, with the single field magnet 551, the claw poles 536 and 546 to function as different magnetic poles. This improves the coupling efficiency without increasing the number of components.

(15) The field magnet 551 is anisotropically oriented. Thus, magnetic flux is more concentrated than radial orientation. This allows for an increase in the output of the motor 511.

(16) The rotor cores 531 and 541 used by different magnetic poles are separate from each other. This reduces magnetic flux leakage and short-circuiting flux that extend through the claw poles 536 and 546 and the core bases 532 and 542 between different magnetic poles. This allows for an increase in the output of the motor 511.

(17) The core bases 532 and 542 at least partially include the intermediate core bases 534 and 544 that have a weaker magnetic property than the claw poles 536 and 546. This reduces short-circuiting flux in which the magnetic flux of the field magnet 551 acts to extend through the core bases 532 and 542 can be prevented. This allows for an increase in the output of the motor 511.

(18) The annular intermediate core bases 534 and 544 are provided for the core bases 532 and 542. This further ensures reduction of short-circuiting flux in which the magnetic flux of the field magnet 551 acts to extend through the core bases 532 and 542.

The sixth embodiment may be modified as described below.

The intermediate core bases 534 and 544 are formed by nonmagnetic bodies in the sixth embodiment but may be formed by magnetic bodies as long as the magnetic property is weaker than the claw poles 536 and the claw pole 546.

In the sixth embodiment, the field magnet 551 includes the intermediate core bases 534 and 544 having a weaker magnetic property than the claw poles 536 and the claw poles 546. However, the field magnet 551 may be formed by a member having the same magnetic property as the claw poles 536 and the claw poles 546.

Further, the core bases 532 and 542 may be formed by members having a weaker magnetic property than the claw poles 536 and the claw poles 546.

Figure 43:
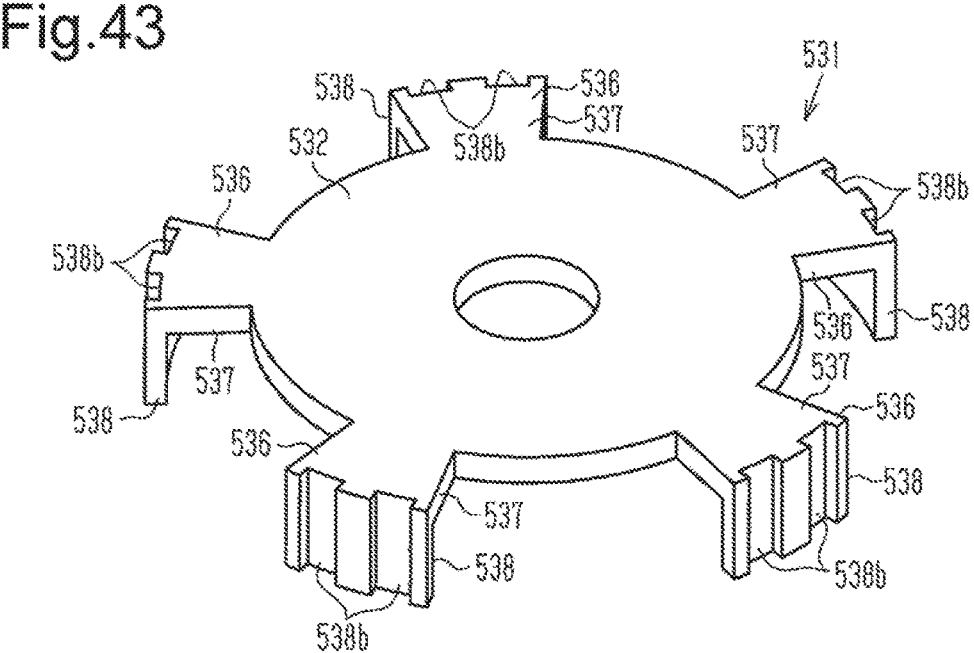
FIG. 43 is a perspective view of a rotor core in a modification of the sixth embodiment.
Figure 44:
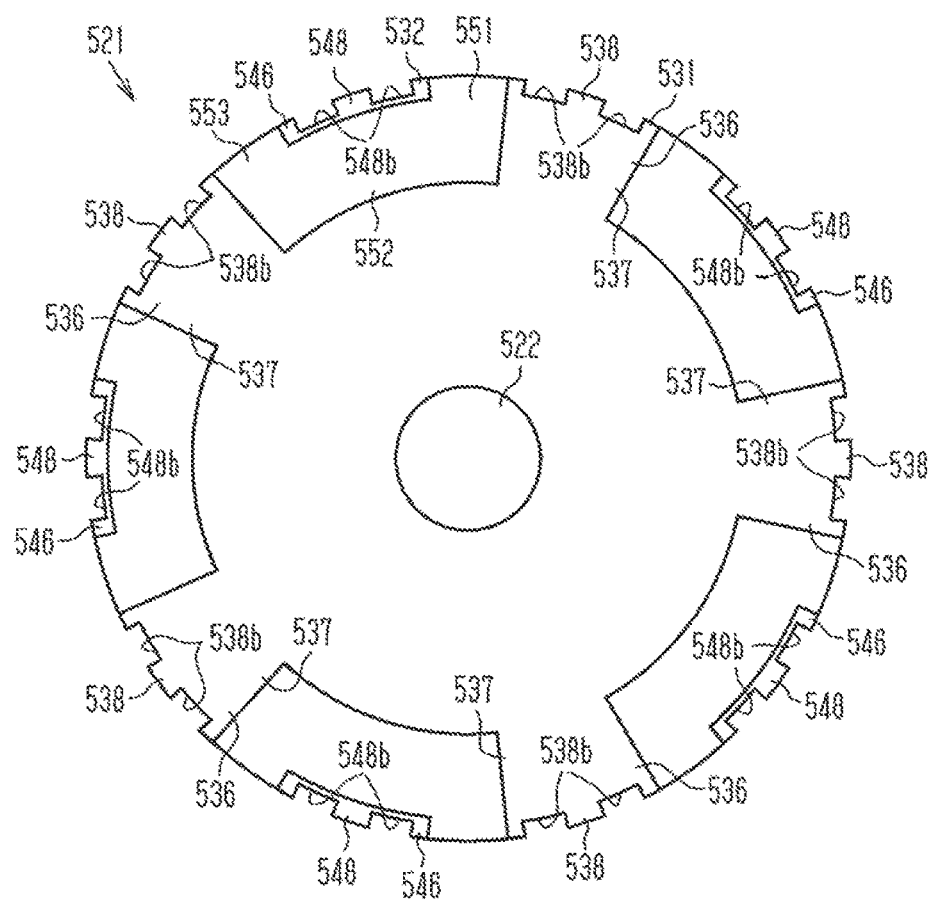
FIG. 44 is a plan view of a rotor including the rotor core illustrated in FIG. 43.

For example, as illustrated in FIGS. 43 and 44, the axially extending portions 538 and 548 of the claw poles 536 and 546 may include grooves 538b and 548b recessed in the radial direction and extending in the axial direction. In FIG. 44, the two grooves 538b are formed in the axially extending portions 538 and the two grooves 548b are formed in the axially extending portions 548 although this configuration may be changed as required.

Instead of the grooves, slits may extend in the radial direction through the axially extending portions and extend in the axial direction. The formation of grooves and slits allows the magnetic flux distribution to be changed (adjusted). Thus, cogging torque and torque ripple can be adjusted, and rotor vibration can be decreased.

Figure 45:
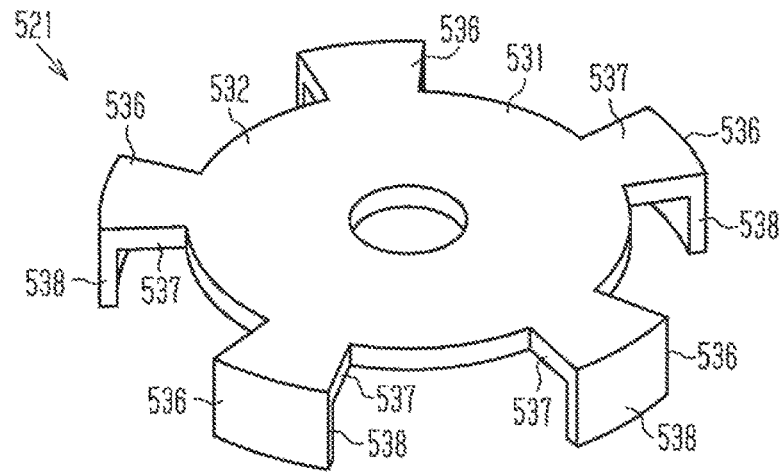
FIG. 45 is an exploded perspective view of a rotor in a modification of the sixth embodiment.
Figure 45:
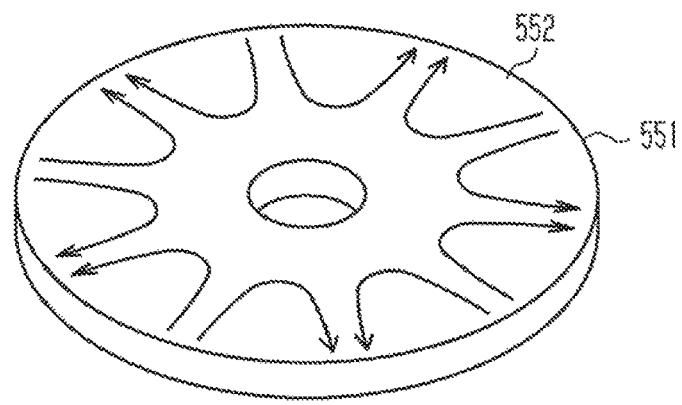
Figure 45:
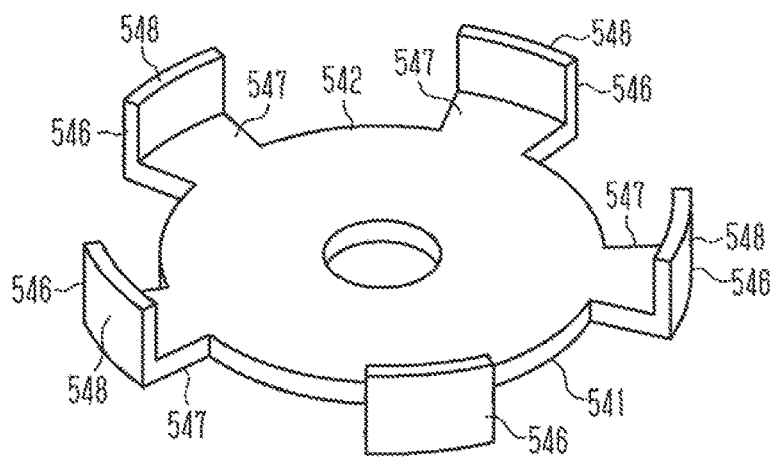
Figure 45:
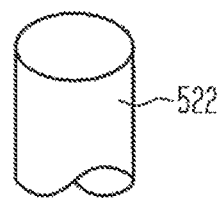
Figure 46:
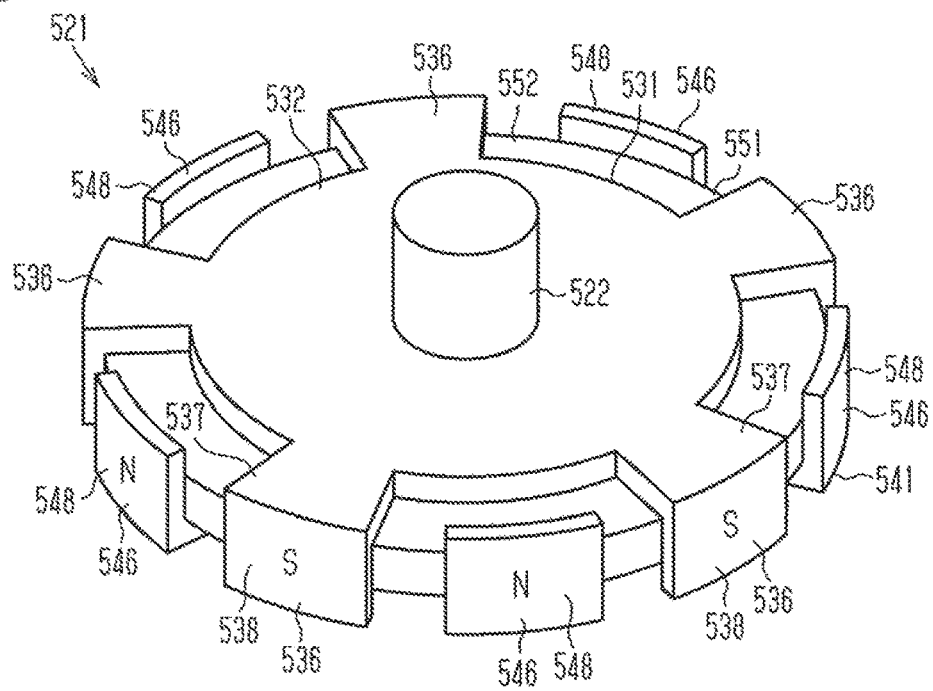
FIG. 46 is a perspective view of the rotor illustrated in FIG. 45.
Figure 47:
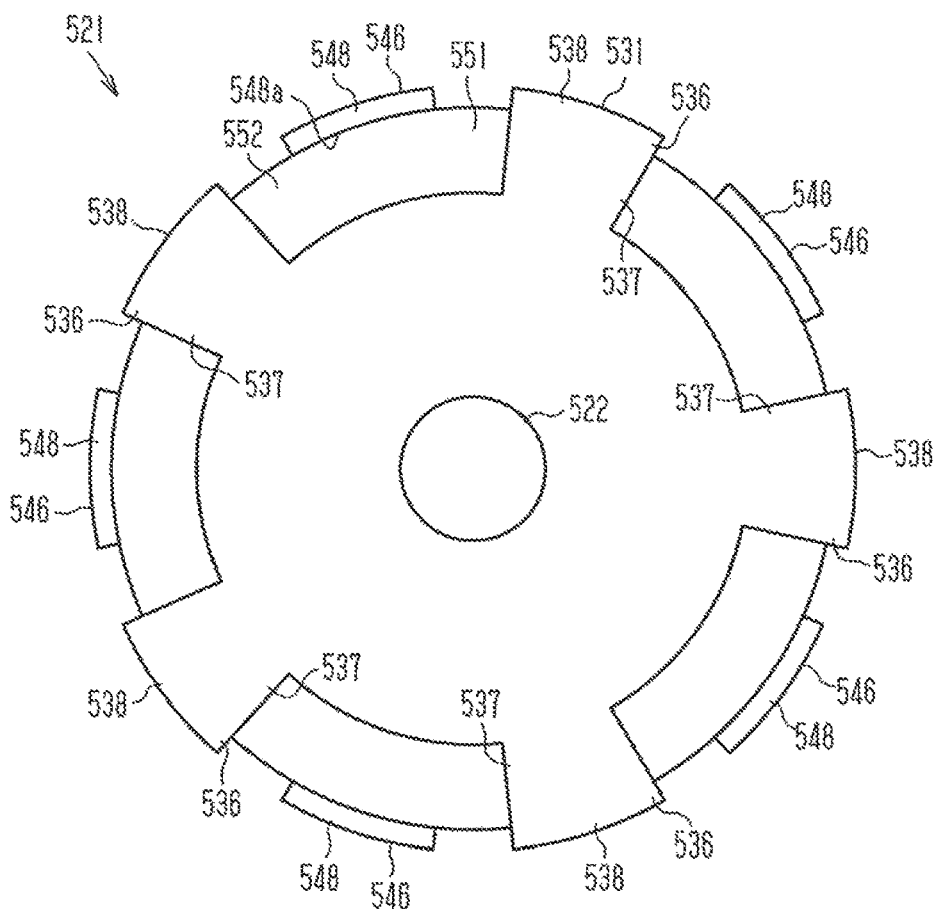
FIG. 47 is a plan view of the rotor illustrated in FIG. 46.

In the sixth embodiment, the field magnet 551 includes the disk portion 552 and the radially extending portions 553. Instead, for example, as illustrated in FIGS. 45 to 47, the field magnet 551 may include only the disk portion 552. When the field magnet 551 includes only the disk portion 552, the shape of the field magnet 551 is simplified.

In the sixth embodiment, the two rotor cores 531 and 541 are used. Instead, for example, there may be only one rotor core. In such a case, the claw poles 536 of the rotor core 531 and the claw poles 546 of the rotor core 541 are formed on one of the rotor cores. This allows rotor to have the same number of poles as the rotor of the above embodiment when the same field magnet 551 is used.

The number of poles obtained with the field magnet 551 and the claw poles 536 and 546 is ten in the sixth embodiment but may be changed when required.

The sixth embodiment and its modifications may be combined as required.

Seventh Embodiment

A motor according to a seventh embodiment will now be described.

Figure 48:
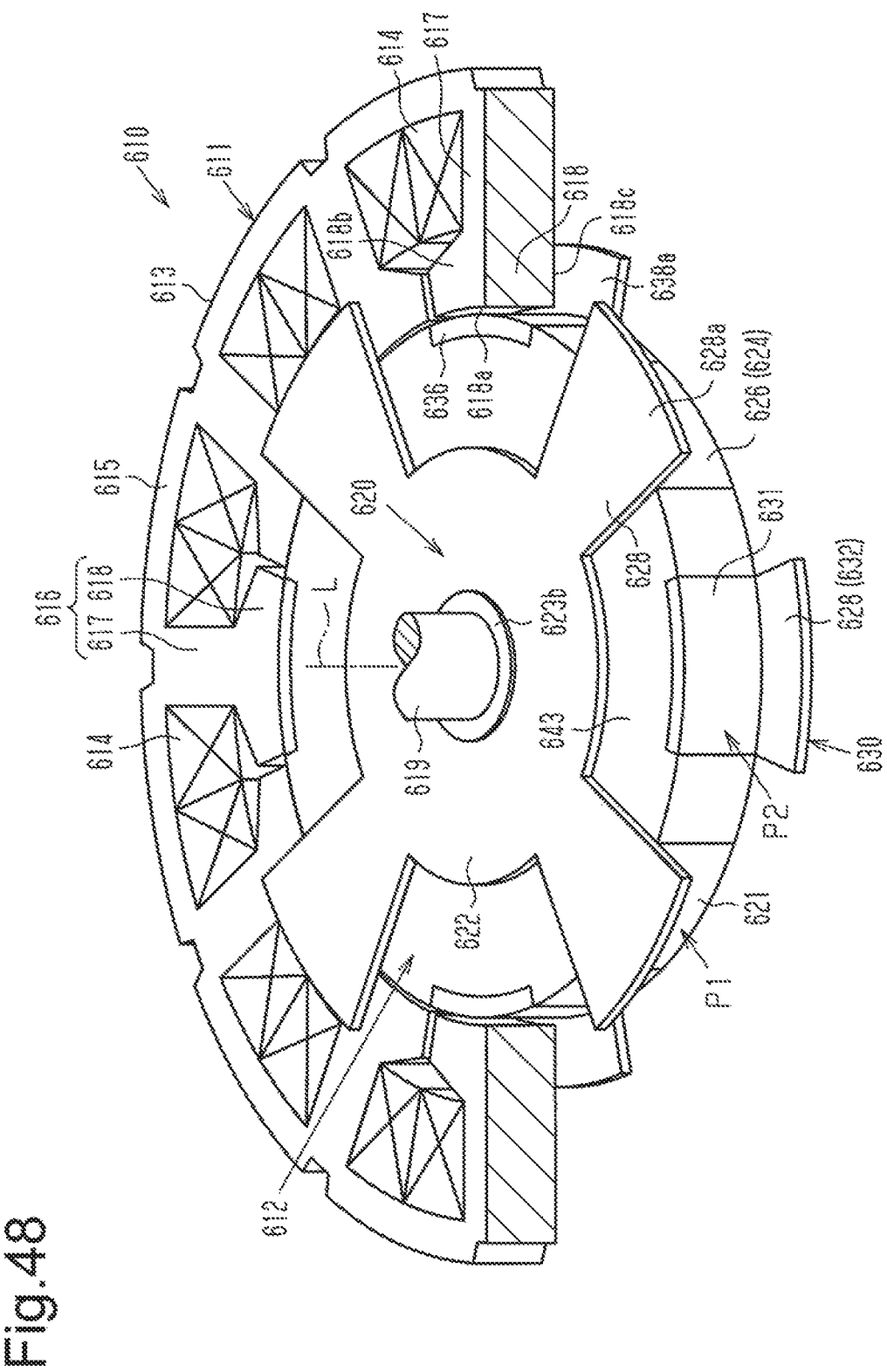
FIG. 48 is a partial cross-sectional perspective view of a motor according to a seventh embodiment of the present invention.

As illustrated in FIG. 48, a motor 610 of the present embodiment includes a stator 611, which is annular is fixed to a motor housing (not shown), and a rotatable rotor 612, which is located at the inner side of the stator 611.

[Configuration of Stator]

The stator 611 includes a cylindrical stator core 613 and coils 614 wound around the stator core 613. The stator core 613 includes an outer circumferential annular portion 615, which is fixed to the motor housing, and a plurality of teeth 616, which extend inward in the radial direction from the outer circumferential annular portion 615. The teeth 616 are arranged at equal intervals in the circumferential direction.

Teeth 616

Each tooth 616 is T-shaped and has a radial distal end (radially inner end) in the radial direction that is wide in the circumferential direction. The tooth 616 includes a winding portion 617, around which a coil 614 is wound, and a distal tooth end 618, which is defined by the inner circumferential side of the winding portion 617. The winding portion 617 extends inward in the radial direction from the outer circumferential annular portion 615. The distal tooth end 618 is wider than the winding portion 617 in the circumferential direction. An inner circumferential surface 618a of the distal tooth end 618 (inner side surface in the radial direction) is an arcuate surface formed by axially extending an arc, with extends about the axis L of a rotation shaft 619 of a rotor 612. The distal tooth end 618 has two flat axial end surfaces (first axial end surface 618b and second axial end surface 618c) that are orthogonal to the axis L of the rotation shaft 619.

Configuration of Rotor

Figure 49:
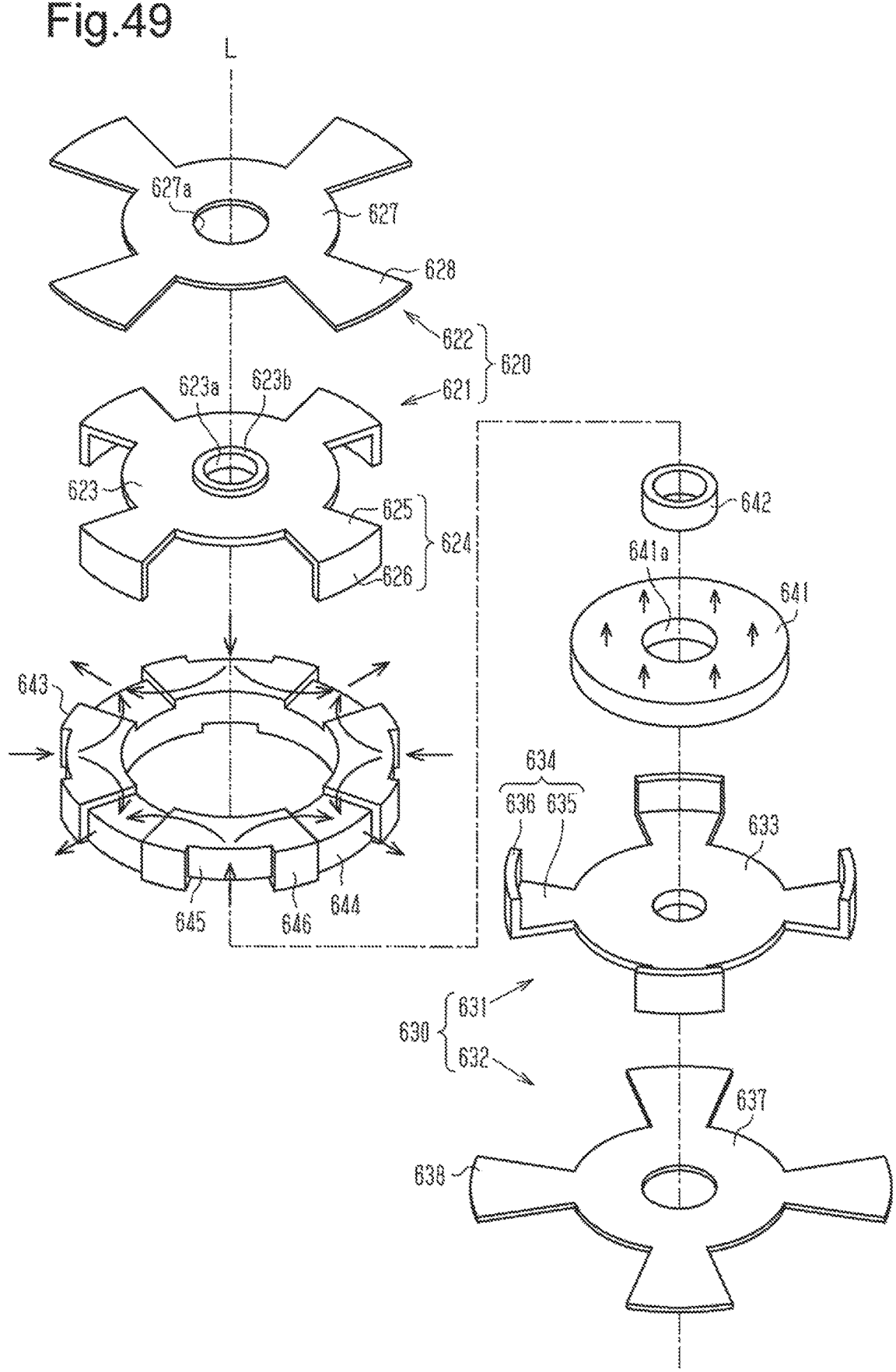
FIG. 49 is an exploded perspective view of a rotor illustrated in FIG. 48.

As illustrated in FIG. 49, the rotor 612 is provided with a first rotor core 620, which includes a first main core 621 and a first auxiliary core 622, a second rotor core 630, which includes a second main core 631 and a second auxiliary core 632, a field magnet 641, and a commutator magnet 643.

First Rotor Core 620

The first rotor core 620 includes the first main core 621 and the first auxiliary core 622 that are stacked in the direction of the axis L. The first main core 621 and the first auxiliary core 622 are formed by pressing a magnetic steel plate of a soft magnetic material.

The first main core 621 includes a base portion 623 that is disk-shaped. A through hole 623a, to which the rotation shaft 619 is fixed, extends through the center of the base portion 623. The base portion 623 includes a boss 623b, which is substantially cylindrical. The boss 623b is projected around the through hole 623a and formed through a burring process. The boss 623b projects from the base portion 623 outward in the axial direction (away from the field magnet).

A plurality of (four in the present embodiment) first claw portions 624, which are arranged at equal intervals in the circumferential direction, project outward in the radial direction from the outer circumferential surface of the base portion 623 and extend in the axial direction. Each first claw portion 624 includes a radially extending portion 625, which extends outward in the radial direction from the outer circumferential surface of the base portion 623, and an axially extending portion 626, which extends in the direction of the axis L from a distal end of the radially extending portion 625. The radially extending portion 625 is sectoral and extends about the axis L as viewed in the direction of the axis L. An outer circumferential surface (radially outer surface) of the axially extending portion 626 is arcuate and extends about the axis L. The radially extending portion 625 is bent by 90° to form the axially extending portion 626.

The first auxiliary core 622, which is stacked on the axially outer side of the first main core 621 (away from the field magnet), is flat as a whole and includes a disk-shaped base portion 627 and extending portions 628, which extend outward in the radial direction from the base portion 627.

The base portion 627 is stacked on the base portion 623 of the first main core 621 in the direction of the axis L. The base portions 623 and 627 of the first main core 621 and the first auxiliary core 622 have the same outer diameter. A through hole 627a, to which the boss 623b on the base portion 623 of the first main core 621 is fitted, extends through the center of the base portion 627 of the first auxiliary core 622. The first main core 621 and the first auxiliary core 622 may be fixed to each other by press-fitting or adhering the boss 623b to the through hole 627a.

The number of the extending portions 628, which are extended radially outward from the base portion 627 and arranged at equal intervals in the circumferential direction, is the same as the first claw portions 624 (four in the present embodiment). Each extending portion 628 is sectoral and extends about the axis L as viewed in the direction of the axis L.

The extending portions 628 are stacked on the radially extending portions 625 of the first claw portions 624 in the direction of the axis L. The extending portions 628 have the same opening angle with respect to the axis L (circumferential width) as the radially extending portions 625. The extending portions 628 have an outer diameter (length from the axis L to outer circumferential end) that is larger than an outer diameter of the first claw portions 624 (length from the axis L to the outer circumferential surfaces of the axially extending portions 626). Thus, when the first main core 621 and the first auxiliary core 622 are stacked upon each other (see FIG. 50), the distal side of the extending portion 628 partially projects outward in the radial direction beyond the axially extending portion 626 of the first claw portion 624.

Figure 50:
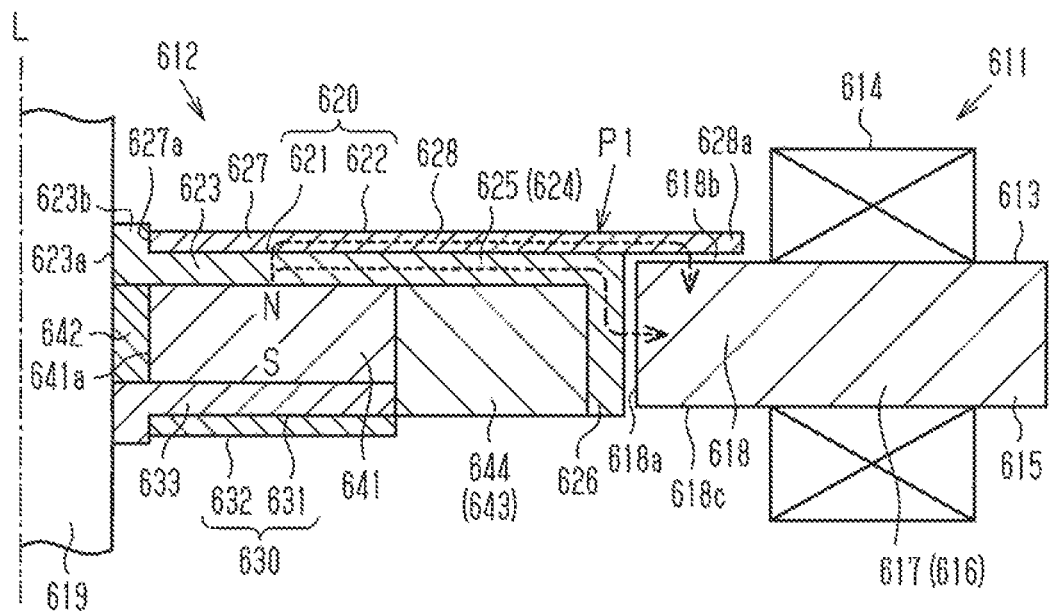
FIG. 50 is a cross-sectional view of the motor illustrated in FIG. 48.

In the present embodiment, as illustrated in FIG. 50, when the first main core 621 and the first auxiliary core 622 are stacked, the first claw portion 624 and the extending portion 628 form a first claw pole P1 of the first rotor core 620.

Second Rotor Core 630

Referring to FIG. 49, the second rotor core 630 has the same configuration as the first rotor core 620. The second rotor core 630 includes the second main core 631, which is identical in shape to the first main core 621, and the second auxiliary core 632, which is identical in shape to the first auxiliary core 622. More specifically, the second main core 631 includes a base portion 633 and second claw portions 634 (radially extending portion 635 and axially extending portion 636) respectively corresponding to the base portion 623 and the first claw portions 624 of the first main core 621 (radially extending portion 625 and axially extending portion 626). The second auxiliary core 632 includes a base portion 637 and extending portions 638 respectively corresponding to the base portion 627 and the extending portions 628 of the first auxiliary core 622. When the second main core 631 and the second auxiliary core 632 are stacked upon each other, the second claw portion 634 and the extending portion 638 form a second claw pole P2 of the second rotor core 630 in the same manner as in the first rotor core 620.

The first rotor core 620 and the second rotor core 630 are coupled so that the first claw poles P1 and the second claw poles P2 are alternately arranged at equal intervals in the circumferential direction (see FIG. 48). In the coupled state, the first and second claw portions 624 and 634 have distal ends (axially extending portions 626 and 636) directed toward opposite directions, and the second claw portions 634 are located between the first claw portions 624 in the circumferential direction. The axially extending portions 626 and 636 of the first and second claw portions 624 and 634 are alternately arranged at equal intervals in the circumferential direction.

Field Magnet 641

As illustrated in FIGS. 49 and 50, when the first and second rotor cores 620 and 630 are coupled to each other, the base portions 623 and 633 of the first and second main cores 621 and 631 are parallel to each other, and the field magnet 641 is located in between.

The field magnet 641 is a disk-shaped permanent magnet. A through hole 641a extends through a central portion of the field magnet 641. A cylindrical sleeve 642 is inserted into the through hole 641a, and the rotation shaft 619 is inserted through the sleeve 642. The sleeve 642 is formed by a nonmagnetic body of the same stainless steel as the rotation shaft 619 in the present embodiment. The field magnet 641 has substantially the same outer diameter as the base portions 623 and 633 of the first and second main cores 621 and 631. The field magnet 641 has one axial end surface (upper surface as viewed in FIGS. 49 and 50) that contacts the base portion 623 of the first main core 621 and the another axial end surface (lower surface) that comes into contact with the base portion 633 of the second main core 631. The field magnet 641 is held between and fixed in the axial direction by the base portions 623 and 633.

The field magnet 641 is magnetized in the axial direction so that the portion closer to the first rotor core 620 serves as the N pole and the portion closer to the second rotor core 630 serves as the S pole. Thus, the field magnet 641 acts so that the first claw pole P1 (first claw portion 624 and extending portion 628) of the first rotor core 620 functions as the N pole and the second claw pole P2 (second claw portion 634 and extending portions 638) of the second rotor core 630 functions as the S pole. In FIG. 49, the arrows in solid lines indicate the magnetized direction (direction from S pole to N pole) of the field magnet 641 and the commutator magnet 643, which will be described later.

The rotor 612 of the present embodiment is a Lundell rotor that uses the field magnet 641. As shown in FIG. 48, the first claw poles P1, serving as the N poles, and the second claw poles P2, serving as the S poles, are alternately arranged in the circumferential direction. The number of magnetic poles is eight.

Commutator Magnet 643

As illustrated in FIGS. 49 and 50, the rotor 612 includes the annular commutator magnet 643 at an outer circumferential side of the field magnet 641. The field magnet 641 and the commutator magnet 643 are formed from different materials. More specifically, the field magnet 641 is an anisotropic sintered magnet, for example, and is formed by a ferrite magnet, a samarium-cobalt (SmCo) based magnet, a neodymium magnet, or the like. The commutator magnet 643 is a bonded magnet (plastic magnet, rubber magnet, or the like), for example, and is formed by a ferrite magnet, a samarium-iron-nitrogen (SmFeN) based magnet, a samarium-cobalt (SmCo) based magnet, a neodymium magnet, or the like.

As illustrated in FIG. 49, the commutator magnet 643 includes back surface magnet portions 644 and 645 and interpolar magnet portions 646. The commutator magnet 643 is a polar anisotropic magnet magnetized to reduce magnetic flux leakage from the back surface magnet portions 644 and 645 and the interpolar magnet portions 646.

More specifically, the surface magnet portions 644 are located between the inner circumferential surfaces of the axially extending portions 626 of the first claw portions 624 and the outer circumferential surface of the field magnet 641 (see FIG. 50). In each back surface magnet portion 644, radial direction components are mainly magnetized so that the part (radially outer side) in contact with the inner circumferential surface of the axially extending portion 626 serves as the N pole, which is the same polarity as the axially extending portion 626 (first claw pole P1).

The back surface magnet portions 645 are located between the inner circumferential surfaces of the axially extending portions 636 of the second claw portions 634 and the outer circumferential surface of the field magnet 641. In each back surface magnet portion 645, radial direction components are mainly magnetized so that the part (radially outer side) in contact with the inner circumferential surface of the axially extending portion 636 serves as the S pole, which is the same polarity as the axially extending portion 636 (second claw pole P2).

The interpolar magnet portions 646 are located between the first claw poles P1 and the second claw poles P2 in the circumferential direction. In each interpolar magnet portion 646, circumferential direction components are mainly magnetized so that the part closer to the first claw pole P1 in the circumferential direction serves as the N pole and the portion closer to the second claw pole P2 in the circumferential direction serves as the S pole.

The operation of the seventh embodiment will now be described.

When the three-phase driving current is supplied to the coil 614 of the stator 611, a rotating magnetic field is formed at the stator 611. The rotating magnetic field rotates the rotor 612, which is located at the inner side of the stator 611.

Referring to FIG. 50, in the first claw pole P1 of the rotor 612, the axially extending portion 626 of the first claw portion 624 opposes the inner circumferential surface 618a of the distal tooth end 618 of the stator 611 in the radial direction. The extending portion 628 of the first auxiliary core 622 includes a section (axially opposing portion 628a) projecting outward in the radial direction from the axially extending portion 626 and opposing the first axial end surface 618b of the distal tooth end 618 in the axial direction.

In the same manner, referring to FIG. 48, in the second claw pole P2, the axially extending portion 636 of the second claw portion 634 opposes the inner circumferential surface 618a of the distal tooth end 618 in the radial direction. The extending portion 638 includes a section (axially opposing portion 638a) projecting outward in the radial direction from the axially extending portion 636 and opposing the second axial end surface 618c of the distal tooth end 618 in the axial direction.

Thus, the magnetic flux of the field magnet 641 acts on the inner circumferential surface 618a of the distal tooth end 618 from the axially extending portions 626 and 636 of the first and second claw portions 624 and 634. Further, the magnetic flux of the field magnet 641 acts on first and second axial end surfaces 618b and 618c of the distal tooth end 618 from the axially opposing portions 628a and 638a of the first and second auxiliary cores 622 and 632 (see the arrows in broken lines in FIG. 50). The magnetic flux of the field magnet 641 interacts with the rotating magnetic field of the stator 611 and generates rotational torque at the rotor 612.

The advantages of the seventh embodiment will now be described.

(19) The first claw pole P1 of the first rotor core 620 includes the axially extending portion 626 (first claw portion 624), which opposes the distal tooth end 618 in the radial direction, and the axially opposing portion 628a (extending portion 628 of first auxiliary core 622), which opposes the distal tooth end 618 in the axial direction. The second claw pole P2 of the second rotor core 630 includes the axially extending portion 636 (second claw portion 634), which opposes the distal tooth end 618 in the radial direction, and the axially opposing portion 638a (extending portion 638 of second auxiliary core 632), which opposes the distal tooth end 618 in the axial direction.

In this configuration, surfaces of the first and second claw poles P1 and P2 opposing the distal tooth end 618 are obtained in both radial and axial directions. This widens the surface opposing the distal tooth end 618. Thus, magnetic saturation is less likely to occur in the first and second claw poles P1 and P2. As a result, the magnetic flux generated by the field magnet 641 effectively acts on the stator 611 from the axially extending portions 626 and 636 (radially opposing portion) and the axially opposing portions 628a and 638a. Further, the output can be improved.

(20) The first rotor core 620 is formed by joining the first main core 621 and the first auxiliary core 622, which are separate components. In the same manner, the second rotor core 630 is formed by joining the second main core 631 and the second auxiliary core 632, which are separate components. Further, the first and second main cores 621 and 631 respectively include the radially opposing portions (axially extending portions 626 and 636) of the first and second claw poles P1 and P2, and the first and second auxiliary cores 622 and 632 respectively include the axially opposing portions 628a and 638a of the first and second claw poles P1 and P2.

This configuration forms the first and second claw poles P1 and P2 including the radially opposing portions (the axially extending portions 626 and 636) and the axially opposing portions 628a and 638a, while simplifying the shapes of the first and second main cores 621 and 631 and the first and second auxiliary cores 622 and 632. Thus, the first and second rotor cores 620 and 630, that is, the first and second main cores 621 and 631 and the first and second auxiliary cores 622 and 632 may be formed through a simple and inexpensive means (for example, pressing) in a further preferred manner.

The seventh embodiment may be modified as described below.

Figure 51:
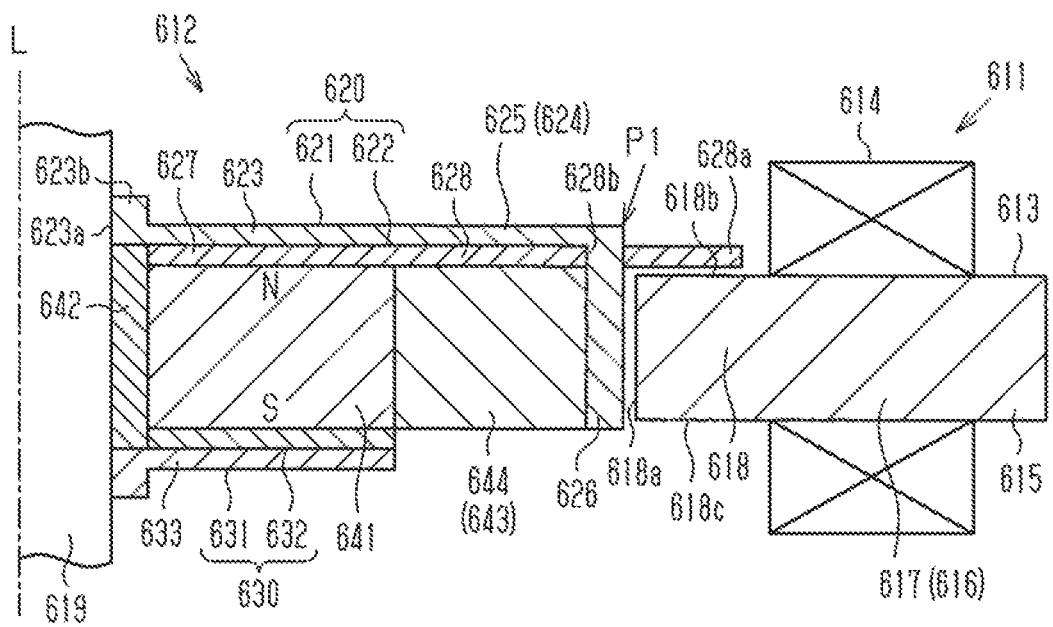
FIG. 51 is a cross-sectional view of a motor in a modification of the seventh embodiment.
Figure 52:
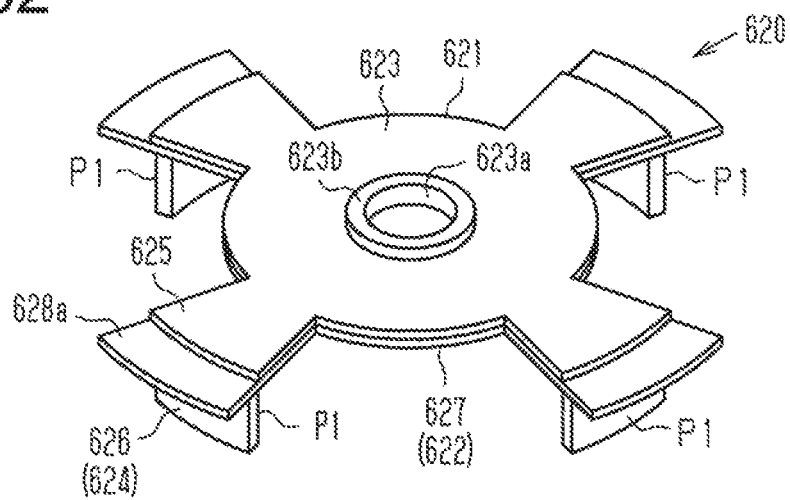
FIG. 52 is a perspective view of a first rotor core illustrated in FIG. 51.
Figure 53:
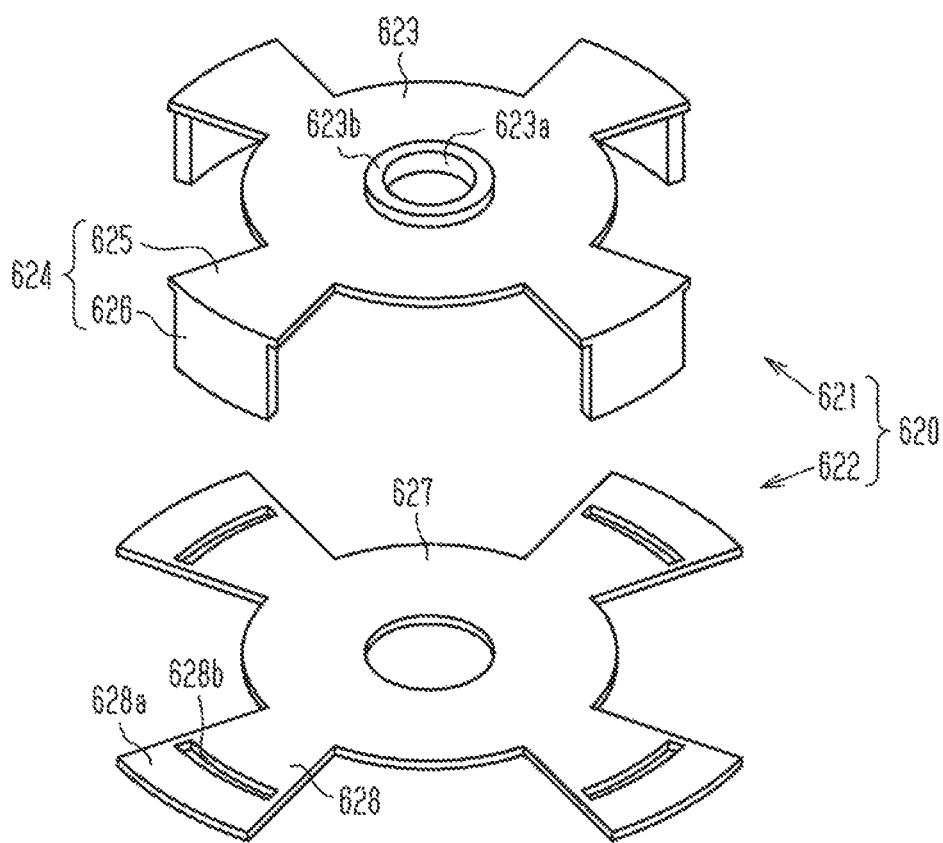
FIG. 53 is an exploded perspective view of the first rotor core illustrated in FIG. 52.

In the seventh embodiment, the first and second auxiliary cores 622 and 632 are respectively stacked on the outer sides of the first and second main cores 621 and 631 (the base portions 623 and 633) in the axial direction (facing away from the field magnet) but may instead be stacked, for example, on the inner sides of the first and second main cores 621 and 631 in the axial direction (facing toward the field magnet 641), as illustrated in FIGS. 51, 52, and 53. In FIGS. 51 to 53, same reference numerals are given to those components that are the same as the corresponding components of the seventh embodiment. Such components will not be described in detail.

As illustrated in FIGS. 51 to 53, the base portion 627 of the first auxiliary core 622 is stacked on the inner side of the base portion 623 of the first main core 621 in the axial direction (facing toward the field magnet 641). The axially extending portions 626 of the first claw portions 624 in the first main core 621 are inserted into insertion holes 628*b* in the extending portions 628 of the first auxiliary core 622. The extending portions 628 are stacked on the inner side of the radially extending portion 625 of the radially extending portions 625 in the axial direction (facing toward the commutator magnet 643). The extending portions 628 have the same opening angle (circumferential width) with respect to the axis L as the radially extending portions 625, and the axially extending portions 626 have a smaller opening angle than the radially extending portions 625 and the extending portions 628. In such a configuration, the axially opposing portion 628*a* facing the first axial end surface 618*b* of the distal tooth end 618 in the axial direction is located at the radially outer side of the insertion hole 628*b* of the extending portion 628. The second rotor core 630 is modified in the same manner as the first rotor core 620. This configuration has the same advantages as the seventh embodiment.

The first rotor core 620 of the seventh embodiment is formed by joining the first main core 621, which includes the radially opposing portion (axially extending portion 626) of the first claw pole P1, and the first auxiliary core 622, which includes the axially opposing portion 628*a* of the first claw pole P1. In the same manner, the second rotor core 630 is formed by joining the second main core 631, which includes the radially opposing portion (axially extending portion 636) of the second claw pole P2, and the second auxiliary core 632, which includes the axially opposing portion 638*a* of the second claw pole P2.

Figure 54:
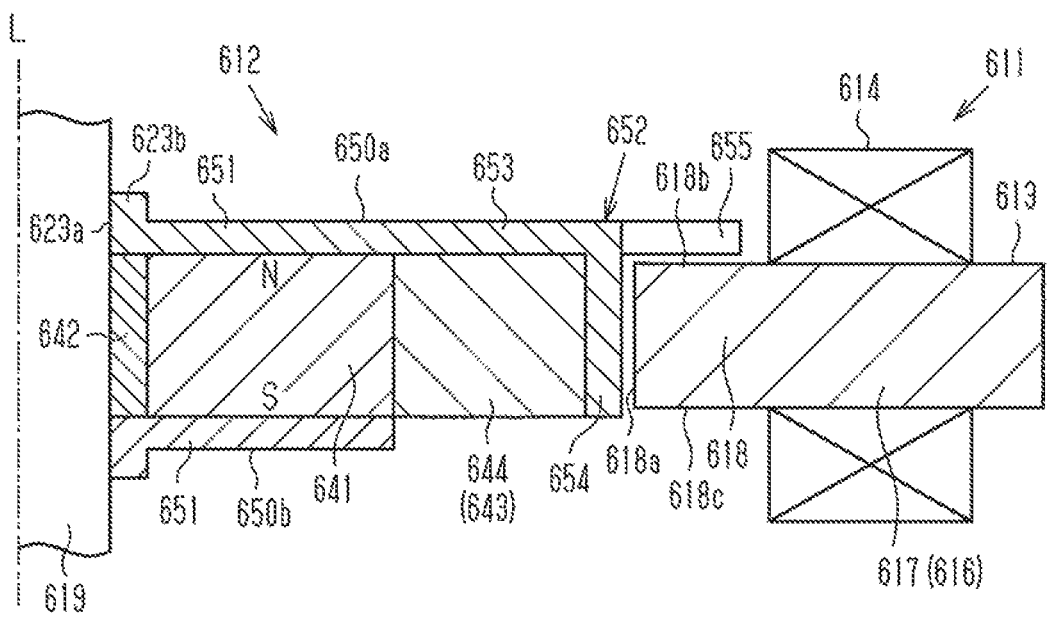
FIG. 54 is a cross-sectional view of a motor in a modification of the seventh embodiment.
Figure 55:
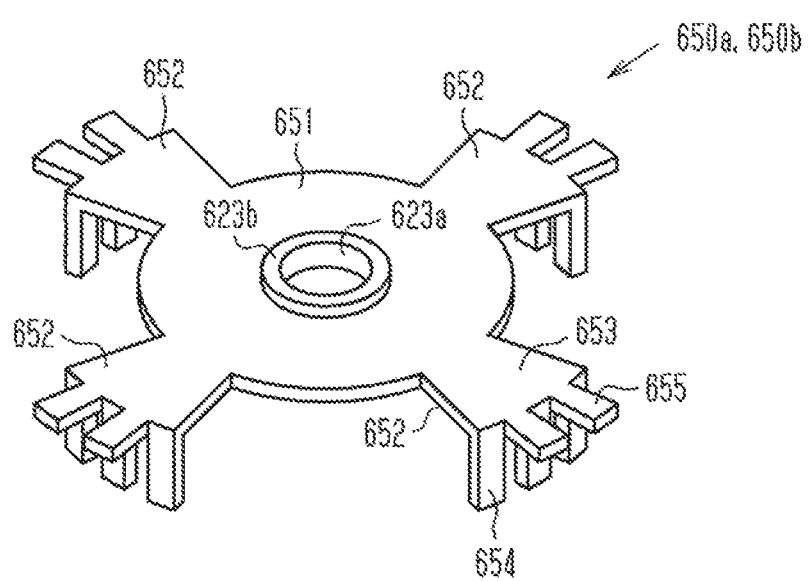
FIG. 55 is a perspective view of a first rotor core illustrated in FIG. 54.

However, there is no limitation to such a configuration. For example, as shown in FIGS. 54 and 55, a first rotor core 650*a* and a second rotor core 650*b* may each be formed by a single member. The first and second rotor cores 650*a* and 650*b* have the same shape. In FIGS. 54 and 55, same reference numerals are given to those components that are the same as the corresponding components of the seventh embodiment. Such components will not be described in detail.

As illustrated in FIG. 55, the first and second rotor cores 650*a* and 650*b*, which are formed by pressing a magnetic steel plate of a soft magnetic material, each includes a disk-shaped base portion 651. A plurality of (four in this example) claw poles 652 are arranged at equal intervals in the circumferential direction on the outer circumferential surface of the base portion 651. The claw poles 652 project outward in the radial direction and extend in the axial direction. A portion of the claw pole 652 extending outward in the radial direction from the outer circumferential surface of the base portion 651 defines a radially extending portion 653, and a portion of the claw pole 652 extending in the direction of the axis L from the radially extending portion 653 defines an axially extending portion 654. The claw pole 652 includes a projection 655 projecting further radially outward from the radially extending portion 653. The claw pole 652 is bent at a right angle to form the axially extending portion 654 and leave the remaining projection 655 that projects outward in the radial direction.

In the example of FIG. 55, two projections 655 are formed between three axially extending portions 654. Instead two axially extending portion 654 may be formed between three projections 655.

In this configuration, as illustrated in FIG. 54, in the claw pole 652 of the first rotor core 650*a*, the axially extending portion 654 opposes the inner circumferential surface 618*a* of the distal tooth end 618 of the stator 611 in the radial direction. Each projection 655 of the claw pole 652 opposes the first axial end surface 618*b* of the distal tooth end 618 in the axial direction.

In the same manner, in the claw pole 652 of the second rotor core 650*b*, the axially extending portion 654 opposes the inner circumferential surface 618*a* of the distal tooth end 618 in the radial direction. Each projection 655 opposes the second axial end surface 618*c* of the distal tooth end 618 in the axial direction.

In the same manner as the seventh embodiment, the claw pole 652 of this configuration obtains a surface opposing the distal tooth end 618 in both of the radial direction and the axial direction. Further, the surface opposing the distal tooth end 618 is widened. This limits magnetic saturation in the claw poles 652. Thus, the magnetic flux generated by the field magnet 641 effectively acts on the stator 611, and the output is improved. Moreover, in this configuration, the first and second rotor cores 650*a* and 650*b* are each formed by a single member. This keeps the number of components low, which is desirable in terms of managing components.

In the configuration illustrated in FIG. 54, the magnetic flux generated by the back surface magnet portion 644 and 645 (commutator magnet 643) located on the back side (inner circumferential side) of the axially extending portion 654 at a location where the rotor 612 and the distal tooth end 618 oppose each other in the radial direction, partially acts directly on the stator 611 through a gap formed between the axially extending portions 654.

In the configuration illustrated in FIG. 55, the first and second rotor cores 650*a* and 650*b* are formed through pressing but instead may be formed through, for example casting. This allows gaps to be eliminated from between the axially extending portions 654 and the projections 655, while forming each of the first and second rotor cores 650*a* and 650*b* from a single member.

In the seventh embodiment, the field magnet 641 and the commutator magnet 643 are formed from different materials but instead may be formed from the same material. Further, the commutator magnet 643 may be omitted from the seventh embodiment.

The number of the first and second claw poles P1 and P2 (number of magnetic poles) is not limited to that in the seventh embodiment and may be changed in accordance with the configuration.

In the seventh embodiment, the present invention is applied to an inner rotor type motor in which the rotor 612 is located at the inner side of the stator 611. Alternatively, the present invention may be applied to an outer rotor type motor.

The seventh embodiment and its modifications may be combined as required.

The invention claimed is:
1. A motor comprising a rotor, wherein the rotor includes:
first and second rotor cores, wherein the first and second rotor cores each include a disk-shaped core base and a plurality of claw poles arranged in a circumferential direction on an outer circumferential portion of the core base, and the first and second rotor cores are stacked upon each other in an axial direction so that the claw poles of the first rotor core and the claw poles of the second rotor core are alternately arranged in the circumferential direction;
a field magnet that is located between the core base of the first rotor core and the core base of the second rotor core, the field magnet is magnetized in the axial direction so that the claw poles of the first rotor core and the claw poles of the second rotor core function as different magnetic poles in the circumferential direction; and a commutator magnet that is located on an outer circumference of the field magnet and near the claw poles, wherein the commutator magnet is magnetized so that surfaces having the same polarity face each other in the claw poles and the commutator magnet, wherein the field magnet and the commutator magnet are formed integrally as an integrated permanent magnet, the commutator magnet includes a plurality of back surface magnet portions and a plurality of interpolar magnet portions, the back surface magnet portions are located between the claw poles and the field magnet, and the back surface magnet portions are magnetized to limit magnetic flux leakage from where the back surface magnet portions are located, the interpolar magnet portions are located between adjacent ones of the back surface magnet portion in the circumferential direction, and the interpolar magnet portions are magnetized to limit magnetic flux leakage from where the interpolar magnet portions are located, the back surface magnet portions and the interpolar magnet portions are located within an axial range that is the same as an axial range in which the field magnet is formed, and the integrated permanent magnet includes two axial end surfaces and a groove formed on at least one of the two axial end surfaces, the groove being arranged at a boundary of the field magnet with the back surface magnet portions and the interpolar magnet portions.

2. The motor according to claim 1, wherein the integrated permanent magnet includes a circular outer circumference that extends along radially inner end surfaces of the claw poles.

3. The motor according to claim 1, wherein the groove has a circular shape as viewed in the axial direction.

* * * * *